United States Patent
Ito et al.

(10) Patent No.: US 8,065,498 B2
(45) Date of Patent: Nov. 22, 2011

(54) BACKUP SYSTEM, RECORDING/REPRODUCTION DEVICE, BACKUP DEVICE, BACKUP METHOD, PROGRAM, AND INTEGRATED CIRCUIT

(75) Inventors: Yoshikatsu Ito, Osaka (JP); Shunji Harada, Osaka (JP); Yuko Tsusaka, Osaka (JP); Soichiro Fujioka, Osaka (JP); Motoji Ohmori, Osaka (JP); Toshihisa Nakano, Osaka (JP)

(73) Assignee: Panasonic Corporation, Osaka (JP)

( * ) Notice: Subject to any disclaimer, the term of this patent is extended or adjusted under 35 U.S.C. 154(b) by 912 days.

(21) Appl. No.: 11/794,255

(22) PCT Filed: Dec. 12, 2005

(86) PCT No.: PCT/JP2005/022772
§ 371 (c)(1),
(2), (4) Date: Jun. 27, 2007

(87) PCT Pub. No.: WO2006/073040
PCT Pub. Date: Jul. 13, 2006

(65) Prior Publication Data
US 2008/0022061 A1    Jan. 24, 2008

(30) Foreign Application Priority Data
Jan. 7, 2005  (JP) ................................. 2005-003152

(51) Int. Cl.
*G06F 12/00* (2006.01)

(52) U.S. Cl. . 711/162; 711/156; 711/111; 711/E12.001; 725/115; 726/27; 726/29; 726/30; 726/33

(58) Field of Classification Search .................... None
See application file for complete search history.

(56) References Cited

U.S. PATENT DOCUMENTS

| | | | | |
|---|---|---|---|---|
| 4,044,232 A | * | 8/1977 | Hubbard | 377/8 |
| 5,715,403 A | | 2/1998 | Stefik | |
| 7,099,479 B1 | * | 8/2006 | Ishibashi et al. | 380/281 |
| 2002/0044657 A1 | * | 4/2002 | Asano et al. | 380/201 |
| 2002/0126843 A1 | | 9/2002 | Murase et al. | |
| 2002/0141579 A1 | | 10/2002 | Murase et al. | |
| 2002/0188955 A1 | * | 12/2002 | Thompson et al. | 725/110 |
| 2004/0193945 A1 | * | 9/2004 | Eguchi et al. | 714/6 |
| 2004/0205112 A1 | * | 10/2004 | Margolus | 709/201 |
| 2005/0160120 A1 | * | 7/2005 | Todd et al. | 707/206 |

FOREIGN PATENT DOCUMENTS

| | | |
|---|---|---|
| EP | 1 049 087 | 11/2000 |
| JP | 8-263440 | 10/1996 |
| JP | 11-203127 | 7/1999 |
| JP | 2001-14221 | 1/2001 |
| JP | 2002-244926 | 8/2002 |
| JP | 2002-297452 | 10/2002 |
| JP | 2002-304806 | 10/2002 |
| JP | 2003-30054 | 1/2003 |
| JP | 2003-186751 | 7/2003 |
| JP | 2004-54988 | 2/2004 |
| JP | 2004-133501 | 4/2004 |

* cited by examiner (Continued)

*Primary Examiner* — Reginald Bragdon
*Assistant Examiner* — Thanh D Vo
(74) *Attorney, Agent, or Firm* — Wenderoth, Lind & Ponack, L.L.P.

(57) ABSTRACT

A content of Copy Once cannot be copied to an external device or the like, even for the purpose of making a backup. This is inconvenient for the user. However, if copying to another device for the purpose of making a backup is permitted, the content may be copied in an unauthorized manner. The present invention provides the hard disk recorder that transmits the content to the backup device, sets an expiration time in the content stored in the hard disk recorder itself, and deletes the content stored in the hard disk recorder itself after the expiration time expires.

17 Claims, 25 Drawing Sheets

FIG. 4

| Content ID | Title | Recording date/time | Hash value | Type | Compression method | Expiration time | Backup flag | Priority |
|---|---|---|---|---|---|---|---|---|
| A001 | Tabloid Show | 04.10.10.17:00 | 01a | Broadcast program | MPEG2 | 04.12.15.17 | 1 | 2 |
| A003 | 04 Yearend Party | 04.12.12.09:35 | 03a | Photo | JPEG | 04.12.14.21 | 1 | 1 |
| A004 | Cat Diary | 04.12.14.22:00 | 04a | Broadcast program | MPEG2 | — | 0 | 1 |
| ... | ... | ... | ... | ... | ... | ... | ... | ... |

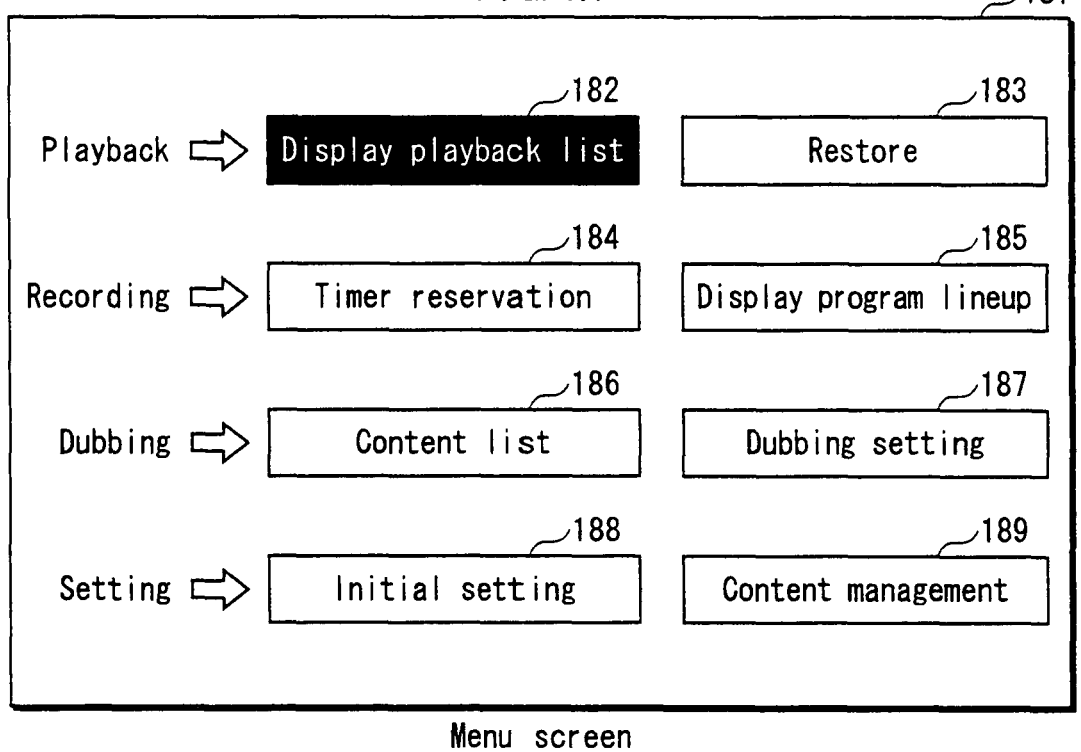
Menu screen
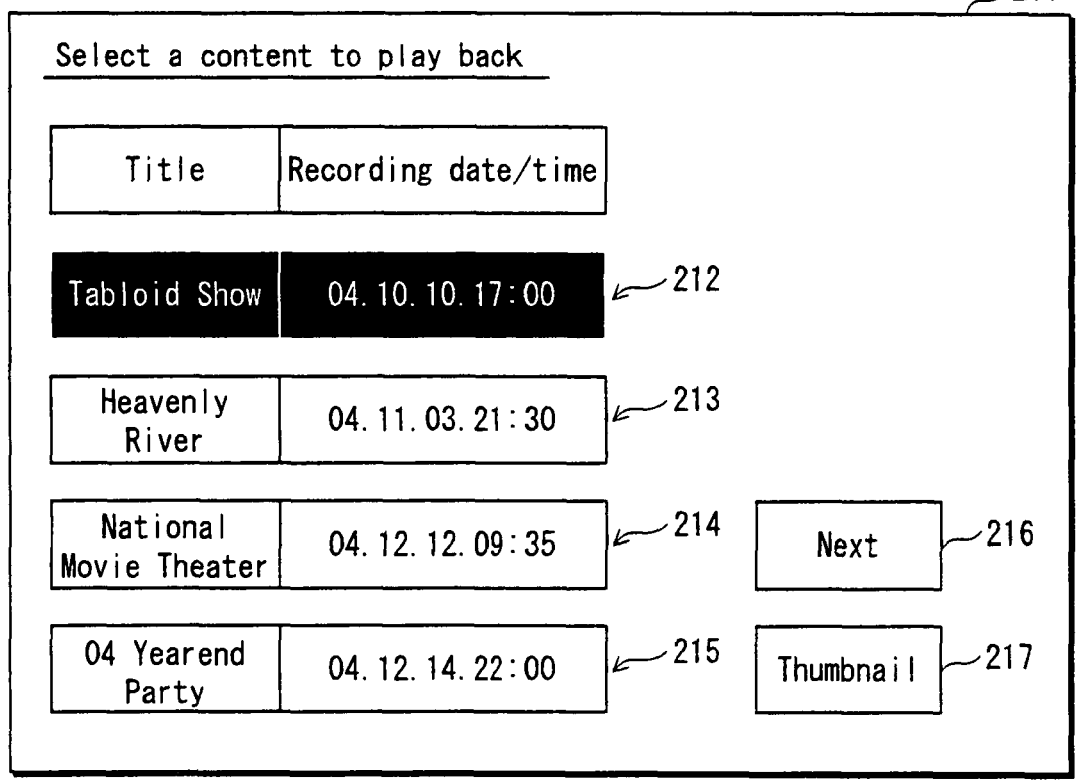
Playback list screen

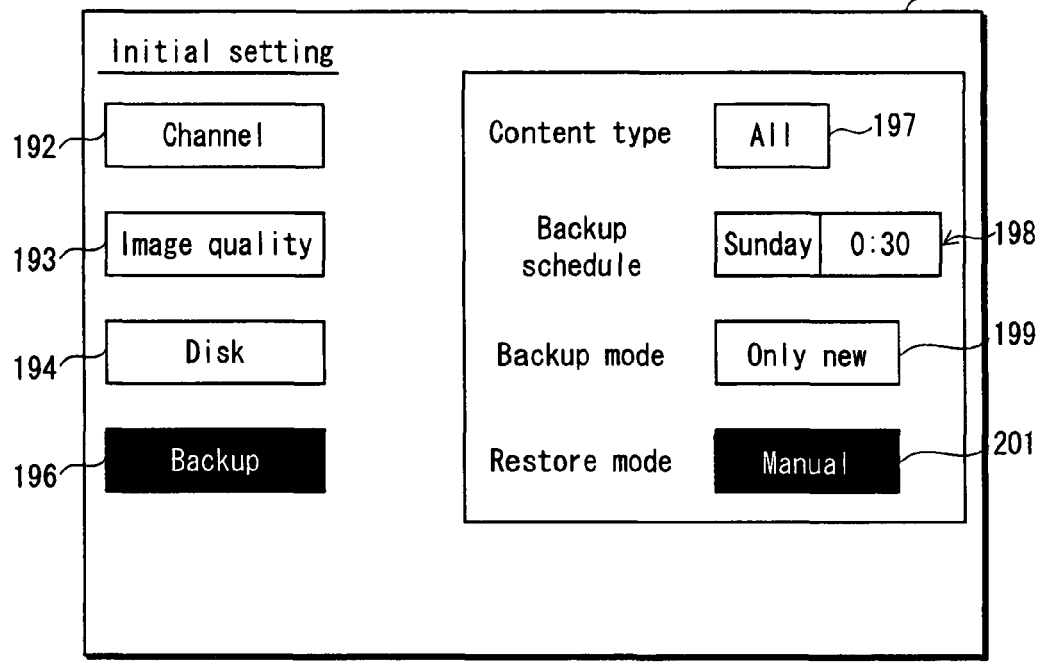
Initial setting screen
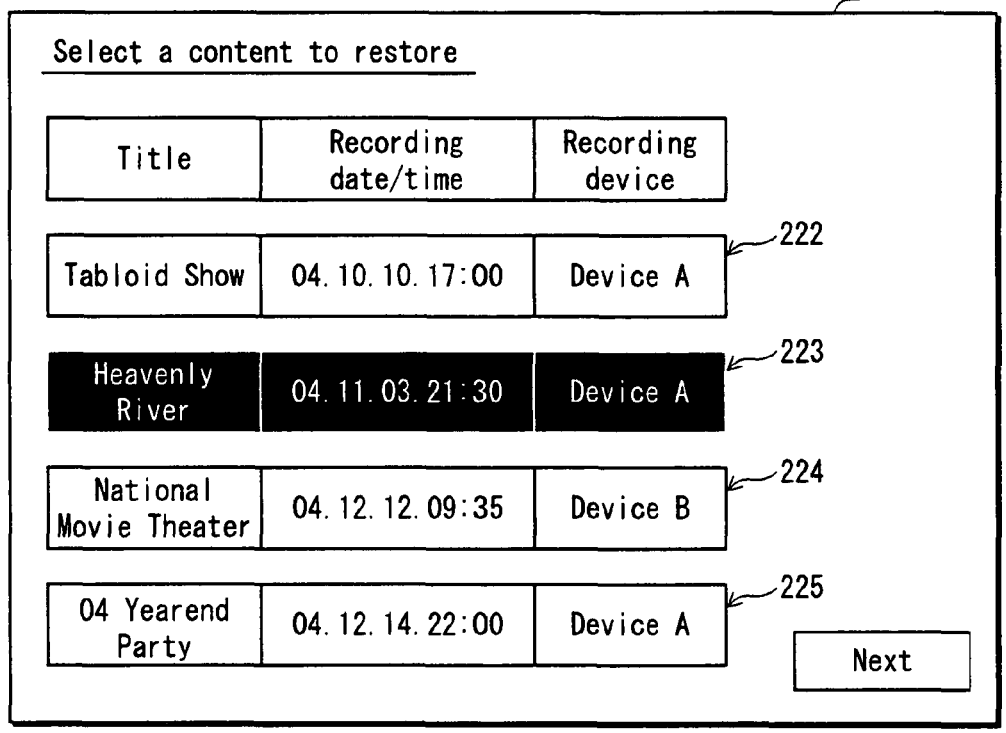
Restore information screen

FIG. 11

| Content ID | Title | Recording date/time | Backup source device ID | Hash value |
|---|---|---|---|---|
| A001 | Tabloid Show | 04.10.10.17:00 | ID_A | 01c |
| A002 | Heavenly River | 04.11.03.21:30 | ID_A | 02c |
| B005 | National Movie Theater | 04.12.12.09:35 | ID_B | 05c |
| A003 | 04 Yearend Party | 04.12.14.22:00 | ID_A | 03c |
| ... | ... | ... | ... | ... |

BACKUP SYSTEM, RECORDING/REPRODUCTION DEVICE, BACKUP DEVICE, BACKUP METHOD, PROGRAM, AND INTEGRATED CIRCUIT

TECHNICAL FIELD

The present invention relates to a technology for generating a backup of a digital content, with copyright protection of the digital content taken into account.

BACKGROUND ART

Digital broadcasting for broadcasting digital contents has started in recent years. Digital contents hardly deteriorate in quality in use. As a result, for the purpose of protecting the copyright, Copy Control Information (CCI), which indicates whether a copy of the content is permitted to be made, and in case of being permitted, the number of copies permitted to be made, is attached to the digital contents. In many cases, the CCI indicates that copying is permitted only once (Copy Once). When a content containing CCI indicating Copy Once is recorded on a recording medium, the CCI is rewritten to indicate that copying thereafter is not permitted (No More Copy). A content containing CCI indicating No More Copy cannot be copied, but can be moved to another medium.

Operation in an unauthorized manner can be performed even on a content containing the CCI. For example, a content recorded on a hard disk recorder (hereinafter referred to as HD recorder) might be operated in an unauthorized manner using a personal computer while the HD recorder is powered off. There is known a technology for preventing such an unauthorized copying by preliminarily calculating unauthorized operation detection information by substituting a content recorded on the HDD into a one-way function, then after the HD recorder is powered on, generating verification information by substituting the content recorded on the HDD into the one-way function, and detecting an unauthorized use of the content by comparing the generated verification information with the stored unauthorized operation detection information.

There is also known a technology intended to improve the convenience of the user by storing a content temporarily, and deleting the content after a predetermined period passes or after the content is played back, thereby realizing a "shift playback" of a content containing CCI indicating that copying is prohibited.

On the other hand, users can record digital broadcast contents on the HD recorder without minding the storage capacity, and can view the recorded contents with simple operations, since the HDD has a large capacity and a random access is available with the HDD.

SUMMARY OF THE INVENTION

The Problems the Invention is Going to Solve

However, although the HDD is convenient, it requires rotation and seek operations for each writing or reading of information. Accordingly, increase in the use frequency of the HDD causes a defect occurrence rate to increase. If the HDD has a defect, the data recorded thereon might be lost. It is considered that making a backup of a content on another storage medium or a recording device is effective in preventing the data from being lost due to a defect of the HDD. However, even if it is for the purpose of making a backup, if a content containing CCI indicating Copy Once is moved to another medium, the content is deleted from the HD recorder. This reduces the convenience for the user.

Further, if making a copy of a content is permitted for the purpose of making a backup thereof, a malicious user may copy the content in an unauthorized manner by using this function. When this happens, the right of the copyright owner cannot be protected fully.

The object of the present invention is therefore to provide a backup system, recording/playback device, backup device, backup method, program, and recording medium that can make a backup of a content, while balancing between the protection of the copyright and the convenience of the user.

Means to Solve the Problems

The above-stated object is fulfilled by a backup system comprising a backup device and a recording/playback device for recording and playing back a content, wherein the recording/playback device includes: a storage unit storing the content; a receiving unit operable to receive a backup instruction instructing to back up the content; a content transmitting unit operable to, if the receiving unit receives the backup instruction, read the content from the storage unit and transmit the content to the backup device; a writing unit operable to, if the receiving unit receives the backup instruction, write period information to the storage unit in correspondence with the content, wherein the period information indicates a period during which the content being a target of the backup is permitted to be played back; and a playback control unit operable to permit the content to be played back during the period indicated by the period information, and prohibit the content from being played back after the period indicated by the period information ends, and the backup device includes: a content receiving unit operable to receive the content from the recording/playback device; and a backup storage unit operable to store the received content.

In the present document, "backup" means storing a copy of a content into a backup device in case the content stored in an authorized device is lost due to a malfunction or a defect. Ordinarily, the recording/playback device uses the content that is stored in itself. If the content stored in itself is lost, the recording/playback device obtains the copy from the backup device to restore the lost content. It is presumed here that the case where "a content is lost" and the content becomes a target of restoration includes a case where a content is deleted as intended by a user, as well as the cases where a content is lost due to: a defect in the recording/playback device; a defect in the network to which the recording/playback device is connected; a memory shortage in the recording/playback device; and a malfunction. However, if a content is lost due to a transfer thereof to another recording medium or the like by "MOVE", the recording/playback device cannot obtain the content from the backup device.

EFFECTS OF THE INVENTION

With the above-described structure, in which the recording/playback device transmits the content to the backup device, and writes the period information, which indicates a period during which the content being a target of the backup is permitted to be played back, to the storage unit in correspondence with the content, the period during which the recording/playback device can play back the content stored in the storage unit is restricted to the period indicated by the period information. This enables the user to view the content, while the right of the copyright owner is protected. It is therefore possible to store a backup of a content in case of a defect, while protecting the copyright and securing the convenience of the user.

The above-stated object is also fulfilled by a recording/playback device for recording and playing back a content, the recording/playback device comprising: a storage unit storing the content; a receiving unit operable to receive a backup instruction instructing to back up the content; a content transmitting unit operable to, if the receiving unit receives the backup instruction, read the content from the storage unit and transmit the content to the backup device; a writing unit operable to, if the receiving unit receives the backup instruction, write period information to the storage unit in correspondence with the content, wherein the period information indicates a period during which the content being a target of the backup is permitted to be played back; and a playback control unit operable to permit the content to be played back during the period indicated by the period information, and prohibit the content from being played back after the period indicated by the period information ends.

With the above-described structure, in which the recording/playback device transmits the content to the backup device, and writes the period information, which indicates a period during which the content being a target of the backup is permitted to be played back, to the storage unit in correspondence with the content, and the playback control unit prohibits the content from being played back after the period indicated by the period information ends, the period during which the recording/playback device can play back the content stored in the storage unit is restricted to the period indicated by the period information. It is therefore possible to store a backup of a content in case of a defect, while balancing between the protection of the copyright and the convenience of the user.

The above-stated recording/playback device may further comprise: an extension request unit operable to transmit to the backup device an extension request requesting to permit an extension of the period indicated by the period information; and an extension unit operable to receive, from the backup device, extension permission information indicating to permit the extension of the period, and extend the period indicated by the period information.

With the above-described structure, in which the extension unit receives, from the backup device, the extension permission information indicating to permit the extension of the period, and extends the period indicated by the period information. This enables the user to view the content stored in the recording/playback device after the period, which was indicated by the period information when the backup of the content was stored, expires.

Further, with the above-described structure, the recording/playback device transmits the extension request to the backup device, and extends the period indicated by the period information if it receives the extension permission information. Here, the backup device may be set to transmit the extension permission information only if the extension request satisfies a predetermined condition, for example, only if the extension request has been transmitted from a device that conforms to a predetermined standard. With such a structure, it is possible to restrict the device, which is permitted to extend the period of the period information, to a device that satisfies a predetermined condition.

In the above-stated recording/playback device, the extension request unit transmits the extension request a predetermined time period earlier than a point of time when the period indicated by the period information ends.

With the above-described structure, in which the extension request unit transmits the extension request a predetermined time period earlier than a point of time when the period indicated by the period information ends, the period, during which the user can view the content with the recording/playback device, never expires.

In the above-stated recording/playback device, the extension request unit may transmit the extension request repeatedly at regular intervals during the period indicated by the period information.

With the above-described structure, in which the extension request unit transmits the extension request repeatedly even if a transmission fails due to a certain malfunction, it is possible to extend the period indicated by the period information, in a secured manner.

In the above-stated recording/playback device, the extension unit may extend the period indicated by the period information by receiving the extension permission information that indicates another period that is later than the period indicated by the period information stored in the storage unit, and rewriting the period indicated by the period information to the another period indicated by the extension permission information.

With the above-described structure, in which the extension unit extends the period indicated by the period information by rewriting the period to another period indicated by the received extension permission information, it is possible to extend the period indicated by the period information, quickly and easily.

In the above-stated recording/playback device, the extension unit may preliminarily store an extension time period, and extend the period indicated by the period information by adding the extension time period to the period indicated by the period information.

In the case of a home network or an in-company LAN, the backup device receives the extension request from each device connected to the network, judges whether to permit the requested extension, and transmits the extension permission information according to the judgment result.

In the above-described structure, the extension unit preliminarily stores an extension time period, and extends the period indicated by the period information by adding the extension time period to the period indicated by the period information. With this structure in which the recording/playback device performs a calculation of adding the extension time period to the period, it is possible to reduce the process performed by the backup device. Further, with this structure of the present invention in which the recording/playback device performs calculations concerning the management and extension of the extension time period to the period, there is no need for the backup device to have a clock that is protected from external operations.

In the above-stated recording/playback device, the period information may indicate a point of time when a period, during which the content stored in the storage unit is permitted to be played back, ends, and the playback control unit permits the content to be played back if a current time is earlier than the point of time indicated by the period information, and prohibits the content from being played back if the current time is later than the point of time indicated by the period information.

With the above-described structure, it is possible to determine easily whether to permit or prohibit a playback of the content, by comparing the current time with period end time.

In the above-stated recording/playback device, the period information may be composed of (i) a permission time period that indicates a length of time during which the content stored in the storage unit is permitted to be played back and (ii) a start time that indicates a point of time at which a period, during which the content is permitted to be played back, starts, and the playback control unit obtains an elapsed time since the start time, permits the content to be played back if the obtained elapsed time is not greater than the permission time period, and prohibits the content from being played back if the obtained elapsed time is greater than the permission time period.

In the above-described structure, the period information is composed of (i) a permission time period that indicates a length of time during which the content stored in the storage unit is permitted to be played back and (ii) a start time that indicates a point of time at which a period, during which the content is permitted to be played back, starts. Here, it is considered that the period indicated by the period information is a predetermined time period starting from a point of time when a backup of the content is stored in the backup device. Accordingly, with this structure, the writing unit can obtain a current time at a point of time when the instruction is received, and set the obtained current time to the start time. This provides an easy way to obtain and write the start time into the storage unit.

In the above-stated recording/playback device, the playback control unit may prohibit the content from being played back by deleting the content from the storage unit.

With the above-described structure in which the playback control unit deletes the content from the storage unit, it is possible, in an assured manner, to prohibit the content from being played back after the period indicated by the period information ends.

The above-stated recording/playback device may further comprise: a restore instruction obtaining unit operable to obtain a restore instruction that instructs to obtain the content stored in the backup device; a restore request unit operable to, if the restore instruction obtaining unit obtains the restore instruction, transmit to the backup device a transmission request that requests the backup device to transmit the content stored in the backup device; and a restore unit operable to receive the content from the backup device and write the received content into the storage unit, wherein after the content is written into the storage unit, the writing unit writes the period information to the storage unit in correspondence with the content, wherein the period information indicates a period during which the content, which was written into the storage unit by the restore unit, is permitted to be played back.

With the above-described structure in which the restore unit receives the content from the backup device and writes the received content into the storage unit, the user can view the content again.

Further, with the above-described structure in which, after the content is received, the writing unit writes the period information to the storage unit in correspondence with the content, wherein the period information indicates a period during which the content is permitted to be played back, the period during which the content can be played back by the recording/playback device can be restricted to the period indicated by the period information.

In the above-stated recording/playback device, the content stored in the storage unit may include an encrypted work and a decryption key, the encrypted work having been generated by encrypting a digital work using an encryption key, the decryption key being used for decrypting the encrypted work, and the playback control unit prohibits the content from being played back by deleting the decryption key contained in the content.

With the above-described structure in which the encrypted work included in the content is generated by encrypting the digital work using the encryption key, even if an unauthorized user copies the encrypted work, the unauthorized user cannot generate the digital work without the decryption key. This makes it possible to prevent an unauthorized playback of the content.

The above-stated recording/playback device may further comprise: a restore instruction obtaining unit operable to obtain a restore instruction that instructs to obtain the decryption key stored in the backup device; a restore request unit operable to, if the restore instruction obtaining unit obtains the restore instruction, transmit to the backup device a transmission request that requests the backup device to transmit the decryption key stored in the backup device; and a restore unit operable to receive the decryption key from the backup device and write the received decryption key into the storage unit, wherein when the decryption key is written into the storage unit, the writing unit writes the period information to the storage unit in correspondence with the content, wherein the period information indicates a period during which the content stored in the storage unit, is permitted to be played back.

With the above-described structure in which the restore unit receives the decryption key from the backup device and writes it into the storage unit, the user can view the content stored in the recording/playback device again. Further, with the above-described structure in which the writing unit writes the period information to the storage unit in correspondence with the content, wherein the period information indicates a period during which the content is permitted to be played back, the period during which the content can be played back by the recording/playback device can be restricted to the period indicated by the period information.

In the above-stated recording/playback device, the content stored in the storage unit may include an encrypted work and an encrypted key, the encrypted work having been generated by encrypting a digital work using an encryption key, the encrypted key having been generated by encrypting a decryption key, which is used for decrypting the encrypted work, using a unique key that is unique to the recording/playback device, and the playback control unit prohibits the content from being played back by deleting the encrypted key from the storage unit.

With the above-described structure in which the content stored in the storage unit includes the encrypted key having been generated by encrypting the decryption key and includes the encrypted work having been generated by encrypting the digital work using the encryption key, even if the content is copied, the content cannot be played back without the unique key. This makes it possible to prevent an unauthorized playback of the content by a third party.

In the above-stated recording/playback device, the content stored in the storage unit may include backup information that indicates a permission or a prohibition of a backup, the content transmitting unit judges whether the backup information indicates the permission or the prohibition of the backup, and transmits the content if it is judged that the backup information indicates the permission of the backup, and the writing unit judges whether the backup information indicates the permission or the prohibition of the backup, and writes the period information if it is judged that the backup information indicates the permission.

With the above-described structure in which the content is attached, by the creator, with the backup information that indicates a permission or a prohibition of a backup and the content transmitting unit transmits the content only if the backup information indicates the permission of the backup, it is possible to reflect the willingness of the creator of the content, with regard to backup of the content.

In the above-stated recording/playback device, the content transmitting unit may generate an encrypted content by encrypting the content using a communication key, and transmits the encrypted content safely.

With the above-described structure, it is possible to prevent the content from being intercepted by an unauthorized third party.

The above-stated recording/playback device may further comprise: a detection information storage unit storing detection information that is generated by performing a predetermined calculation on the content; and an unauthorized use prohibition unit operable to read the content from the storage unit, generate verification information by performing the predetermined calculation on the content read from the storage unit, compare the generated verification information with the detection information, and prohibit the content from being used if the generated verification information does not match the detection information.

In the above-described structure, the unauthorized use prohibition unit compares the verification information with the detection information that are both generated by the same calculation. When this calculation is performed using a one-way function, the verification information and the detection information do not match each other if even a part of the content has been changed. Accordingly, with this structure, it is possible to detect a tampered content easily, and prevent a playback of the content that was tampered by a malicious third party.

In the above-stated recording/playback device, the backup device may store another content as a result of an execution of a backup instruction by a device other than the recording/playback device, the recording/playback device further comprising: a restore instruction obtaining unit operable to obtain a restore instruction that instructs to obtain the another content; a content request unit operable to, if the restore instruction obtaining unit obtains the restore instruction, transmit to the backup device a transmission request that requests the backup device to transmit the another content; and a restore unit operable to receive the another content from the backup device and write the received another content into the storage unit, wherein when the another content is received, the writing unit writes the period information to the storage unit in correspondence with the another content, wherein the period information indicates a period during which the another content is permitted to be played back.

In the above-described structure, the restore unit receives the another content from the backup device and writes the received another content into the storage unit. This makes it possible for, for example, devices that belong to a home network or an in-company LAN to share the same content. This enables the user to view the same content with any of devices that are installed in different rooms, thus improving the convenience of the user.

Further, with the above-described structure in which, after the content is written in the storage unit, the writing unit writes the period information to the storage unit in correspondence with the content, wherein the period information indicates a period during which the content is permitted to be played back, the period during which the content can be played back by each device having the content can be restricted to the period indicated by the period information.

The above-stated object is also fulfilled by a backup device for storing a content as a backup, the backup device comprising: a storage unit storing the content; an extension request receiving unit operable to receive an extension request from a recording/playback device, the extension request requesting to permit an extension of a period during which a content stored in the recording/playback device is permitted to be played back; a judging unit operable to judge whether or not to permit the extension; and a permission unit operable to output, to the recording/playback device, extension permission information indicating to permit the extension of the period, if the judging unit judges to permit the extension.

With the above-described structure in which the permission unit outputs the extension permission information indicating to permit the extension of the period, if the judging unit judges to permit the extension, only devices that satisfy a predetermined condition can extend the period indicated by the period information during which the content can be played back, and unauthorized devices that do not satisfy the predetermined condition cannot extend the period. It is accordingly possible to stop a playback of the content performed by a device not satisfying the condition after the period indicated by the period information ends.

In the above-stated backup device, the storage unit may further store identification information for identifying the content, in correspondence with the content, the extension request receiving unit receives the extension request that contains content identification information that identifies the content stored in the recording/playback device, and the judging unit compares the content identification information with the identification information stored in the storage unit, and judges to permit the extension if the content identification information matches the identification information.

In the above-described structure, the judging unit judges to permit the extension if the content identification information matches the identification information stored in the storage unit. With this structure, if the content stored in the backup device is moved and becomes no longer a backup prepared in case of an occurrence of a defect, the period indicated by the period information cannot be extended, and once the period expires, the recording/playback device cannot play back the content. The above-described structure therefore prevents any of the content moved from the backup device by a malicious user and the content stored in the recording/playback device, from becoming viewable.

In the above-stated backup device, the extension request may contain device identification information that identifies the recording/playback device that outputs the extension request, and the judging unit preliminarily stores one or more pieces of approved device identification information that respectively identify one or more predetermined devices, and judges to permit the extension if the device identification information contained in the received extension request matches any of the one or more pieces of approved device identification information.

With the above-described structure in which the judging unit judges to permit the extension if the device identification information contained in the received extension request matches any of the one or more pieces of approved device identification information, it is possible to extend the period indicated by the period information so as to extend the period during which only a predetermined device is permitted to play back the content, and to prohibit the extension of the period during which the other devices are permitted to play back the content.

In the above-stated backup device, the storage unit may further store detection information in correspondence with the content, the detection information being generated by performing a predetermined calculation on the content, and the judging unit reads the content from the storage unit, generates verification information by performing the predetermined calculation on the content read from the storage unit, compares the generated verification information with the detection information, and judges to permit the extension if the generated verification information matches the detection information.

In the above-described structure, the judging unit compares the verification information with the detection information stored in the storage unit that are both generated by performing the same calculation on the content, and judges to permit the extension if they match each other. A use of a one-way function in this calculation facilitates the detection of a tampered content. Accordingly, with this structure, if a backup of a content stored in the backup device is tampered, the period during which the recording/playback device is permitted to play back the content is not extended. This makes it possible to restrict the period during which the content can be played back.

In the above-stated backup device, the permission unit may output the extension permission information that indicates another period that is later than the period indicated by the period information.

With the above-described structure in which the permission unit outputs the extension permission information that indicates another period that is later than the period indicated by the period information, the recording/playback device can quickly extend the period by replacing the period in the period information with the another period indicated by the extension permission information.

Further, in the above-described structure, the backup device sets the another period indicated by the extension permission information. This makes it possible for the backup device to manage all periods during which a plurality of devices are permitted to play back the content.

The above-stated backup device may further comprise: a restore receiving unit operable to receive a transmission request requesting the backup device to transmit the content stored in the storage unit; a restore judging unit operable to judge whether or not to transmit the content; and a restore transmitting unit operable to, if the restore judging unit judges to transmit the content, read the content from the storage unit and transmit the read content.

With the above-described structure in which the restore transmitting unit reads the content from the storage unit and transmits the read content if the restore judging unit judges to transmit the content, only devices that satisfy a predetermined condition can obtain the content for users to enjoy viewing the content, and it is possible to prevent devices that do not satisfy the predetermined condition from playing back the content.

In the above-stated backup device, the transmission request may contain restore device identification information that identifies a restore device that is a transmission source of the transmission request, and the restore judging unit preliminarily stores one or more pieces of approved device identification information that respectively identify one or more predetermined devices, and judges to transmit the content if the restore device identification information matches any of the one or more pieces of approved device identification information.

With the above-described structure in which the restore judging unit judges to transmit the content if the restore device identification information matches any of the one or more pieces of approved device identification information that are preliminarily stored, it is possible to restrict devices that can obtain the content to predetermined devices that are preliminarily registered.

In the above-stated backup device, one of the one or more pieces of approved device identification information may indicate a backup source device, which instructed the backup device to store, as a backup, the content stored in the storage unit, and the restore judging unit judges to transmit the content if the restore device identification information matches the piece of approved device identification information indicating the backup source device.

With the above-described structure, it is possible to restrict devices that can obtain the content to backup source devices that instructed the backup device to store, as a backup, the content stored in the storage unit.

In the above-stated backup device, the restore judging unit may preliminarily store a copy number and a copy permission number, the copy number indicating a total number of devices that each store a content that is identical with the content stored in the storage unit and is permitted by the backup device to be played back, the copy permission number indicating an upper limit value of the copy number, and the restore judging unit judges to transmit the content if the copy number is smaller than the copy permission number.

With the above-described structure in which the restore judging unit judges to transmit the content if the copy number is smaller than the copy permission number, it is possible to restrict the total number of devices that have the same content to a number that is smaller than the copy permission number.

The above-stated backup device may further comprise: a period information storage unit storing device identification information and copy period information in correspondence with each other, the device identification information indicating a device that stores a content that is identical with the content stored in the storage unit and is permitted by the backup device to be played back, the copy period information indicating a period during which the content is permitted to be played back in the device; and a copy number management unit operable to subtract "1" from the number of copies if the period indicated by the copy period information ends.

In the above-described structure, the copy number management unit subtracts "1" from the number of copies if the period indicated by the copy period information ends. Accordingly, with this structure, if a period during which a device is permitted to play back the content ends, the backup device can output the content to another device.

In the above-stated backup device, the content stored in the storage unit may preliminarily store the number of permitted copies, and the restore judging unit obtains the number of permitted copies from the content.

The creator of the content can create the content that includes an arbitrary number of permitted copies. Accordingly, with the above-described structure, the judging unit can make a judgment that reflects the willingness of the content creator, by using the number of permitted copies that is obtained from the content.

In the above-stated backup device, the restore transmitting unit may generate an encrypted content by encrypting the content using a communication key, and transmits the encrypted content safely.

This structure makes it possible to prevent the content from being intercepted by an unauthorized third party. With the above-described structure, In the above-stated backup device, the recording/playback device may output activation instruction information instructing an activation, to the backup device prior to the extension request, and the backup device further comprises a power control unit operable to, if the activation instruction information is received, start supplying power to each circuit constituting the backup device.

It is preferable that the backup device is operated for a short period when the role of the backup device, that is, to store a backup of a content in case of an occurrence of a defect, is taken into account. With the above-described structure in which the power control unit starts supplying power to each circuit constituting the backup device if the activation instruction information is received, it is possible to reduce the operation time of the backup device and reduce the probability that the defect occurs in the hard disk unit constituting the storage unit.

BRIEF DESCRIPTION OF THE DRAWING

FIG. 4 shows details of the content management table 121.

FIGS. 6A and 6B show examples of the menu screen 181 and the playback list screen 211 displayed on the monitor 120.

FIGS. 7A and 7B show examples of the initial setting screen 191 and the restore information screen 221 displayed on the monitor 120.

FIG. 11 shows details of the backup management table 521.

Figure 1:
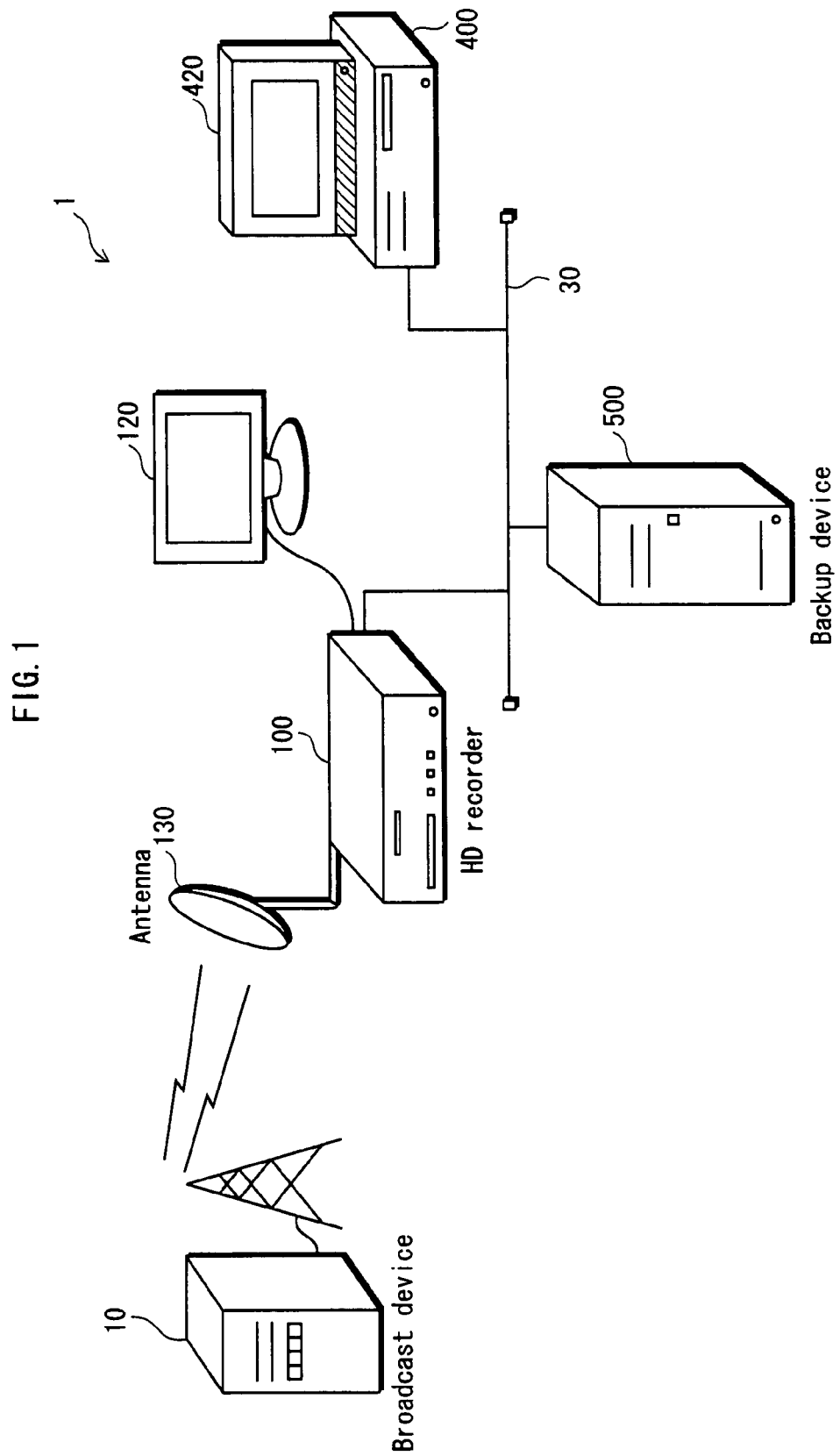
FIG. 1 is a structure diagram showing the structure of the backup system 1 in Embodiment 1.

DESCRIPTION OF CHARACTERS 1 backup system 1
10 broadcast device
100 HD recorder
101 transmission/reception unit
102 authentication unit
103 input unit
104 playback control unit
105 decoding unit
106 key generating unit
107 control unit
108 unique information storage unit
109 encryption processing unit
110 information storage unit
112 input/output unit
113 secure storage unit
114 broadcast receiving unit
120 monitor
400 HD recorder
500 backup device
501 transmission/reception unit
502 authentication unit
503 power source unit
504 unique information storage unit
507 control unit
509 encryption processing unit
510 content storage unit 510
511 secure information storage unit
512 input unit
513 display unit 513

DETAILED DESCRIPTION OF THE INVENTION

1. Embodiment 1

A backup system 1 of Embodiment 1 of the present invention will be described with reference to the drawings.
1.1 Outline of Backup System 1

The backup system 1 of the present invention, as shown in FIG. 1, includes a hard disk recorder (hereinafter referred to as HD recorder) 100, an HD recorder 400, and a backup device 500. The HD recorder 100, the HD recorder 400, and the backup device 500 are connected with each other via a LAN (Local Area Network) 30.

The HD recorder 100 obtains a content composed of video and audio, by receiving a broadcast wave transmitted from a broadcast device 10, and stores the obtained content. The HD recorder 100 can also obtain a content from an external recording medium such as a DVD attached thereto.

The HD recorder 100 transmits a stored content to the backup device 500 in accordance with a user operation, and sets an expiration time to each content stored therein.

The backup device 500 receives a content from the HD recorder 100, and stores the received content.

Also, the HD recorder 100 may request the backup device 500 to extend the expiration time as the time approaches the expiration time.

Upon receiving a request to extend an expiration time of a content from the HD recorder 100, the backup device 500 confirms that the content specified by the received request is normally stored, and permits the expiration time to be extended as requested by the HD recorder 100.

After the backup device 500 permits the expiration time to be extended, the HD recorder 100 extends the expiration time stored in the HD recorder 100 itself. When the extension of the expiration time is not permitted, or when the HD recorder 100 fails to communicate with the backup device 500 due to some malfunction of the LAN 30 or the like, the HD recorder 100 deletes the content when the time reaches the expiration time. After deleting the content, upon receiving a user operation or the like, the HD recorder 100 obtains a backup of the content that has been stored in the 500 from the backup device 500, and newly sets an expiration time.

The HD recorder 100 can also obtain a content that was transmitted by the HD recorder 400 to the backup device 500, as well as a content that was transmitted by the HD recorder 100 itself to the backup device 500.

The HD recorder 400 as well as the HD recorder 100, receives, stores, and plays back a content containing a broadcast program, and transmits the received content to the backup device 500.

1.2 HD Recorders 100 and 400

Figure 2:
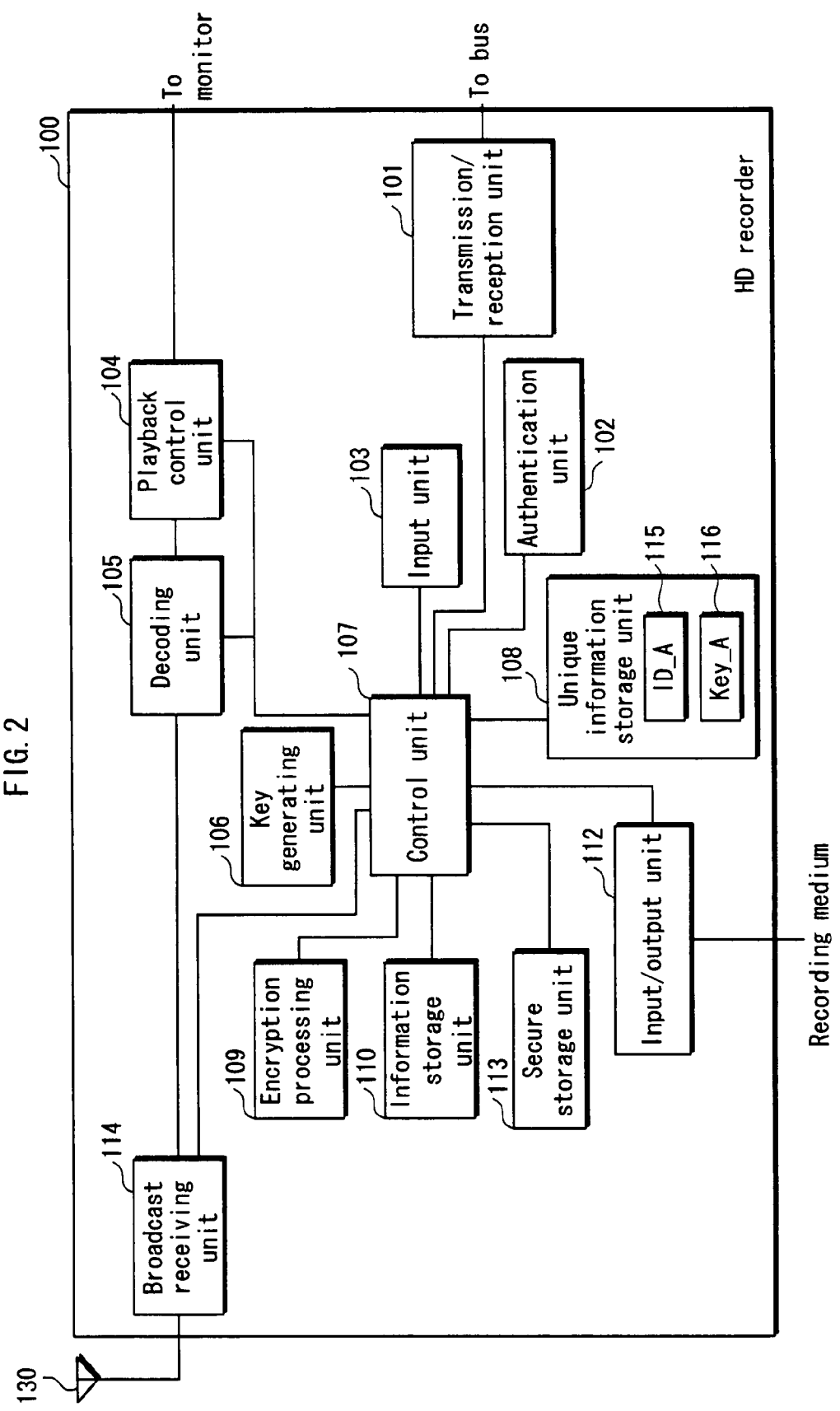
FIG. 2 is a block diagram showing the structure of the HD recorder 100.

As shown in FIG. 2, the HD recorder 100 includes a transmission/reception unit 101, an authentication unit 102, an input unit 103, a playback control unit 104, a decoding unit 105, a key generating unit 106, a control unit 107, a unique information storage unit 108, an encryption processing unit 109, an information storage unit 110, an input/output unit 112, a secure storage unit 113, a broadcast receiving unit 114, and an antenna 130.

The HD recorder 100 is more specifically a computer system including a microprocessor, a RAM, and a ROM. A computer program is recorded in the RAM and ROM. The HD recorder 100 achieves part of its functions as the microprocessor operates in accordance with the computer program.

It should be noted here that description of the HD recorder 400 is omitted since the HD recorder 400 is structured in the same manner as the HD recorder 100.

(1) Unique Information Storage Unit 108

The unique information storage unit 108 consists of a ROM, and stores a device identifier 115 "ID_A" and a device unique key 116 "Key_A". Also, the unique information storage unit 108 is provided with a protection mechanism, and is protected from accesses by external devices.

The device identifier 115 "ID_A" is information that identifies the HD recorder 100 uniquely. The device unique key 116 "Key_A" is key information unique to the HD recorder 100. These information are written to the unique information storage unit 108 before the HD recorder 100 is shipped.

(2) Information Storage Unit 110

Figure 3:
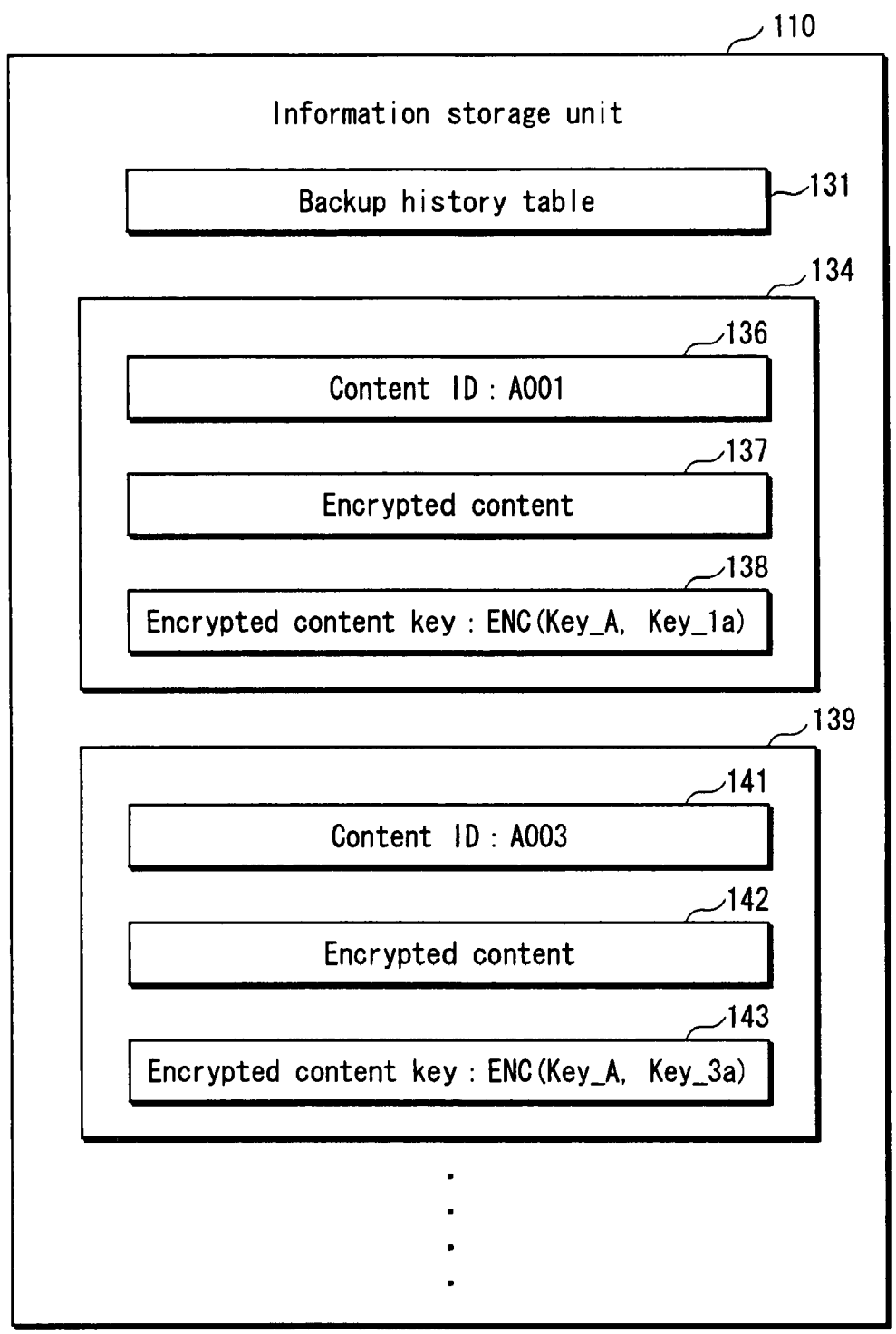
FIG. 3 shows an example of information stored in the information storage unit 110.

The information storage unit 110 consists of a hard disk unit. As one example, the information storage unit 110 stores a backup history table 131, content files 134, 139, . . . shown in FIG. 3. Each content file includes a content ID, an encrypted content, and an encrypted content key. The content ID is identification information that uniquely identifies the encrypted content. The encrypted content is generated by applying an encryption algorithm E1 to a content obtained from the broadcast device 10 or an external recording medium. Here, the content contains image data and audio data that have been compressed by a compression method such as MPEG2.

The encrypted content key is generated by applying an encryption algorithm E1 to a content key that is used to encrypt the content, using a device unique key 116 "Key_A" stored in the unique information storage unit 108. The content key and the content correspond to each other on a one-to-one basis. One example of the encryption algorithm E1 is DES (Data Encryption Standard).

For example, a content file 134 includes a content ID 136 "A001", an encrypted content 137, and an encrypted content key 138 "Enc(Key_A,Key_1a)". The content ID 136 "A001" is ID information identifying the encrypted content 137. The encrypted content 137 is generated by applying the encryption algorithm E1 to a content that includes an image, using a content key "Key_1a". The encrypted content key 138 "Enc(Key_A,Key_1a)" is generated by applying the encryption algorithm E1 to the content key "Key_1a", using the device unique key 116 "Key_A" stored in the unique information storage unit 108. The content key "Key_1a" and the content, from which the encrypted content 137 is generated, correspond to each other on a one-to-one basis.

The backup history table 131 includes (a) a date/time at which the HD recorder 100 performed a backup to the backup device 500 and (b) content IDs of all the content files that were stored in the information storage unit 110 at the time of the backup, in correspondence with each other.

The backup history table 131 also store various types of image data such as a menu screen and an initial setting screen.

(3) Secure Storage Unit 113

The secure storage unit 113 is provided with a flash memory, and is protected from accesses by external devices.

The secure storage unit 113 stores, as one example, a content management table 121 shown in FIG. 4. As shown in FIG. 4, the content management table 121 includes a plurality of pieces of content information 122, 123, 124, . . . . Each piece of content information includes a content ID, a title, a recording date/time, a hash value, a type, a compression method, an expiration time, a backup flag, and a priority, and corresponds to a content file stored in the information storage unit 110, on a one-to-one basis.

The content ID is information for identifying an encrypted content included in the corresponding content file, and is identical with a content ID that is included in the corresponding content file.

The title is a name of the corresponding encrypted content, and has not been written at the time when a source content, from which the encrypted content is generated, is obtained from the broadcast device 10 or an external recording medium.

The recording date/time indicates a date and time when the source content of the encrypted content contained in the corresponding content file was obtained from the broadcast device 10 or an external recording medium. The type is information indicating a route via which the content was obtained. For example, a type "broadcast program" indicates that the content was received from the broadcast device 10, and a type "photo" indicates that the content is image data that was recorded by a digital camera or the like. The compression method indicates a name of a compression method that is used for compressing images and audio constituting the content.

The "hash value" in the content information indicates a hash value that is generated by combining an encrypted content key and the encrypted content included in the corresponding content file and substituting the combination into a hash function. One example of the hash function used here is SHA-1.

The expiration time indicates a year, month, day, and time at which a period, during which the HD recorder 100 can use the corresponding encrypted content, ends.

The backup flag indicates a flag that shows whether or not the corresponding encrypted content has been backed up to the backup device 500, and takes a value "1" or "0". The flag with the value "1" indicates that the corresponding encrypted content has been backed up, and the value "0" indicates that the corresponding encrypted content has not been backed up.

The priority is information that indicates a priority of the content in being stored, and takes a value "1" or "0". When the information storage unit 110 does not have enough free space to newly store an encrypted content, the control unit 107 deletes a piece of content information having priority "2" and a content file corresponding thereto, to secure the free space. Even if the information storage unit 110 does not have enough free space to newly store an encrypted content, the control unit 107 does not delete content information having priority "1" and content files corresponding thereto. The priority is automatically set to "1" when a content is obtained, but can be changed by a user operation.

For example, content information 122 corresponds to a content file 134 stored in the information storage unit 110. A content ID 151 "A001" is ID information that indicates the encrypted content 137, and is identical with a content ID 136 "A001". A title 152 "Tabloid Show" is a name that was input by the user for the encrypted content 137. A recording date/time 153 "04.10.10.17:00" indicates that the encrypted content 137 was generated by encrypting a content that was obtained at 17:00 on Oct. 10, 2004. A hash value 154 "01a" is generated by combining the encrypted content 137 and the encrypted content key 138 "Enc(Key_A,Key_1a)" and substituting the combination into a hash function. An expiration time 157 "04.12.15.17" indicates that the HD recorder 100 can decode and play back the corresponding encrypted content 137 until 17:00 on Dec. 15, 2004.

(4) Antenna 130, Broadcast Receiving Unit 114, Decoding Unit 105

The antenna 130 receives a broadcast wave transmitted from the broadcast device 10.

The broadcast receiving unit 114 is provided with a tuner, a modulation/demodulation unit, a transport decoder and the like, selects one from among broadcast waves received by the antenna 130, generates TS (Transport Stream) packets by converting the selected broadcast wave into a digital signal, and outputs the generated TS packets in sequence in the order of generation, to the decoding unit 105.

The broadcast receiving unit 114 also receives from the control unit 107 a recording instruction that instructs to record a content that is currently being received. Upon receiving the recording instruction, the broadcast receiving unit 114 outputs the generated TS packets to the control unit 107 in sequence in the order of generation. The broadcast receiving unit 114 continues to output the TS packets until it receives an end notification from the control unit 107.

It should be noted here that each content that the HD recorder 100 obtains from the broadcast device 10 includes a plurality of TS packets. The following description will not refer to the TS packets that constitute each content unless required, but will merely refer to contents.

The decoding unit 105, in accordance with an instruction received from the control unit 107, generates image data and audio data by decompressing a content, which was obtained by the broadcast receiving unit 114 or generated by the encryption processing unit 109 (which will be described later), in accordance with a compression method such as MPEG (Moving Picture Experts Group) 2 or JPEG (Joint Photographic Experts Group) which was used to generated the content, and outputs the generated image data and audio data to the playback control unit 104.

Description of MPEG2 and JPEG is omitted since they are known technologies.

(5) Transmission/Reception Unit 101

The transmission/reception unit 101, connected to the LAN 30, performs transmission/reception of information between (a) the control unit 107 and the authentication unit 102 and (b) an external device. Here, the external device is the backup device 500.

(6) Authentication Unit 102

The authentication unit 102 preliminarily stores a secret key SK_A that is unique to the HD recorder 100, a public key certificate Cert_A, a public key PK_CA of a certificate authority, and a CRL (Certificate Revocation List). The public key certificate Cert_A certifies the authenticity of the public key PK_A that corresponds to the secret key SK_A, and includes a certificate ID number, the public key PK_A, and signature data of the certificate authority. The signature data of the certificate authority is generated by applying a signature generation algorithm S to at least the public key PK_A, using a secret key SK_CA of the certificate authority. One example of the signature generation algorithm S is an Elgamal signature on a finite field. Description of the Elgamal signature is omitted since it is known.

The certificate authority is a fair third party and issues public key certificates for each device constituting the backup system 1 in Embodiment 1.

The CRL contains certificate ID numbers of revoked public key certificates.

The public key PK_CA of a certificate authority is a public key that makes a pair with the secret key SK_CA of the certificate authority.

The authentication unit 102 performs a device authentication with the external device according to an instruction by the control unit 107, based on the DTCP (Digital Transmission Content Protection). The 102 prohibits the communication between the control unit 107 and the external device if the result of the device authentication is unsuccessful. If the result of the device authentication is successful, the authentication unit 102 generates a session key that is common with the external device, and outputs the generated session key to the control unit 107. The operation in the device authentication will be described later in detail.

(7) Input Unit 103

The input unit 103 includes a plurality of buttons such as a power button, a recording button, a menu button, and a selection button, and a reception circuit for receiving from the remote controller.

The input unit 103 receives a button operation or a remote controller operation by the user and outputs operation indication information to the control unit 107, where the operation indication information indicates the received button operation or remote controller operation.

(8) Key Generating Unit 106 and Encryption Processing Unit 109

The key generating unit 106 receives, from the control unit 107, an instruction to generate a content key. Upon receiving the content key generation instruction, the key generating unit 106 generates a pseudo random number, generates a 56-bit content key using the generated pseudo random number, and outputs the generated content key to the control unit 107. It should be noted here that the content key may be generated by any other method.

The encryption processing unit 109 receives an encrypt instruction from the control unit 107, where the encrypt instruction is composed of a plain text and a key. The encryption processing unit 109 also receives a decrypt instruction from the control unit 107, where the decrypt instruction is composed of an encrypted text and a key.

Upon receiving the encrypt instruction, the encryption processing unit 109 generates an encrypted text by applying an encryption algorithm E1 to the received plain text using the received key, and outputs the generated encrypted text to the control unit 107.

Upon receiving the decrypt instruction, the encryption processing unit 109 generates a decrypted text by applying a decryption algorithm D1 to the received encrypted text using the received key, and outputs the generated decrypted text to the control unit 107.

One example of the combination of the plain text and key that the encryption processing unit 109 receives is a content and a content key, or a content key and the device unique key "Key_A". Also, one example of the combination of the encrypted text and key that the encryption processing unit 109 receives is an encrypted content and a content key, or an encrypted content key and the device unique key "Key_A".

The decryption algorithm D1 is an algorithm that decrypts an encrypted text that was generated by applying the encryption algorithm El.

(9) Control Unit 107

Figure 5:
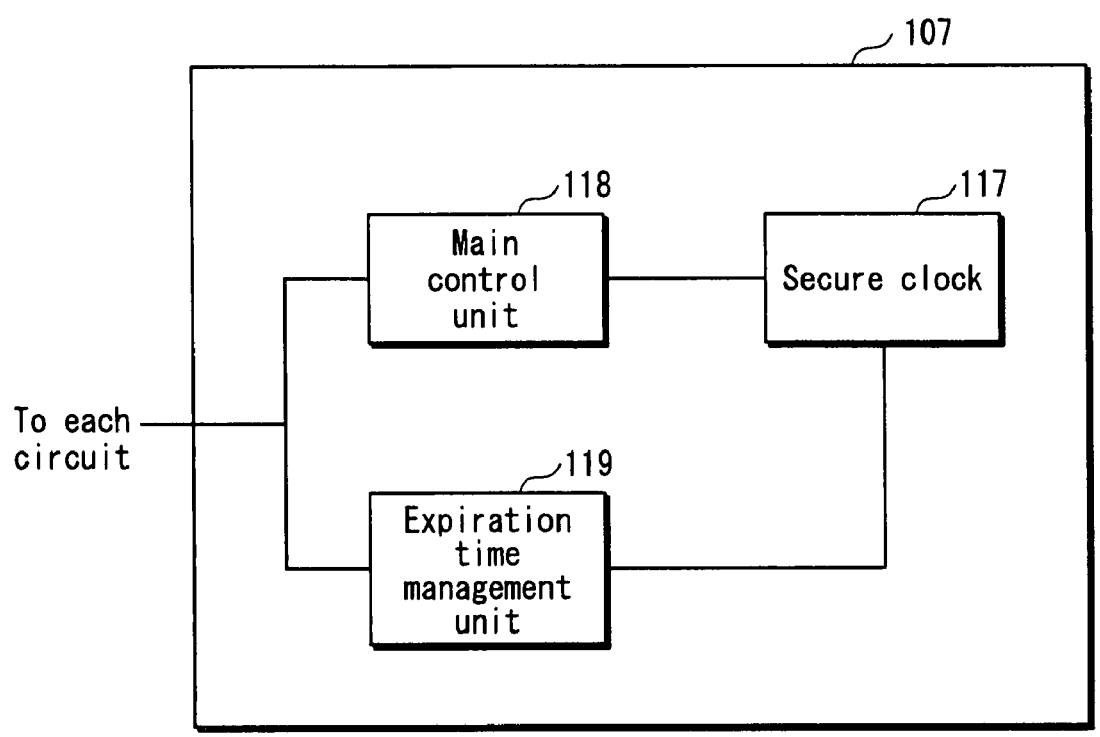
FIG. 5 is a block diagram showing the structure of the control unit 107.

The control unit 107, as shown in FIG. 5, includes a secure clock 117, a main control unit 118, and an expiration time management unit 119.

(a) Secure Crock 117

The secure clock 117 is a clock that measures elapse of time and calculates a current time. The calculated current time includes year, month, day, day of the week, and time.

The secure clock 117 is provided with a protection mechanism, and is protected from being operated by external devices.

(b) Expiration Time Management Unit 119

The expiration time management unit 119 preliminarily stores an extension execution time period "24 hours". The extension execution time period "24 hours" is used as a standard for determining whether or not to request an extension of the expiration time of the encrypted content stored in the HD recorder 100. In the present example, the expiration time management unit 119 requests the backup device 500 to extend the expiration time if the expiration time is to be reached within less than 24 hours.

The expiration time management unit 119 receives, from the main control unit 118, an expiration time extension instruction instructing to extend the expiration time of a content, and a delete instruction instructing to delete an expired content.

(b-1) Expiration Time Extension Process

Upon receiving the expiration time extension instruction, the expiration time management unit 119 selects, one piece by one piece, the content information constituting the content management table 121 stored in the secure storage unit 113, and performs the following process onto the selected content information.

The expiration time management unit 119 reads the expiration time from a selected piece of content information. If the expiration time is not written in the selected piece of content information, the expiration time management unit 119 processes the next piece of content information.

After reading the expiration time, the expiration time management unit 119 obtains a current time from the secure clock, and calculates a difference between the read-out expiration time and the obtained current time. Here, the calculated difference is referred to as a remaining time.

If the calculated remaining time is equal to or more than the extension execution time period "24 hours", the expiration time management unit 119 ends processing the selected piece of content information, and starts processing the next piece of content information.

If the calculated remaining time is less than the extension execution time period "24 hours", the expiration time management unit 119 transmits an activation instruction instructing an activation, to the backup device 500 via the transmission/reception unit 101.

Next, the expiration time management unit 119 receives an activation notification, which indicates the activation has been made, from the backup device 500. It should be noted here that, if the expiration time management unit 119 does not receive the activation notification within a predetermined period, the expiration time management unit 119 ends processing the selected piece of content information, and starts processing the next piece of content information.

Upon receiving the activation notification, the expiration time management unit 119 instructs the authentication unit 102 to perform the device authentication with the backup device 500. When the result of the device authentication by the authentication unit 102 is successful, the expiration time management unit 119 receives a session key, which was generated during the device authentication, from the authentication unit 102. In the following process, the expiration time management unit 119 performs a secret communication with the backup device 500 by encrypting and decrypting information transmitted and received to/from the backup device 500, using the session key. However, description of the process of encrypting and decrypting information is omitted for the sake of simplification.

If the result of the device authentication by the authentication unit 102 is unsuccessful, the expiration time management unit 119 ends processing the selected piece of content information, and starts processing the next piece of content information.

Upon receiving the session key from the authentication unit 102, the expiration time management unit 119 reads the content ID from the selected piece of content information, reads the device identifier 115 "ID_A" from the unique information storage unit 108, and transmits, to the backup device 500 via the transmission/reception unit 101, the read-out content ID and device identifier, and an extension request requesting to extend the expiration time.

Next, the expiration time management unit 119 receives, from the backup device 500 via the transmission/reception unit 101, a new expiration time or an error notification indicating that the extension request cannot be received.

Upon receiving the error notification, the expiration time management unit 119 ends processing the selected piece of content information, and starts processing the next piece of content information.

Upon receiving a new expiration time, the expiration time management unit 119 updates the expiration time contained in the selected piece of content information, and starts processing the next piece of content information.

When it completes the above-described process with respect to each of all pieces of content information, the expiration time management unit 119 outputs, to the main control unit 118, an extension end notification indicating that the expiration time extension process has ended.

(b-2) Delete Process

Upon receiving the delete instruction, the expiration time management unit 119 selects, one piece by one piece, the content information constituting the content management table 121 stored in the secure storage unit 113, and performs the following process onto the selected content information.

The expiration time management unit 119 reads the expiration time from a selected piece of content information. If the expiration time is not written in the selected piece of content information, the expiration time management unit 119 processes the next piece of content information.

After reading the expiration time, the expiration time management unit 119 obtains a current time from the secure clock 117, and compares the read-out expiration time and the obtained current time. If the current time is before the expiration time, the expiration time management unit 119 starts processing the next piece of content information.

If the current time is after the expiration time, the expiration time management unit 119 reads the content ID from the selected piece of content information, and deletes, from the information storage unit 110, a content file that has a content ID that matches the read-out content ID. The expiration time management unit 119 then deletes the selected piece of content information and starts processing the next piece of content information.

When it completes the above-described process with respect to each of all pieces of content information, the expiration time management unit 119 outputs, to the main control unit 118, a delete end notification indicating that the expired content delete process has ended.

(c) Main Control Unit 118

The main control unit 118 preliminarily stores an extension time at which an extension of the execution time is performed. In the present example, the main control unit 118 stores extension time "2:00". The main control unit 118 also stores a time interval "30 minutes" with which a deletion of expired contents is performed. These time information are set when the HD recorder 100 is shipped.

The main control unit 118 receives various types of operation indication information from the input unit 103, and controls various processes depending on the received operation indication information.

More specifically, upon receiving operation indication information indicating a depression of the recording button, the main control unit 118 performs "(c-1) Control on Recording Process" described below.

Upon receiving operation indication information indicating a depression of the menu button, the main control unit 118 generates a menu screen 181 based on the image data stored in the information storage unit 110, outputs the generated menu screen 181 to the playback control unit 104, and instructs to display the menu screen 181. The menu screen 181 includes a playback list display button 182, a restore button 183, a timer reservation button 184, a program lineup display button 185, a content list button 186, a dubbing setting button 187, an initial setting button 188, and a content management button 189. The user selects any of these buttons by depressing a confirmation button after placing the cursor on a desired button by using the direction keys.

Upon receiving operation indication information indicating a selection of the playback list display button 182, the main control unit 118 performs "(c-2) Control on Playback Process" described below. Also, Upon receiving operation indication information indicating a selection of the initial setting button 188, the main control unit 118 performs "(c-3) Initial Setting Process" described below.

Upon receiving operation indication information indicating a selection of any of other buttons, the main control unit 118 performs a process in correspondence with the selected button, such as a timer reservation reception process, a program lineup display process, and a process of inputting/outputting information from/to the external recording medium.

Further, the main control unit 118 monitors the secure clock 117 at constant intervals, and if it judges that the current time indicated by the secure clock 117 has reached the extension time "2:00", the main control unit 118 outputs the expiration time extension instruction to the expiration time management unit 119.

Further, the main control unit 118 measures the time using the secure clock 117, and outputs the delete instruction, which instructs to delete expired contents, to the expiration time management unit 119 every 30 minutes.

The following describes "(c-1) Control on Recording Process", "(c-2) Control on Playback Process", "(c-3) Initial Setting Process", "(c-4) Restore Process", and "(c-5) Backup Process" that are performed by the main control unit 118.

(c-1) Control on Recording Process

Upon receiving operation indication information indicating a depression of the recording button, the main control unit 118 generates a new content ID, and adds apiece of content information containing the generated new content ID to the content management table 121 stored in the secure storage unit 113. Into the newly added piece of content information, the current time is written as the recording date/time, "broadcast program" is written as the type, "MPEG2" is written as the compression method, "0" is written as the backup flag, and "1" is written as the priority.

Next, the main control unit 118 instructs the key generating unit 106 to generate a content key, and receives the generated content key from the key generating unit 106. Upon receiving the content key, the main control unit 118 generates a new content file in the information storage unit 110.

Next, the main control unit 118 outputs the recording instruction to the broadcast receiving unit 114, and receives a content from the broadcast receiving unit 114. The main control unit 118 then outputs the received content key and content to the encryption processing unit 109, and instructs the encryption processing unit 109 to encrypt the content. The main control unit 118 receives the encrypted content from the encryption processing unit 109. The main control unit 118 writes the received encrypted content into a newly generated content file in the information storage unit 110.

As described earlier, each content output from the broadcast receiving unit 114 is composed of a plurality of TS packets. The main control unit 118 continues to repeat receiving the content in units of TS packets, instructing to encrypt the content, and writing the encrypted content, until it receives operation indication information indicating a depression of the stop button. In parallel with this repetition, the main control unit 118 monitors the free space of the information storage unit 110. If it judges that the free space is not enough, the main control unit 118 selects one, which has priority "2", from among pieces of content information constituting the content management table 121, deletes a content file corresponding to the selected piece of content information from the information storage unit 110, and deletes the selected piece of content information from the content management table 121.

If there is no piece of content information having priority "2" in the content management table 121, namely, if there is no content that can be deleted in the information storage unit 110, the main control unit 118 notifies the user that the recording stops due to shortage of storage space, by means of, for example, blinking on and off a lamp.

When the recording stops due to storage space shortage of the information storage unit 110, or when it receives operation indication information indicating a depression of the stop button from the input unit 103, the main control unit 118 outputs an end notification indicating the end of the recording, to the broadcast receiving unit 114.

Next, the main control unit 118 reads the device unique key 116 "Key_A" from the unique information storage unit 108, outputs the read-out device unique key 116 "Key_A" and a content key to the encryption processing unit 109, and instructs the 109 to encrypt the content key. The main control unit 118 then receives the encrypted content key from the encryption processing unit 109, and writes the received encrypted content key and the generated content ID into the generated content file.

Next, the main control unit 118 reads the encrypted content and the encrypted content key from the generated content file, and generates a 160-bit hash value by combining the encrypted content and the encrypted content key and substituting the combination into a hash function. The main control unit 118 writes the generated hash value into the newly added piece of content information.

(c-2) Control on Playback Process

When the user selects the playback list display button 182 by pressing down a corresponding button, the main control unit 118 generates a playback list screen 211 using image data stored in the information storage unit 110, and using titles and recording dates/times contained in each piece of content information constituting the content management table 121, and outputs the generated playback list screen 211 to the playback control unit 104 for display. FIG. 6B shows one example of the generated playback list screen 211 displayed by this operation.

The playback list screen 211 includes content buttons 212, 213, 214, and 215 that correspond, respectively, to content information 122, 123, 124, and 125 constituting the content management table 121. Next, a selection of a content button by a user operation is received.

When a content button is selected by the user, the main control unit 118 reads, from the secure storage unit 113, a content ID that is contained in a piece of content information corresponding to the selected content button. The main control unit 118 then detects, from the information storage unit 110, a content file that contains a content ID that is identical with the read-out content ID. The main control unit 118 reads an encrypted content and an encrypted content key from the detected content file, combines the encrypted content and the encrypted content key, and calculates a hash value by substituting the combination into a hash function.

The main control unit 118 then reads a hash value from the content information that corresponds to the selected content button, and compares the read-out hash value with the calculated hash value. If the two hash values do not match each other, the main control unit 118 generates an error screen indicating that the selected content cannot be played back, outputs the generated error screen to the playback control unit 104, instructs it to display the error screen, and stops the playback of the content.

If the read-out hash value matches the calculated hash value, the main control unit 118 reads the device unique key 116 "Key_A" from the unique information storage unit 108, outputs the read-out device unique key 116 "Key_A" and the read-out encrypted content key to the encryption processing unit 109, and instructs it to decrypt the encrypted content key.

Next, the main control unit 118 receives a content key from the encryption processing unit 109. Upon receiving the content key, the main control unit 118 reads an encrypted content from the detected content file, outputs the read-out encrypted content and the received content key to the encryption processing unit 109, and instructs it to decrypt the encrypted content. The main control unit 118 then receives a content from the encryption processing unit 109, and outputs the received content to the decoding unit 105.

(c-3) Initial Setting Process

Upon receiving operation indication information indicating a depression of the initial setting button 188 while the menu screen 181 shown in FIG. 6A is displayed on the monitor 120, the main control unit 118 generates an initial setting screen 191, and instructs the 104 to display the generated initial setting screen 191. FIG. 7A shows the initial setting screen 191 displayed here. The initial setting screen 191 includes setting items 192, 193, 194, and 196. When the user places the cursor onto any of the setting items, setting boxes corresponding to the setting item are displayed. FIG. 7A shows setting boxes 197-201 that correspond to a setting item 196 "backup".

The main control unit 118 receives input operations by the user into the setting boxes 197-201. In the present example, "all", which indicates that all contents are backed up regardless of the types of the contents, has been input to the setting box 197.

Input in the setting box 198 is "Sunday 0:30" at which an encrypted content is scheduled to be transmitted to the backup device 500 as a backup.

Input in the setting box 199 is "only new" indicating that, among encrypted contents stored in the information storage unit 110, only a new encrypted content that has not been backed up is the target of the backup.

Input in the setting box 201 is "manual" indicating that a restore of a content that is stored in the backup device 500 as a backup is started manually by the user. It should be noted here that in the following description, obtaining by the HD recorder 100 of a backup copy of an encrypted content from the backup device 500 is referred to as a "restore".

Next, upon receiving operation indication information indicating a depression of the confirmation button from the input unit 103, the main control unit 118 stores setting items stored in each setting box.

Although not illustrated specifically, when the user places the cursor onto any of the buttons 192-194, an input of a setting regarding the channel, image quality, or disk is received, and the input setting item is stored when the confirmation button is depressed.

(c-4) Restore Process

Upon receiving operation indication information indicating a depression of the restore button 183 while the menu screen 181 shown in FIG. 6A is displayed on the monitor 120, the main control unit 118 transmits an activation instruction to the backup device 500 via the transmission/reception unit 101.

After this, if an activation notification, which notifies a normal activation, is not received within a predetermined time period from the backup device 500 via the transmission/reception unit 101, the main control unit 118 generates an error screen that notifies the user that a restore is not available due to a communication failure with the backup device 500. The main control unit 118 then displays the generated error screen on the monitor 120 via the playback control unit 104, and stops the process thereafter.

If the activation notification is received within the predetermined time period from the backup device 500 via the transmission/reception unit 101, the main control unit 118 instructs the authentication unit 102 to perform a device authentication with the backup device 500. If the result of the device authentication is unsuccessful, the main control unit 118 generates an error screen that notifies the user that a restore is not available due to a communication failure with the backup device 500. The main control unit 118 then displays the generated error screen on the monitor 120 via the playback control unit 104, and stops the process thereafter.

If the result of the device authentication is successful, the main control unit 118 receives a session key from the authentication unit 102. The main control unit 118 performs a secret communication by the common key encryption system using the received session key to transmit and/or receive information to/from the backup device 500. Description of encryption and decryption processes in the secret communication is omitted for the sake of simplification.

The main control unit 118 reads the device identifier 115 "ID_A" from the unique information storage unit 108, and transmits the read-out device identifier 115 "ID_A" and a restore information request, which requests information on encrypted contents that can be restored, to the backup device 500 via the transmission/reception unit 101.

The main control unit 118 receives, from the backup device 500 via the transmission/reception unit 101, content IDs, titles, and recording dates/times that correspond to each encrypted content stored in the backup device 500. The main control unit 118 temporarily stores the received content IDs, titles, and recording dates/times, generates a restore information screen 221 shown in FIG. 7B, using the image data stored in the information storage unit 110 and the received titles and recording dates/times, and displays the generated restore information screen 221 on the monitor 120 via the playback control unit 104.

Displayed on the restore information screen 221 are a plurality of content buttons 222-225.

Upon receiving, from the input unit 103, operation indication information indicating a depression of any content button, the main control unit 118 reads a content ID that corresponds to the received operation indication information. The main control unit 118 then transmits, to the backup device 500 via the 101, the read-out content ID and a restore request that requests to restore an encrypted content identified by the content ID.

The main control unit 118 receives the encrypted content, content key, and expiration time from the backup device 500 via the transmission/reception unit 101. The main control unit 118 generates a new content file in the information storage unit 110, and writes, into the new content file, the received encrypted content and a content ID that corresponds to the content button selected by the user.

Next, the main control unit 118 reads the device unique key 116 "Key_A" from the secure storage unit 113, outputs the read-out device unique key 116 "Key_A" and the received content key to the encryption processing unit 109, and instructs it to encrypt the content key. Upon receiving an encrypted content key from the encryption processing unit 109, the main control unit 118 writes the received encrypted content key into the newly generated content file.

Next, the main control unit 118 reads the encrypted content and encrypted content key from the newly generated content file in the information storage unit 110, combines the encrypted content and the encrypted content key, and calculates a hash value by substituting the combination into a hash function. Then, the main control unit 118 generates content information containing the content ID corresponding to the content button selected by the user, a title, a recording date/time, an expiration time, and the calculated hash value, and adds the generated content information to the content management table 121. The main control unit 118 also writes a backup flag "1" and a priority "2" into the added content information, and ends the restore process.

If it receives, in the middle of the above-described process, an error notification indicating that a restore is not available, from the backup device 500, the main control unit 118 generates an error screen indicating that the restore failed, and displays the generated error screen on the monitor 120 via the playback control unit 104.

In the present example, the user selects a content to restore, and the selected content is obtained from the backup device 500. However, it is also possible to use a backup history table 131 to return the state of the information storage unit 110 back to the state immediately after the backup. In this case, the main control unit 118 reads, from the backup history table 131, dates on which backups were performed, and displays the read-out dates on the monitor 120. The user selects one of the displayed dates. The main control unit 118 reads content IDs that are stored in the backup history table 131 in correspondence with the selected date. The main control unit 118 then extracts, from among the read-out content IDs, content IDs that are not contained in the content management table 121, transmits the extracted content IDs to the backup device 500, and requests it to transmit encrypted contents that correspond to the transmitted content IDs.

(c-5) Backup Process

The main control unit 118 stores settings regarding the backup that have been input by the user. Here, it is presumed that the main control unit 118 stores setting items that were input on the above-described initial setting screen 191.

The main control unit 118 monitors the time at constant intervals. If it judges that the current time is "Sunday 0:30", the main control unit 118 selects content information constituting the content management table 121 stored in the secure storage unit 113, one piece by one piece in sequence in an order, and performs the following process onto each selected piece of content information.

The main control unit 118 reads a backup flag from the selected piece of content information, and if the read-out backup flag is "0", starts processing the next piece of content information.

If the read-out backup flag is not "0", the main control unit 118 detects a content file that corresponds to the selected piece of content information, in the information storage unit 110, based on the content ID contained in the selected piece of content information. The main control unit 118 then reads an encrypted content and encrypted content key from the detected content file in the information storage unit 110. The main control unit 118 then combines the encrypted content and the encrypted content key, and calculates a hash value by substituting the combination into a hash function. The main control unit 118 compares the calculated hash value with the hash value contained the selected piece of content information. If the two hash values do not match each other, the main control unit 118 starts processing the next piece of content information.

If the two hash values match each other, the main control unit 118 transmits an activation instruction to the backup device 500 via the transmission/reception unit 101. After this, if an activation notification is not received within a predetermined time period from the backup device 500 via the transmission/reception unit 101, the main control unit 118 stops the process thereafter.

If the activation notification is received within the predetermined time period from the backup device 500 via the transmission/reception unit 101, the main control unit 118 instructs the authentication unit 102 to perform a device authentication with the backup device 500. If the result of the device authentication is unsuccessful, the main control unit 118 stops the process thereafter.

If the result of the device authentication is successful, the main control unit 118 receives a session key from the authentication unit 102. The main control unit 118 performs a secret communication by the common key encryption system using the received session key to transmit and/or receive information to/from the backup device 500. Here, description of encryption and decryption processes in the secret communication is omitted for the sake of simplification.

The main control unit 118 reads the device unique key 116 "Key_A", outputs the read-out device unique key 116 "Key_A" and the encrypted content key, which was read out from the information storage unit 110, to the encryption processing unit 109, and instructs it to decrypt the encrypted content key.

The main control unit 118 receives a content key from the encryption processing unit 109. Upon receiving the content key, the main control unit 118 reads an encrypted content from the detected content file, reads the device identifier 115 "ID_A" from the unique information storage unit 108, and reads a content ID, title and recording date/time from the selected piece of content information in the secure storage unit 113. The main control unit 118 then transmits, to the backup device 500 via the transmission/reception unit 101, a backup request instructing to perform a backup, the read-out device identifier 115 "ID_A", content ID, title, recording date/time, content key, and encrypted content.

Next, the main control unit 118 receives an error notification, which indicates that the backup request cannot be received, or an expiration time from the backup device 500 via the transmission/reception unit 101.

If it receives the error notification, the main control unit 118 stops the process thereafter.

If it receives the expiration time, the main control unit 118 writes the received expiration time into the selected piece of content information, and updates the backup flag to "1". The main control unit 118 then writes "2" into the priority, and starts processing the next piece of content information.

If the above-described process is completed with respect to all of the pieces of content information, the main control unit 118 reads content IDs from each piece of content information contained in the content management table 121, and writes the read-out content IDs and the current date/time into the backup history table 131.

It should be noted here that if the user depresses the backup button provided in the input unit 103, the main control unit 118 starts the above-described backup process, regardless of the backup schedule having been set in the initial setting process.

(10) Playback Control Unit 104 and Monitor 120

The playback control unit 104 includes an image signal processing unit and an audio signal processing unit. The playback control unit 104 receives image data and audio data from the 105. The image signal processing unit generates an image signal from the received image data, and outputs a vertical sync signal, a horizontal sync signal, and the generated image signal to the monitor 120. Also, in accordance with an instruction from the control unit 107, the playback control unit 104 generates an image signal from various types of screen data, and outputs the generated image signal to the monitor 120.

The audio signal processing unit generates an analog audio signal from the received audio data, and outputs the generated analog audio signal to the monitor 120.

The monitor 120 has a speaker embedded therein, receives the vertical sync signal, horizontal sync signal, and image signal from the image signal processing unit, and displays an image based on the received vertical sync signal, horizontal sync signal, and image signal. Also, the speaker receives the analog audio signal from the audio signal processing unit, converts the received analog audio signal into sounds/voices, and outputs the sounds/voices.

(11) Input/Output Unit 112

In the input/output unit 112, a recording medium such as a DVD or a memory card is inserted. The input/output unit 112 performs reading/writing information on the recording medium in accordance with instructions from the control unit 107.

1.3 Backup Device 500

Figure 8:
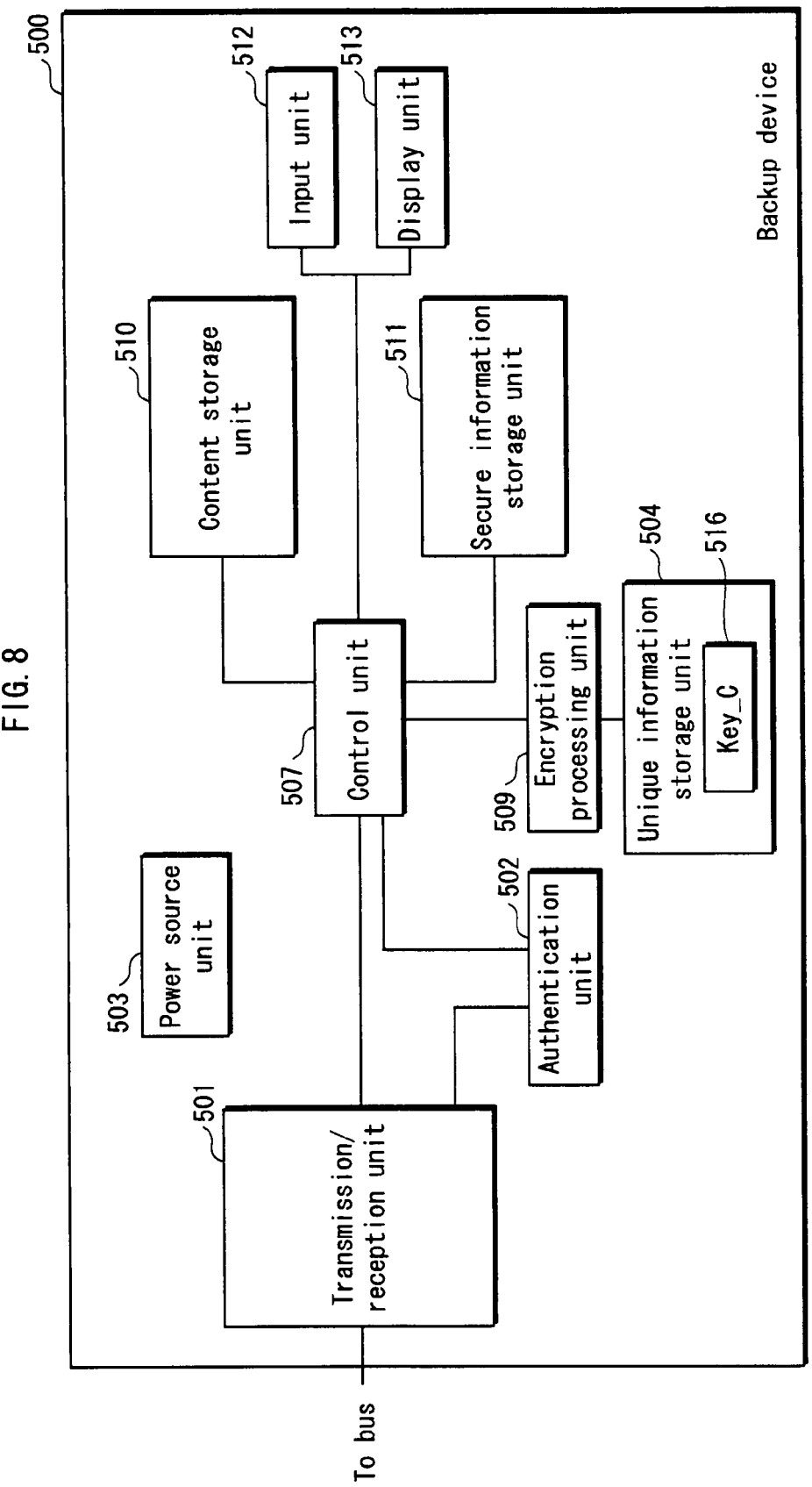
FIG. 8 is a block diagram showing the structure of the backup device 500.

The backup device 500, as shown in FIG. 8, includes a transmission/reception unit 501, an authentication unit 502, a power source unit 503, a control unit 507, an encryption processing unit 509, a unique information storage unit 504, a content storage unit 510, a secure information storage unit 511, an input unit 512, and a display unit 513.

The backup device 500 is more specifically a computer system including a microprocessor, a RAM, and a ROM. A computer program is recorded in the RAM and ROM. The backup device 500 achieves part of its functions as the microprocessor operates in accordance with the computer program.

(1) Unique Information Storage Unit 504

The unique information storage unit 504 is achieved by a ROM and, as shown in FIG. 8, stores the device unique key 116 "Key_A". The device unique key 116 "Key_A" is key data that is unique to the backup device 500, and is written thereto when the backup device 500 is shipped.

(2) Content Storage Unit 510

Figure 9:
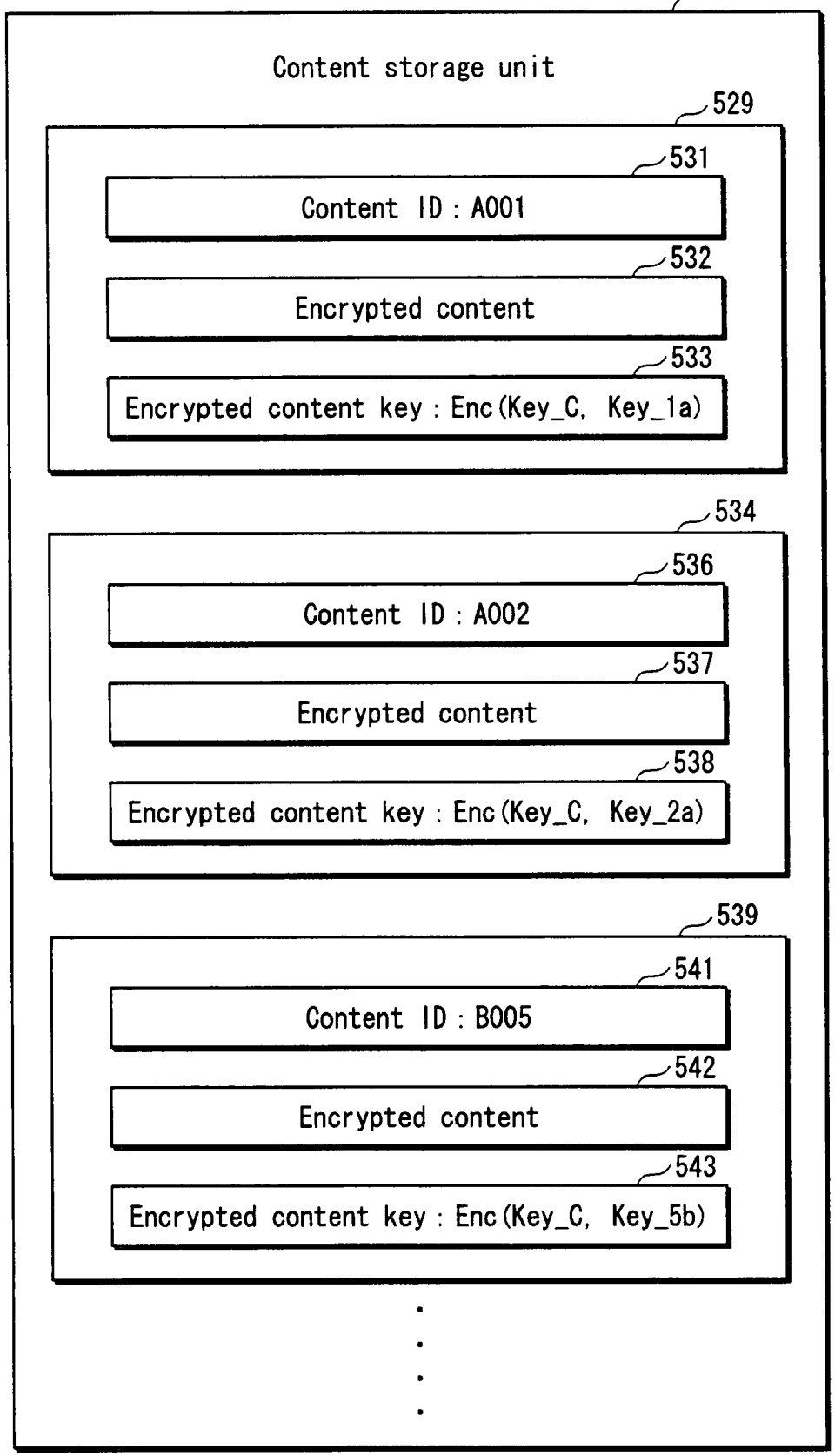
FIG. 9 shows an example of the information stored in the content storage unit 510.

The content storage unit 510 is achieved by a hard disk unit, and stores, as one example, content files 529, 534, 539, . . . as shown in FIG. 9.

Each content file includes a content ID, an encrypted content, and an encrypted content key. The content ID is identification information that uniquely identifies the encrypted content. The encrypted content is generated by applying the encryption algorithm E1 to the content using the content key. The encrypted content key is generated by applying the encryption algorithm E1 to the content key that is used to encrypt the content, using the device unique key 516 "Key_C" stored in the unique information storage unit 504.

For example, a content file 529 includes a content ID 531 "A001", an encrypted content 532, and an encrypted content key 533 "Enc(Key_C,Key_1a)".

The content ID 531 "A001" is information that uniquely identifies the encrypted content 532, and is identical with the content ID 136 "A001" stored in the information storage unit 110 of the HD recorder 100. The encrypted content 532 is generated by applying the encryption algorithm E1 to a content, using the content key "Key_1a". The encrypted content 532 is identical with the 137 stored in the information storage unit 110 of the HD recorder 100.

The encrypted content key 533 "Enc(Key_C,Key_1a)" is generated by applying the encryption algorithm E1 to the content key "Key_1a", using the device unique key 516 "Key_C" stored in the unique information storage-unit 504.

(3) Secure Information Storage Unit 511

The secure information storage unit 511 includes a flash memory, is provided with a protection mechanism and is protected from accesses by external devices.

Figure 10:
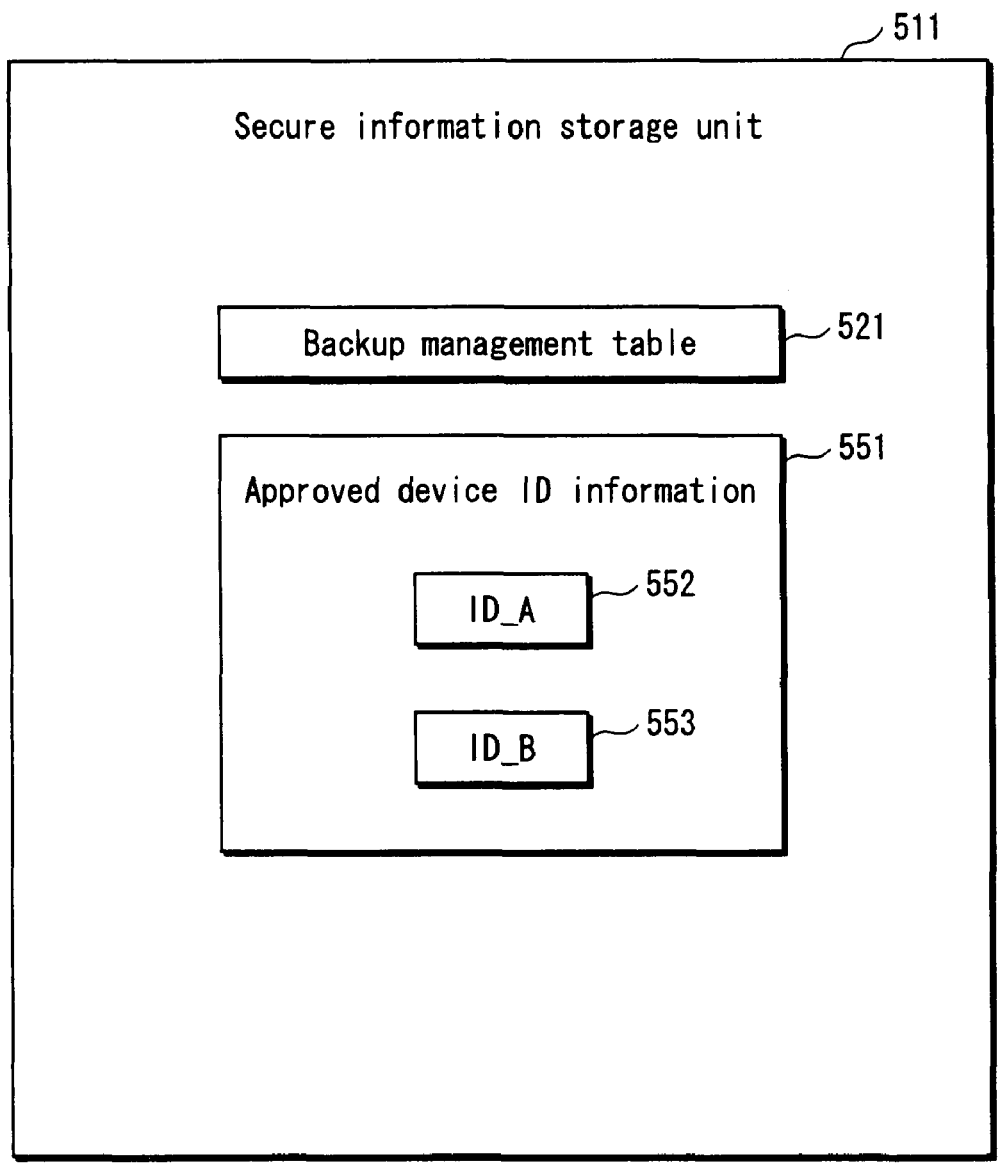
FIG. 10 shows an example of the information stored in the secure information storage unit 511.

The secure information storage unit 511 stores, for example, a backup management table 521 and an approved device ID information 551, as shown in FIG. 10.

The backup management table 521 includes a plurality of pieces of backup information 522, 523, 524, 525, . . . as shown in FIG. 11. Each piece of backup information includes a content ID, title, recording date/time, backup source device ID, and hash value. Each piece of backup information corresponds to the content files stored in the content storage unit 510, on a one-to-one basis.

The content ID here is identical with a content ID that is contained in the corresponding content file, and is identification information for identifying an encrypted content. The title is a name of the corresponding encrypted content.

The recording date/time indicates a date and time when the HD recorder 100 or the HD recorder 400 obtained the source content of the encrypted content contained in the corresponding content file from the broadcast device 10 or an external recording medium. The backup source device ID is a device ID of a device that requested a backup of the encrypted content contained in the corresponding content file. The hash value is generated by combining the encrypted content key and the encrypted content contained in the corresponding content file, and by substituting the combination into a hash function.

The approved device ID information 551 includes identification information of devices from which the backup device 500 receives various instructions such as the backup request. In the present embodiment, the approved device ID information 551 includes a device identifier 552 "ID_A" for identifying the HD recorder 100 in the backup system 1, and a device identifier 553 "ID_B" for identifying the HD recorder 400.

(4) Power Source Unit 503

The power source unit 503 obtains power from an external power source, and supplies the obtained power to the circuits that constitute the backup device 500, in accordance with instructions from the control unit 507.

Normally, the power source unit 503 supplies power only to the transmission/reception unit 501 and the control unit 507.

The power source unit 503 receives an instruction to start supplying power, from the control unit 507. Upon receiving the power supply start instruction, the power source unit 503 starts supplying power to the other units. The power source unit 503 also receives an instruction to stop supplying power, from the control unit 507. Upon receiving the power supply stop instruction, the power source unit 503 stops supplying power to units other than the transmission/reception unit 501 and the control unit 507.

(5) Transmission/Reception Unit 501

The transmission/reception unit 501 is connected to the LAN 30, and performs transmission/reception of various information between the external devices connected to the LAN 30 and the control unit 507 and the authentication unit 502. Here, the external devices are the HD recorder 100 and the HD recorder 400.

(6) Authentication Unit 502

The authentication unit 502 preliminarily stores a secret key SK_C that is unique to the backup device 500, a public key certificate Cert_C, a public key PK_CA of a certificate authority, and a CRL. The public key certificate Cert_C certifies the authenticity of the public key PK_C that corresponds to the secret key SK_C, and includes a certificate ID number, the public key PK_C, and signature data of the certificate authority. The signature data of the certificate authority is generated by applying the signature generation algorithm S to at least the public key PK_C, using a secret key SK_CA of the certificate authority. The CRL contains certificate ID numbers of revoked public key certificates.

The public key PK_CA of a certificate authority is a public key that makes a pair with the secret key SK_CA of the certificate authority.

The authentication unit 502 performs a device authentication with the external device according to an instruction by the control unit 507, based on the DTCP. The 102 prohibits the communication between the control unit 507 and the external device if the result of the device authentication is unsuccessful. If the result of the device authentication is successful, the authentication unit 502 generates a session key that is common with the external device, and outputs the generated session key to the control unit 507. The operation in the device authentication will be described later in detail.

(7) Encryption Processing Unit 509

The encryption processing unit 509 receives an encrypt instruction from the control unit 507, where the encrypt instruction is composed of a plain text and a key. The encryption processing unit 509 also receives a decrypt instruction from the control unit 507, where the decrypt instruction is composed of an encrypted text and a key.

Upon receiving the encrypt instruction, the encryption processing unit 509 generates an encrypted text by applying the encryption algorithm E1 to the received plain text using the received key, and outputs the generated encrypted text to the control unit 507.

Upon receiving the decrypt instruction, the encryption processing unit 509 generates a decrypted text by applying the decryption algorithm D1 to the received encrypted text using the received key, and outputs the generated decrypted text to the control unit 507.

One example of the combination of the plain text and key that the encryption processing unit 509 receives is a content key and the device unique key "Key_C". Also, one example of the combination of the encrypted text and key that the encryption processing unit 509 receives is an encrypted content key and the device unique key "Key_C".

(8) Control Unit 507

The control unit 507 stores a viewing time "240 hours". The viewing time is a time period during which the HD recorder 100 or the HD recorder 400 can used a backup-target encrypted content.

The control unit 507 includes a secure clock (not illustrated) that cannot be operated by external devices.

The control unit 507 receives an activation instruction from an external device via the transmission/reception unit 501. Here, the external device is the HD recorder 100 or the HD recorder 400.

Upon receiving the activation instruction, the control unit 507 instructs the power source unit 503 to start supplying power. The control unit 507 then transmits an activation notification, which indicates that the backup device 500 has been activated, to the external device via the transmission/reception unit 501.

Next, the control unit 507 instructs the authentication unit 502 to perform the device authentication with the external device. If the result of the device authentication by the authentication unit 502 is unsuccessful, the control unit 507 instructs the power source unit 503 to stop supplying power.

If the result of the device authentication by the authentication unit 502 is successful, the control unit 507 receives a session key from the authentication unit 502. In the following process, the control unit 507 performs a secret communication with the external device by the common key encryption system using the received session key. Description of encryption and decryption processes in the secret communication is omitted for the sake of simplification.

Next, the control unit 507 receives, from the external device via the transmission/reception unit 501, a device identifier, backup request, content ID, content key, title, recording date/time, and encrypted content. Alternatively, the control unit 507 receives a device identifier, extension request, and content ID. Further alternatively, the control unit 507 receives a device identifier and restore information request.

(a) Backup Process

Upon receiving a device identifier, backup request, content ID, content key, title, recording date/time, and encrypted content, the control unit 507 judges whether or not the received device identifier is contained in the approved device ID information 551 stored in the secure information storage unit 511. If the received device identifier is not contained in the approved device ID information 551, the control unit 507 transmits, to the external device via the transmission/reception unit 501, an error notification indicating that the backup request cannot be received. The control unit 507 then instructs the power source unit 503 to stop supplying power.

If the received device identifier is contained in the approved device ID information 551, the control unit 507 reads the device unique key 516 "Key_C" from the unique information storage unit 504. The control unit 507 then outputs the read-out device unique key 516 "Key_C" and the received content key to the encryption processing unit 509, and instructs it to encrypt the content key.

Next, the control unit 507 receives an encrypted content key from the encryption processing unit 509, generates a content file containing the received content ID, encrypted content, and encrypted content key, and writes the generated content file into the content storage unit 510.

Next, the control unit 507 reads the encrypted content and encrypted content key from the newly generated content file in the content storage unit 510, combines the encrypted content and the encrypted content key, and generates a 160-bit hash value by substituting the combination into a hash function.

Next, the control unit 507 generates backup information containing the received content ID, title, recording date/time, device identifier, and calculated hash value, and adds the generated backup information to the backup management table 521. It is presumed here that the received device identifier is a backup source device identifier.

Next, the control unit 507 obtains a current time from the secure clock, and calculates an expiration time by adding the viewing time "240 hours" to the obtained current time. The control unit 507 transmits the calculated expiration time to the external device via the transmission/reception unit 501.

After the transmission is completed, the control unit 507 instructs the power source unit 503 to stop supplying power.

(b) Expiration Time Extension Process

Upon receiving a device identifier, extension request, and content ID via the transmission/reception unit 501, the control unit 507 judges whether or not the received device identifier matches any of device identifiers contained in the transmission/reception unit 501 stored in the secure information storage unit 511. If the received device identifier does not match any of the device identifiers, the control unit 507 transmits an error notification indicating that the extension request cannot be received. The control unit 507 then instructs the power source unit 503 to stop supplying power.

If the received device identifier matches any of the device identifiers, the control unit 507 selects a piece of backup information that contains a content ID that is identical with the received content ID.

The control unit 507 then detects, from the content storage unit 510, a content file that contains a content ID that is identical with the received content ID. The control unit 507 reads an encrypted content and an encrypted content key from the detected content file, combines the encrypted content and the encrypted content key, and calculates a hash value by substituting the combination into a hash function.

The control unit 507 then compares the calculated hash value with the hash value contained in the selected piece of backup information. If the two hash values do not match each other, the control unit 507 outputs, to the external device via the transmission/reception unit 501, an error notification indicating that the extension request cannot be received.

If the two hash values match each other, the control unit 507 obtains a current time from the secure clock, and calculates an expiration time by adding the viewing time "240 hours" to the obtained current time. The control unit 507 transmits the calculated expiration time to the external device via the transmission/reception unit 501.

(c) Restore Process

Upon receiving a device identifier and restore information request, the control unit 507 judges whether or not the received device identifier is contained in the approved device ID information 551 stored in the secure information storage unit 511. If the received device identifier is not contained in the approved device ID information 551, the control unit 507 transmits, to the external device via the transmission/reception unit 501, an error notification indicating that the backup request cannot be received. The control unit 507 then instructs the power source unit 503 to stop supplying power.

If the received device identifier is contained in the approved device ID information 551, the control unit 507 reads the content IDs, titles and recording times from all the pieces of backup information contained in the backup management table 521 stored in the secure information storage unit 511. The control unit 507 outputs the read-out content IDs, titles and recording times to the external device via the transmission/reception unit 501.

Next, the control unit 507 receives a content ID and restore request from the external device via the transmission/reception unit 501. Upon receiving the content ID and restore request, the control unit 507 selects a piece of backup information that contains a content ID that is identical with the received content ID.

Next, the control unit 507 detects, based on the received content ID, a content file that corresponds to the selected piece of backup information. The control unit 507 reads an encrypted content and an encrypted content key from the detected content file, combines the encrypted content and the encrypted content key, and calculates a hash value by substituting the combination into a hash function. The control unit 507 then compares the calculated hash value with the hash value contained in the selected piece of backup information.

If the two hash values do not match each other, the control unit 507 outputs, to the external device via the transmission/reception unit 501, an error notification indicating that the restore request cannot be received. The control unit 507 then instructs the power source unit 503 to stop supplying power.

If the two hash values match each other, the control unit 507 reads the device unique key 516 "Key_C" from the unique information storage unit 504, outputs the read-out encrypted content key and device unique key 516 "Key_C" to the encryption processing unit 509, and instructs it to decrypt the encrypted content key. Next, the control unit 507 receives a content key from the encryption processing unit 509. Upon receiving the content key, the control unit 507 reads an encrypted content from the detected content file.

Next, the control unit 507 obtains a current time from the secure clock, and calculates an expiration time by adding the viewing time "240 hours" to the obtained current time. The control unit 507 transmits the read-out encrypted content, the received content key, and the calculated expiration time to the external device via the transmission/reception unit 501.

After the transmission is completed, the control unit 507 instructs the power source unit 503 to stop supplying power.

(9) Input Unit 512, Display Unit 513

The input unit 512 receives an input of information or an instruction from the operator, and outputs the received information or operation indication information corresponding to the received instruction to the control unit 507.

The display unit 513 display various information under control by the control unit 507.

1.4 Operation of Backup System 1

The following describes the operation of the backup system 1.

(1) Operation of HD Recorder 100

Figure 12:
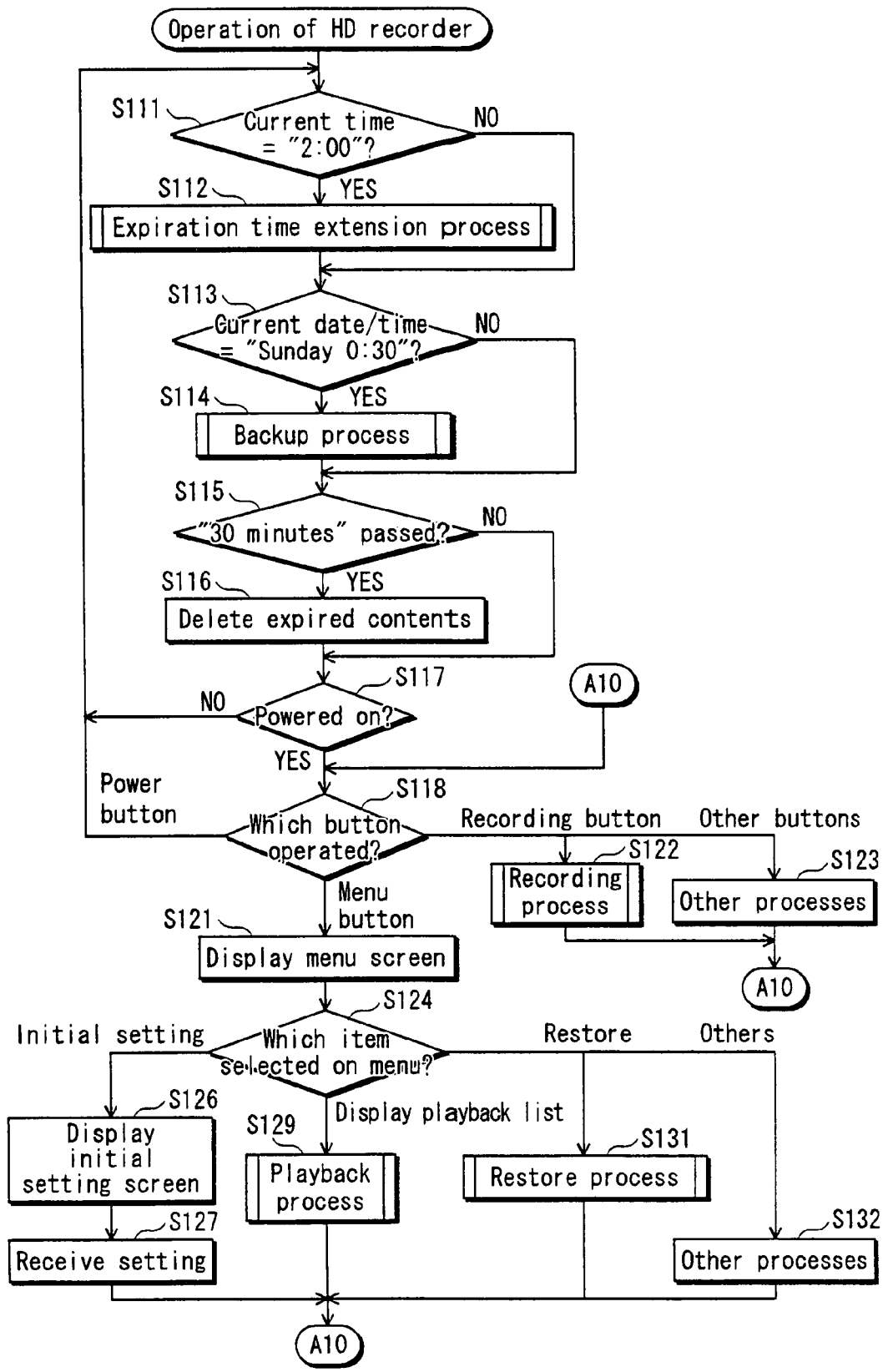
FIG. 12 is a flowchart showing an operation of the HD recorder 100.

The operation of the HD recorder 100 will be described with reference to the flowchart shown in FIG. 12. The description is started with step S111 for the sake of convenience. It is presumed here that the main control unit 118 stores the setting items regarding the backup that were set on the initial setting screen 191, "all" set as the content type, "Sunday 0:30" set as the backup schedule, "only new" set as the backup mode, and "manual" as the backup mode.

The control unit 107 compares the current time indicated by the secure clock 117 with the extension time "2:00" stored therein (step S111), and if it is judged that the current time is "2:00" (YES in step S111), the control unit 107 performs the expiration time extension process (step S112). If it is judged that the current time is not "2:00" (NO in step S111), the control unit 107 goes to step S113 without performing step S112.

Next, the control unit 107 compares the current date/time with the backup schedule "Sunday 0:30" stored therein, and if it is judged that the current date/time is "Sunday 0:30" (YES in step S113), the control unit 107 performs the backup process (step S114).

If it is judged that the current date/time is not "Sunday 0:30" (NO in step S113), the control unit 107 goes to step S115.

Then, if it is judged that "30 minutes" have passed since the content delete process was performed most recently to delete expired contents (YES in step S115), the control unit 107 compares the current time with the expiration time contained in each piece of content information stored in the content management table 121, deletes content files corresponding to expired content information from the information storage unit 110, and deletes the expired content information from the content management table 121 (step S116).

Then, if it is judged that less than "30 minutes" have passed (NO in step S115), the control unit 107 goes to step S117 without performing step S116.

If the power button is depressed by the user (YES in step S117), the control unit 107 receives a button operation or a remote controller operation by the user via the input unit 103 (step S118), and performs a process depending on the received button operation.

If the power button is not depressed by the user (NO in step S117), the control unit 107 returns to step S111 and continues to monitor the current time.

If the recording button is depressed in step S118, the control unit 107 performs the recording process (step S122). After the recording process is completed, the control unit 107 returns to step S118, and receives an operation of the user.

If the power button is depressed in step S118, the control unit 107 returns to step S111, and continues to monitor the time.

If any of the other buttons is depressed in step S118, the control unit 107 performs a process corresponding to the depressed button (step S123).

If the menu button is depressed in step S118, the control unit 107 displays the menu screen 181 shown in FIG. 6A on the monitor 120 (step S121), and receives a selection by the user (step S124).

If the initial setting button 188 is selected (step S124), the control unit 107 displays the initial setting screen 191 shown in FIG. 7A on the monitor 120 (step S126), and receives various settings made by button operations by the user (step S127). After the setting reception is completed, the control unit 107 returns to step S118.

If the playback list display button 182 is selected in step S124, the control unit 107 performs the playback process (step S129). After the playback process is completed, the control unit 107 returns to step S118.

If the restore button 183 is selected in step S124, the control unit 107 performs the restore process (step S131). After the restore process is completed, the control unit 107 returns to step S118. Further, if any of the other buttons is selected in step S124, the control unit 107 performs a process corresponding to the selected button (step S132), and returns to step S118.

(2) Recording Process by HD Recorder 100

Figure 13:
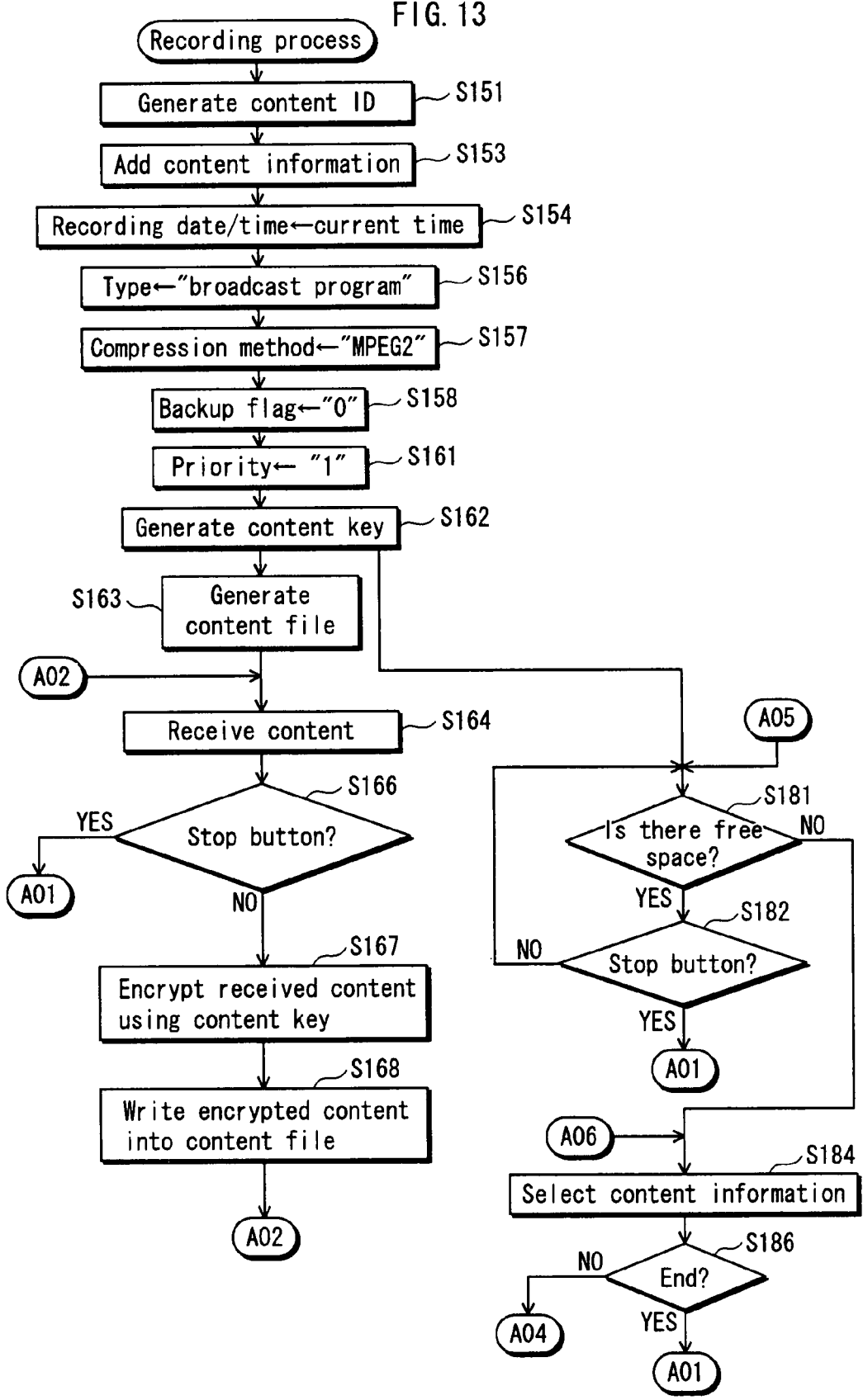
FIG. 13 is a flowchart showing the recording process performed by the HD recorder 100.
Figure 14:
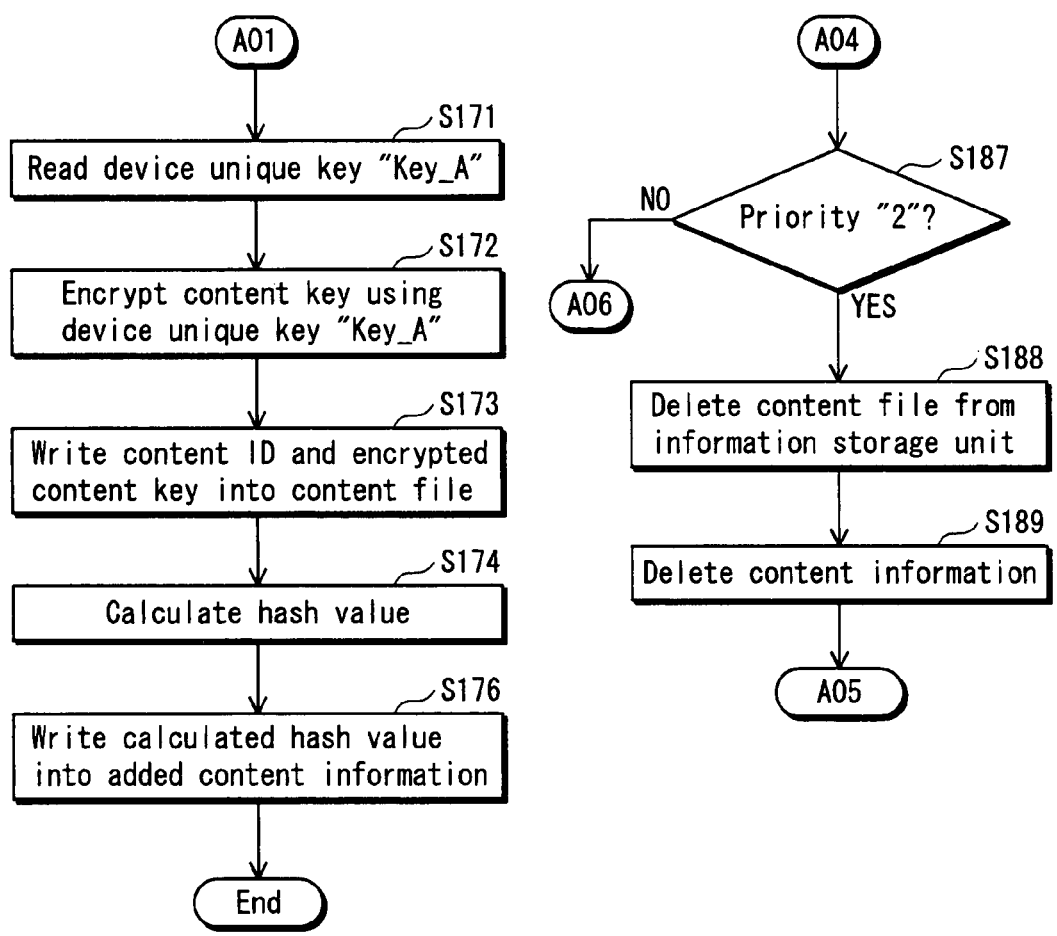
FIG. 14 is a flowchart showing the recording process performed by the HD recorder 100, continued from FIG. 13.

The recording process performed by the HD recorder 100 will be described with reference to the flowchart shown in FIG. 13, which is a detailed flowchart of step S122 shown in FIG. 12.

Upon receiving operation indication information indicating a depression of the recording button, the control unit 107 generates a new content ID (step S151), and adds a piece of content information containing the generated new content ID to the content management table 121 (step S153) The control unit 107 then writes the current time into the added piece of content information as the recording date/time (step S154), writes "broadcast program" as the type (step S156), writes "MPEG2" as the compression method (step S157), writes "0" as the backup flag (step S158), and writes "1" as the priority (step S161).

Next, the control unit 107 instructs the key generating unit 106 to generate a content key. The key generating unit 106 generates a content key, and outputs the generated content key to the control unit 107 (step S162).

Next, the control unit 107 generates a new content file in the information storage unit 110 (step S163), and outputs the recording instruction to the broadcast receiving unit 114. The broadcast receiving unit 114 receives a content via the antenna 130 (step S164), and outputs the received content in units of TS packets to the control unit 107.

The steps S164 through S168 are repeated until the stop button is depressed by the user. If the stop button is depressed (YES in step S166), control moves to step S171.

First, the control unit 107 outputs the content received from the broadcast receiving unit 114 and the content key received from the key generating unit 106 to the encryption processing unit 109, and instructs the encryption processing unit 109 to encrypt the content. The encryption processing unit 109 encrypts the content using the received content key, and outputs the generated encrypted content to the control unit 107 (step S167).

The control unit 107 writes the received encrypted content into a newly generated content file in the information storage unit 110 (step S168), and returns to step S164.

If the stop button is depressed (YES in step S166), the control unit 107 reads the device unique key 116 "Key_A" from the unique information storage unit 108 (step S171), outputs the read-out device unique key 116 "Key_A" and a content key to the encryption processing unit 109, and instructs the encryption processing unit 109 to encrypt the content key. The encryption processing unit 109 generates an encrypted content key by encrypting the content key using the received device unique key 116 "Key_A", and outputs the generated encrypted content key to the control unit 107 (step S172).

The control unit 107 then receives the encrypted content key from the encryption processing unit 109, and writes the received encrypted content key and the generated content ID into the generated content file (step S173).

Next, the control unit 107 calculates a hash value by combining the encrypted content and the encrypted content key and substituting the combination into a hash function (step S174). The control unit 107 writes the generated hash value into the newly added piece of content information (step S176).

The control unit 107 performs steps S181 through S189 in parallels with steps S164 through S168. First, the control unit 107 monitors the free space of the information storage unit 110 (step S181). If it is judged that the information storage unit 110 has enough free space (YES in step S181), and if the user has not depressed the stop button (NO in step S182), the control unit 107 returns to step S181 and continues to monitor the free space. If the user has depressed the stop button (YES in step S182), the control unit 107 moves control to step S171.

If it is judged that the information storage unit 110 does not have enough free space (NO in step S181), the control unit 107 selects, in sequence from the start, pieces of content information constituting the content management table 121 stored in the secure storage unit 113 (step S184). Here, if the process of steps S187 through S189 has been performed with respect to all the pieces of content information constituting the content management table 121, namely, if there is no content to be deleted in the information storage unit 110 (YES in step S186), the control unit 107 notifies the user of shortage of storage space, by means of, for example, blinking on and off a lamp, moves control to step S171.

If it is judged as NO in step S186, the control unit 107 reads the priority contained in the selected piece of content information, and judges whether or not the read-out priority is "2" (step S187). If the read-out priority is not "2" (NO in step S187), the control unit 107 returns to step S184, and selects the next piece of content information.

If the read-out priority is "2" (YES in step S187), the control unit 107 detects a content file corresponding to the selected piece of content information from the information storage unit 110, based on the content ID contained in the selected piece of content information, and deletes the detected content file from the information storage unit 110 (step S188), deletes the selected piece of content information from the content management table 121 (step S189), and returns to step S181.

(3) Playback Operation by HD Recorder 100

Figure 15:
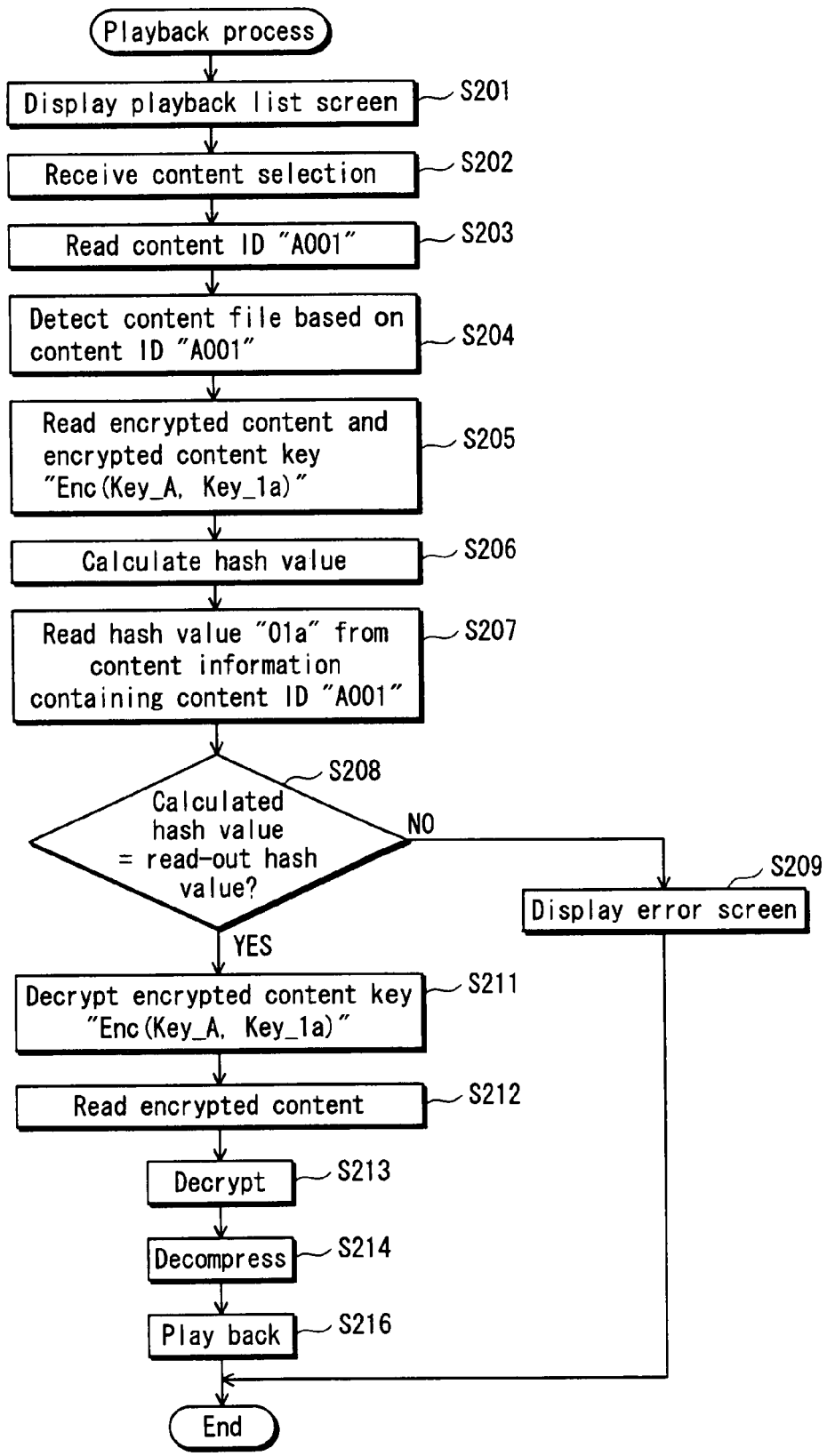
FIG. 15 is a flowchart showing the content playback process.

The playback operation performed by the HD recorder 100 will be described with reference to the flowchart shown in FIG. 15, which is a detailed flowchart of step S129 shown in FIG. 12.

When the user selects the playback list display button 182 on the menu screen 181 shown in FIG. 6A, the control unit 107 generates the playback list screen 211 as shown in FIG. 6B, and displays the generated playback list screen 211 on the monitor 120 (step S201).

Next, the control unit 107 receives a selection of a content by the user via the input unit 103 (step S202). The following description is based on the presumption that the user selects the content button 212.

The control unit 107 reads, from the secure storage unit 113, the content ID "A001" contained in a piece of content information 122 corresponding to the selected content button 212 (step S203), and detects a content file 134, which corresponds to the piece of content information 122, from the information storage unit 110 based on the read-out content ID "A001" (step S204). The control unit 107 reads an encrypted content 137 and an encrypted content key 138 "Enc (Key_A, Key__1a)" from the detected content file 134 (step S205). The control unit 107 calculates a hash value by combining the read-out encrypted content 137 and encrypted content key 138 "Enc (Key_A, Key__1a)", and substituting the combination into a hash function (step S206).

Next, the control unit 107 reads hash value "01a" from the content information 122 containing the content ID "A001" (step S207). The control unit 107 then compares the calculated hash value with the read-out hash value (step S208). If the two hash values do not match each other (NO in step S208), the control unit 107 generates an error screen indicating that a playback of the selected content is not available, displays the generated error screen (step S209), and ends the playback process.

If the calculated hash value and the read-out hash value match each other (YES in step S208), the control unit 107 reads the device unique key 116 "Key_A" from the unique information storage unit 108, outputs the encrypted content key 138 "Enc(Key_A, Key__1a)" and the read-out device unique key 116 "Key_A" to the encryption processing unit 109, and instructs it to decrypt the encrypted content key 138 "Enc(Key_A, Key__1a)".

The encryption processing unit 109 receives the encrypted content key "Enc(Key_A, Key__1a)" and the device unique key 116 "Key_A" from the control unit 107. The encryption processing unit 109 generates a content key "Key__1a" by decrypting the encrypted content key "Enc(Key_A, Key__1a)" using the received device unique key 116 "Key_A", and outputs the generated content key "Key__1a" to the control unit 107 (step S211).

The control unit 107 receives the content key "Key__1a" from the encryption processing unit 109. Upon receiving the content key "Key__1a", the control unit 107 reads the encrypted content 137 from the content file 134 (step S212), outputs the read-out encrypted content 137 and the content key "Key__1a" to the encryption processing unit 109, and instructs it to decrypt the encrypted content.

The encryption processing unit 109 generates a content by decrypting the encrypted content using the content key "Key__1a", in accordance with the instruction from the control unit 107, and outputs the generated content to the control unit 107 (step S213).

The control unit 107 receives the content from the encryption processing unit 109, and outputs the received content to the playback control unit 104. The playback control unit 104 receives the content from the control unit 107, generates an image signal and an audio signal by decompressing the received content (step S214), and outputs the generated image signal and audio signal to the monitor 120. The monitor 120 plays back an image and sound/voice (step S216).

(4) Restore Process by HD Recorder 100 and Backup Device 500

Figure 16:
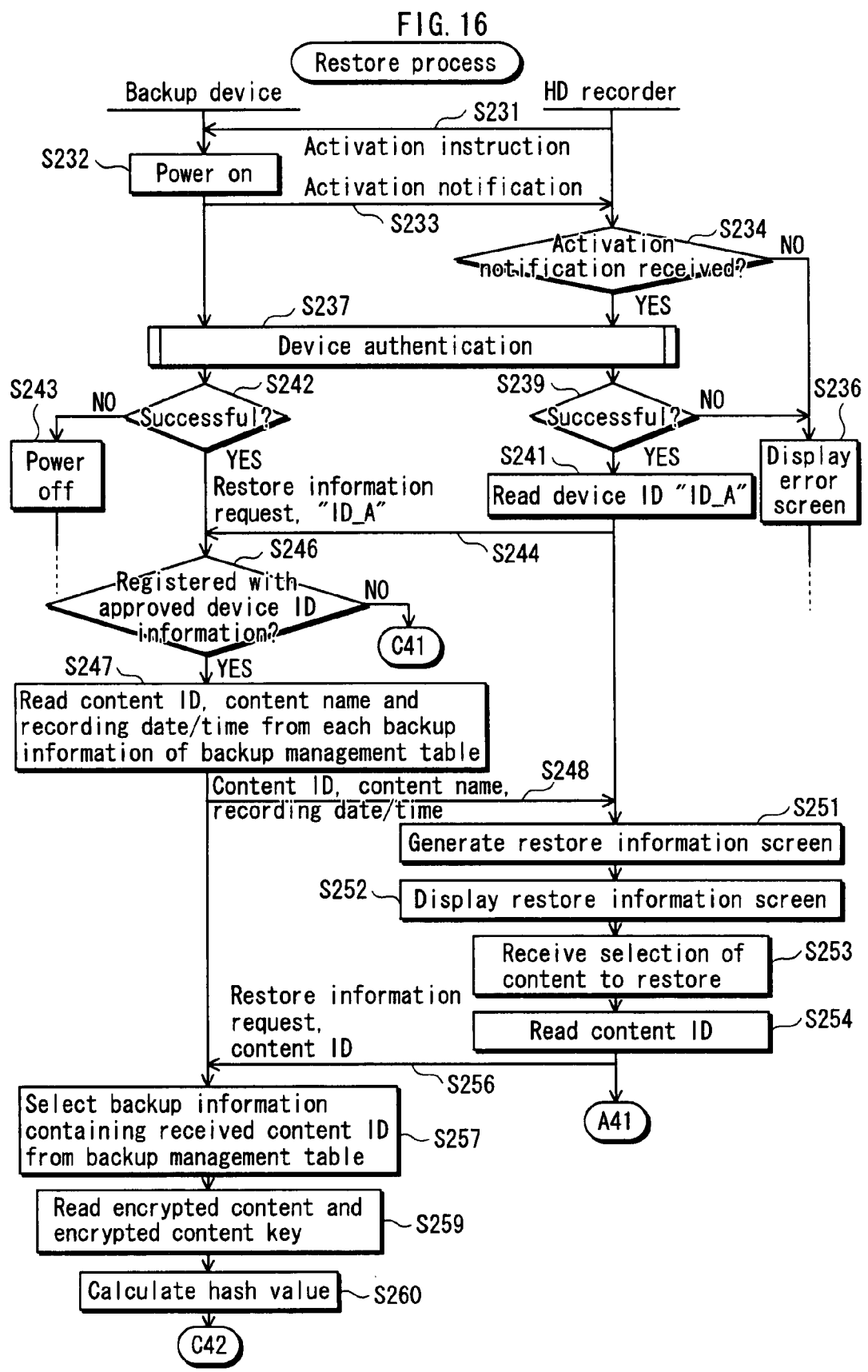
FIG. 16 is a flowchart showing the restore process performed by the HD recorder 100 and the backup device 500.
Figure 17:
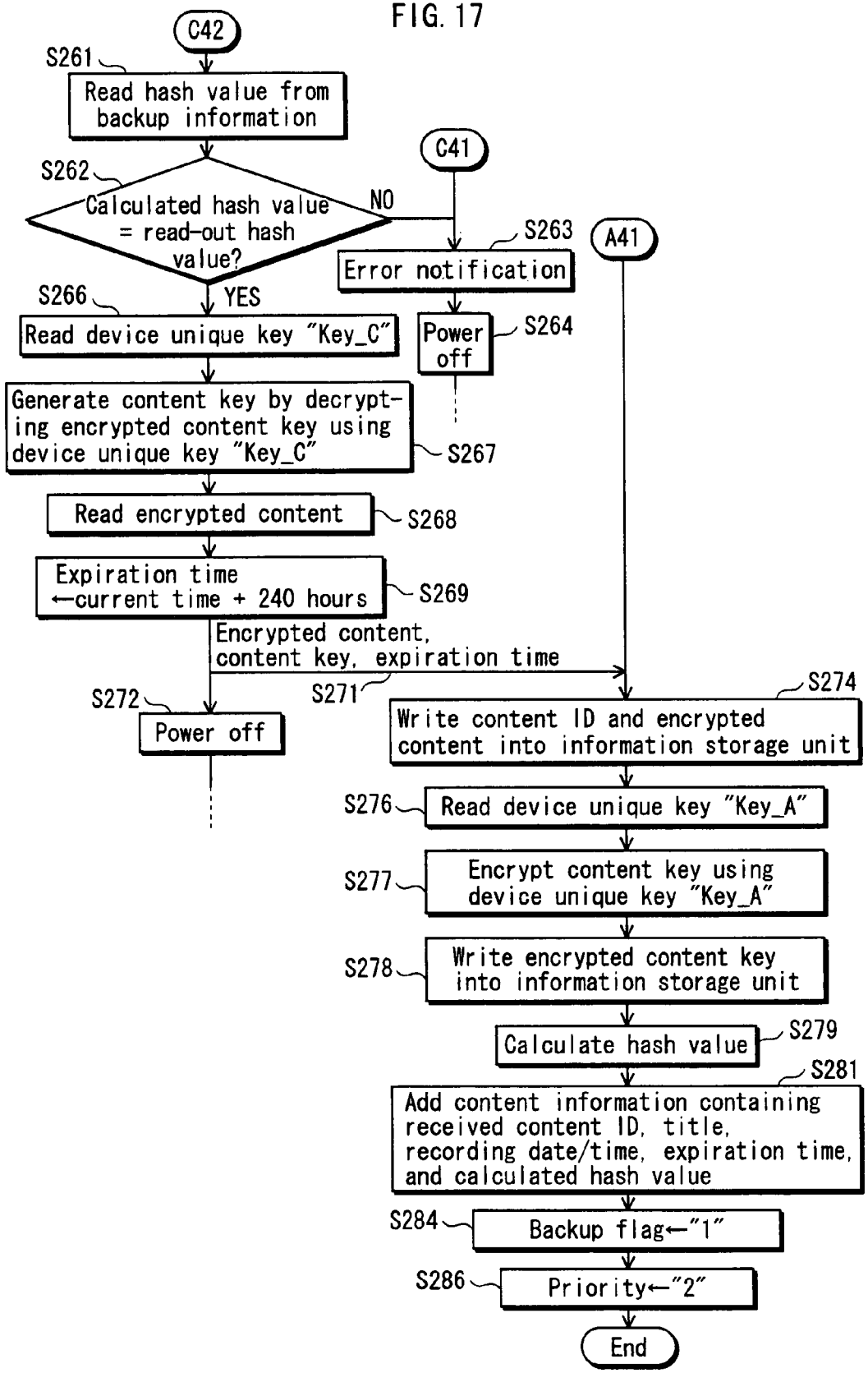
FIG. 17 is a flowchart showing the restore process performed by the HD recorder 100 and the backup device 500, continued from FIG. 16.

The restore process performed by the HD recorder 100 and the backup device 500 will be described with reference to the flowcharts shown in FIGS. 16-17, which are the detail of step S131 shown in FIG. 12.

When the user selects the restore button 183 on the menu screen 181 shown in FIG. 6A, the control unit 107 transmits an activation instruction to the backup device 500 via the transmission/reception unit 101 (step S231).

The control unit 507 of the backup device 500 receives the activation instruction via the transmission/reception unit 501, and instructs the power source unit 503 to start supplying power. The power source unit 503 starts supplying power to each circuit constituting the backup device 500 (step S232).

Next, the control unit 507 transmits an activation notification to the HD recorder 100 via the transmission/reception unit 501 (step S233).

If the activation notification is not received within a predetermined time period from the backup device 500 via the transmission/reception unit 101 (NO in step S234), the control unit 107 of the HD recorder 100 generates an error screen that notifies that a restore is not available, and displays the generated error screen on the monitor 120 via the playback control unit 104 (step S236).

If the activation notification is received within the predetermined time period (YES in step S234), the control unit 107 instructs the authentication unit 102 to perform a device authentication with the backup device 500. The authentication unit 102 performs the device authentication with the backup device 500, in accordance with the instruction from the control unit 107 (step S237).

If the result of the device authentication is unsuccessful (NO in step S239), the control unit 107 moves to step S236.

If the result of the device authentication is successful (YES in step S239), the control unit 107 reads the device identifier 115 "ID_A" from the unique information storage unit 108 (step S241), and transmits, to the backup device 500 via the transmission/reception unit 101, the read-out device identifier 115 "ID_A" and the restore information request (step S244).

If the result of the device authentication with the HD recorder 100 is unsuccessful (NO in step S242), the control unit 507 of the backup device 500 instructs the power source unit 503 to stop supplying power. The power source unit 503 stops supplying power to each unit, except for the transmission/reception unit 501 and the control unit 507 (step S243).

If the result of the device authentication with the HD recorder 100 is successful (YES in step S242), the control unit 507 receives the restore information request and the device identifier "ID_A" from the HD recorder 100 via the transmission/reception unit 501. The control unit 507 judges whether or not the received device identifier "ID_A" has been registered with the approved device ID information 551 stored in the secure information storage unit 511 (step S246). If it judges that the device identifier has not been registered (NO in step S246), the control unit 507 moves control to step S263.

If it judges that the device identifier has been registered (YES in step S246), the control unit 507 reads a content ID, title and recording date/time from each backup information constituting the backup management table 521 (step S247), and transmits the read-out content ID, title and recording, date/time to the HD recorder 100 via the transmission/reception unit 501 (step S248).

The control unit 107 of the HD recorder 100 receives the content ID, title and recording date/time from the backup device 500 via the transmission/reception unit 101. The control unit 107 generates the restore information screen 221 shown in FIG. 7, using the received title and recording date/time (step S251), and displays the generated restore information screen 221 on the monitor 120 via the playback control unit 104 (step S252).

The control unit 107 receives a selection of a content by the user via the input unit 103 (step S253).

The control unit 107 reads a content ID corresponding to the content button selected by the user (step S254), and transmits the read-out content ID and the restore request to the backup device 500 via the transmission/reception unit 101 (step S256).

Upon receiving the restore request and content ID via the transmission/reception unit 501, the control unit 507 of the backup device 500 selects a piece of backup information containing the received content ID from the backup management table 521 stored in the secure information storage unit 511 (step S257).

Next, the control unit 507 detects a content file that corresponds to the selected piece of content information, in the content storage unit 510, based on the received content ID, and reads an encrypted content and encrypted content key from the detected content file (step S259). The control unit 507 then combines the encrypted content and the encrypted content key, and calculates a hash value by substituting the combination into a hash function (step S260).

Next, the control unit 507 reads a hash value from the selected piece of content information (step S261), compares the calculated hash value with the read-out hash value. If the two hash values do not match each other (NO in step S262), the control unit 507 generates an error notification indicating that the restore request corresponding to the received content ID cannot be received, and transmits the generated error notification to the HD recorder 100 via the transmission/reception unit 501 (step S263). Upon receiving the error notification, the control unit 107 of the HD recorder 100 displays on the monitor an error screen notifying that the restore is not available, and ends the restore process.

Next, the control unit 507 instructs the power source unit 503 to stop supplying power. Upon receiving the instruction from the control unit 507, the power source unit 503 stops supplying power to each unit, except for the transmission/reception unit 501 and the control unit 507 (step S264).

If the two hash values match each other (YES in step S262), the control unit 507 reads the device unique key 516 "Key_C" from the unique information storage unit 504 (step S266). The control unit 507 then outputs the read-out device unique key 516 "Key_C" and the encrypted content key to the encryption processing unit 509, and instructs it to decrypt the encrypted content key. In accordance with the instruction from the control unit 507, the encryption processing unit 509 generates a content key by decrypting the encrypted content key using the device unique key 516 "Key_C", and outputs the generated content key to the control unit 507 (step S267).

The control unit 507 receives the content key from the encryption processing unit 509, and reads an encrypted content from the detected content file (step S268).

Next, the control unit 507 obtains a current time from the secure clock, and calculates an expiration time by adding the viewing time "240 hours" to the obtained current time (step S269). The control unit 507 transmits the read-out encrypted content, the received content key and the calculated expiration time to the HD recorder 100 via the transmission/reception unit 501 (step S271). After the transmission, the control unit 507 instructs the power source unit 503 to stop supplying power. The power source unit 503 stops supplying power to each unit, except for the transmission/reception unit 501 and the control unit 507 (step S272).

The control unit 107 of the HD recorder 100 receives the encrypted content, content key, and expiration time from the backup device 500 via the transmission/reception unit 101. Upon receiving the encrypted content, content key, and expiration time, the control unit 107 newly generates a content file in the information storage unit 110, and writes the received encrypted content and the content ID into the generated content file (step S274).

Next, the control unit 107 reads the device unique key 116 "Key_A" from the unique information storage unit 108 (step S276). The control unit 107 then outputs the read-out device unique key 116 "Key_A" and the received content key to the encryption processing unit 109, and instructs it to encrypt the content key. The encryption processing unit 109 receives the device unique key 116 "Key_A" and the content key. The encryption processing unit 109 then generates an encrypted content key by encrypting the content key using the received device unique key 116 "Key_A", and outputs the generated encrypted content key to the control unit 107 (step S277).

The control unit 107 receives the encrypted content key from the encryption processing unit 109, and writes the received encrypted content key into the content file generated in the information storage unit 110 (step S278).

Next, the control unit 107 calculates a hash value by combining the received encrypted content and encrypted content key and substituting the combination into a hash function (step S279).

The control unit 107 adds to the content management table 121 a piece of content information which contains the content ID corresponding to the content button selected by the user, a title, a recording date/time, the received expiration time, and the calculated hash value (step S281). The control unit 107 writes "1" as the backup flag into the added piece of content information (step S284), and writes "2" as the priority into the added piece of content information (step S286).

(5) Backup Process Performed by HD Recorder 100 and Backup Device 500

Figure 18:
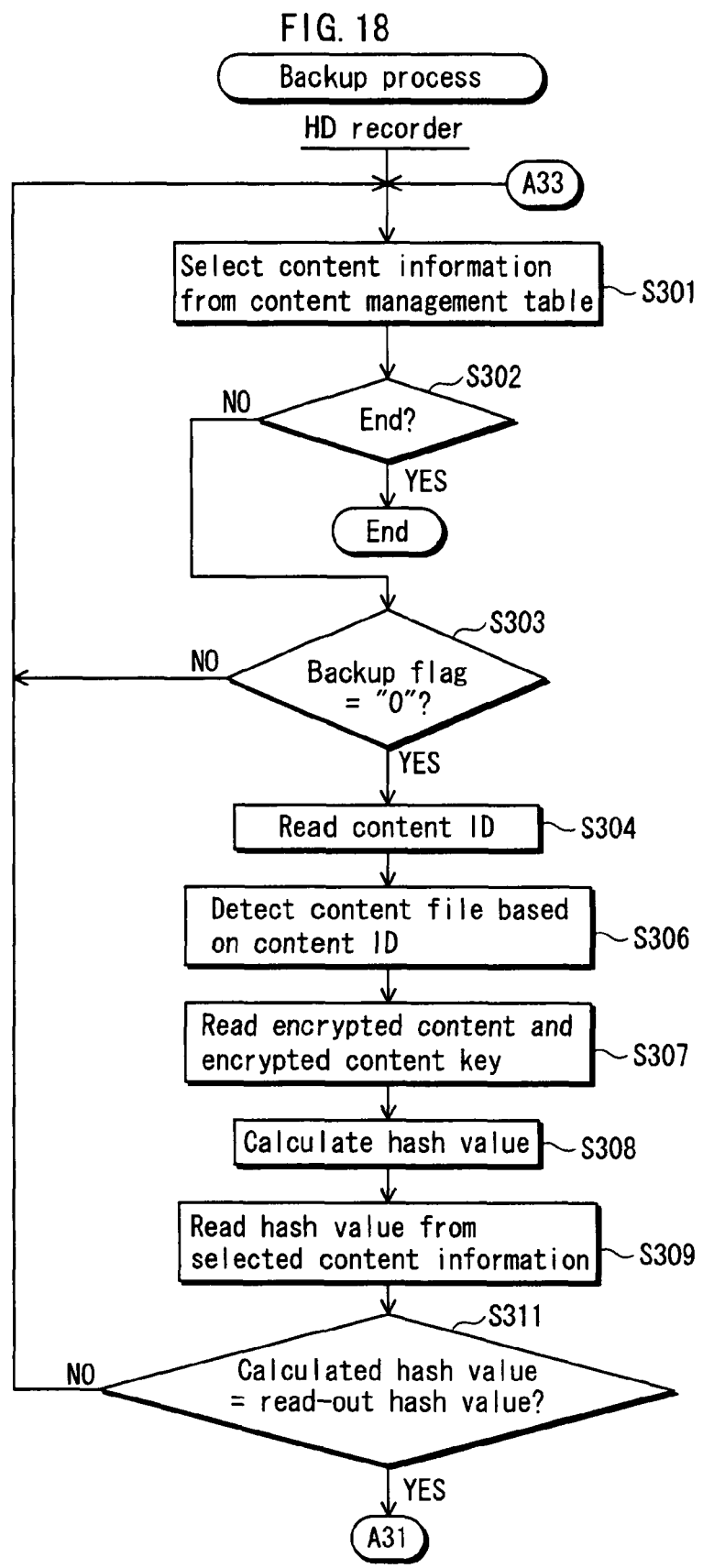
FIG. 18 is a flowchart showing the backup process performed by the HD recorder 100 and the backup device 500.
Figure 19:
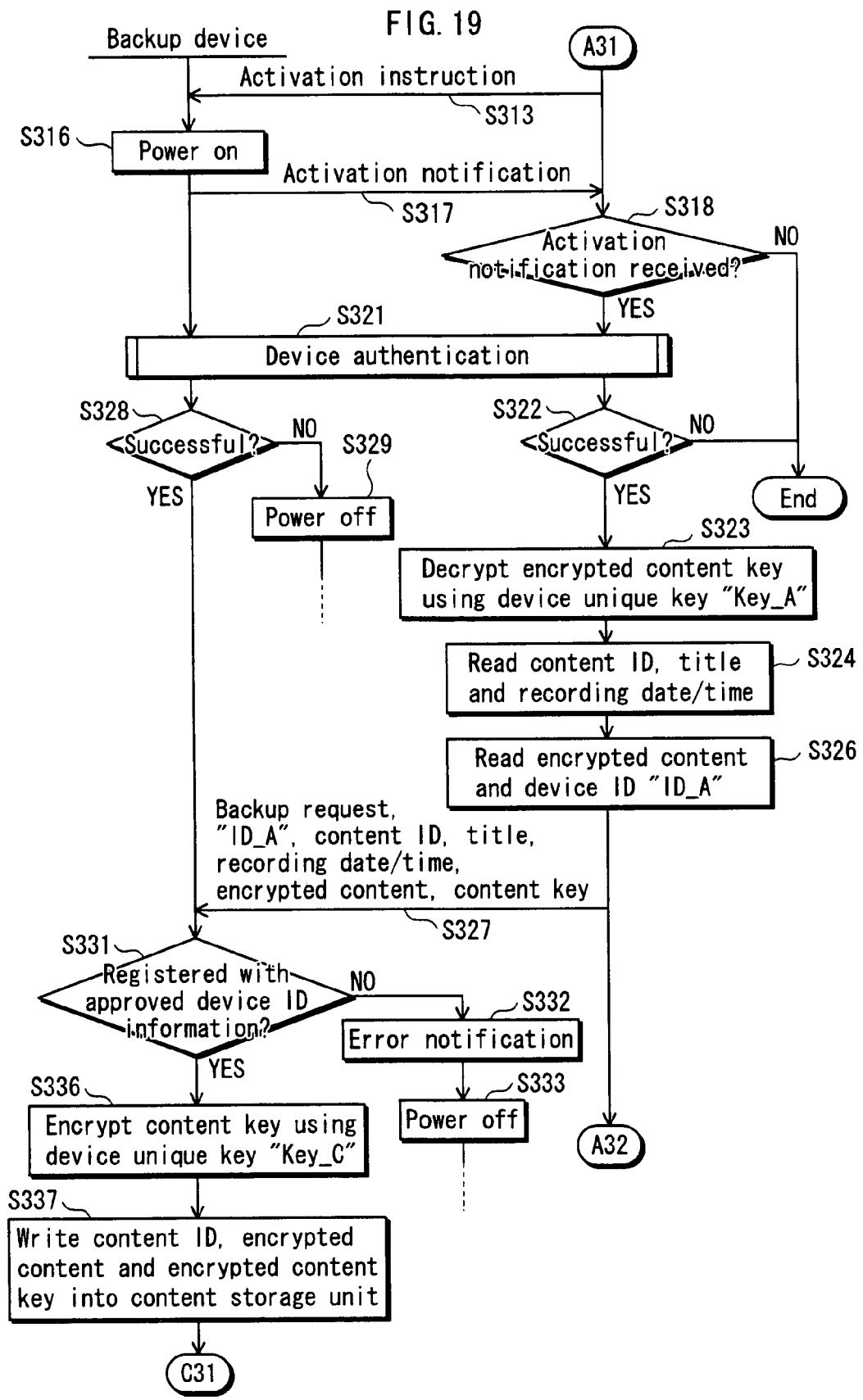
FIG. 19 is a flowchart showing the backup process performed by the HD recorder 100 and the backup device 500, continued from FIG. 18.
Figure 20:
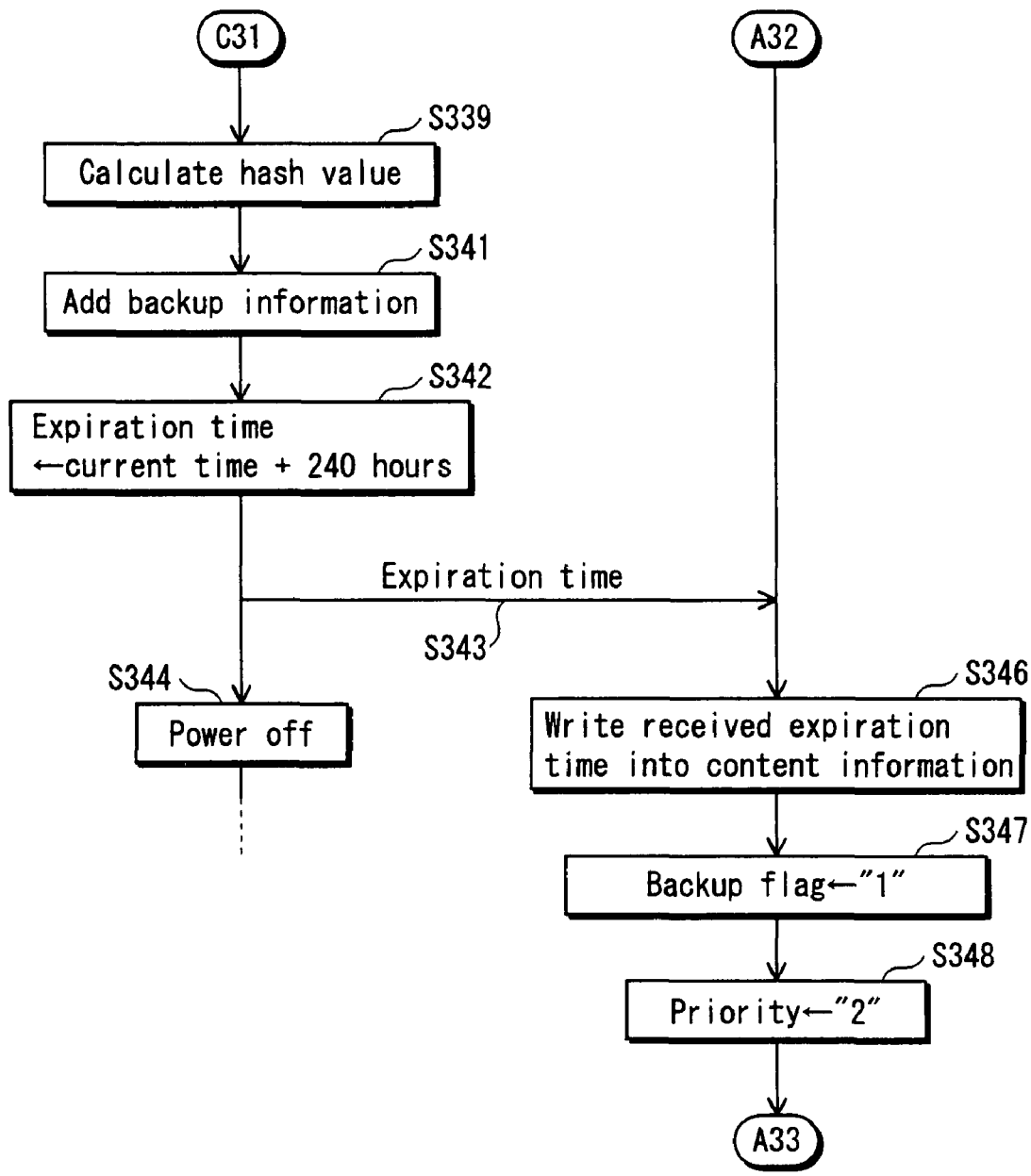
FIG. 20 is a flowchart showing the backup process performed by the HD recorder 100 and the backup device 500, continued from FIG. 18.

The backup process performed by the HD recorder 100 and the backup device 500 will be described with reference to the flowcharts shown in FIGS. 18-20, which are the detail of step S141 shown in FIG. 12.

When the current time indicated by the secure clock 117 reaches "Sunday 0:30" that has been set by the user as the backup schedule, the control unit 107 selects content information constituting the content management table 121 stored in the secure storage unit 113, one piece by one piece in sequence in an order (step S301). At this point of time, if all pieces of content information have already been selected and there is no piece of content information to select newly (YES in step S302), the control unit 107 ends the backup process. If all pieces of content information have not been selected (NO in step S302), the control unit 107 judges whether or not the backup flag contained in the selected piece of content information is "0", namely, whether or not the content corresponding to the selected piece of content information has already been backed up (step S303). If the backup flag is not "0" (NO in step S303), the control unit 107 returns to step S301, and selects the next piece of content information.

If the backup flag is "0" (YES in step S303), the control unit 107 reads a content ID from the selected piece of content information (step S304), and detects a content file that corresponds to the selected piece of content information, based on the read-out content ID (step S306). The control unit 107 then reads an encrypted content and encrypted content key from the detected content file in the information storage unit 110 (step S307).

The control unit 107 then combines the encrypted content and the encrypted content key, and calculates a hash value by substituting the combination into a hash function (step S308). The control unit 107 reads a hash value from the selected piece of content information (step S309), and compares the read-out hash value with the calculated hash value (step S311). If the two hash values do not match each other, the control unit 107 returns to step S301 and starts processing the next piece of content information.

If the two hash values match each other, the control unit 107 transmits an activation instruction to the backup device 500 via the transmission/reception unit 101 (step S313).

The control unit 507 of the backup device 500 receives the activation instruction from the HD recorder 100 via the transmission/reception unit 501, and instructs the power source unit 503 to start supplying power. The power source unit 503 starts supplying power to each circuit constituting the backup device 500 (step S316).

The control unit 507 transmits an activation notification to the HD recorder 100 via the transmission/reception unit 501 (step S317).

If the activation notification is not received within a predetermined time period from the backup device 500 (NO in step S318), the backup process is ended.

If the activation notification is received via the transmission/reception unit 101 within the predetermined time period (YES in step S318), the control unit 107 instructs the authentication unit 102 to perform a device authentication with the backup device 500.

The authentication unit 102 performs the device authentication with the backup device 500, in accordance with the instruction from the control unit 107 (step S321). If the result of the device authentication is unsuccessful (NO in step S322), the control unit 107 ends the backup process.

If the result of the device authentication is successful (YES in step S322), the control unit 107 reads the device unique key 116 "Key_A" from the unique information storage unit 108, outputs the read-out device unique key 116 "Key_A" and the encrypted content key, which is contained in the selected piece of content information, to the encryption processing unit 109, and instructs it to decrypt the encrypted content key. In accordance with the instruction from the control unit 107, the encryption processing unit 109 generates a content key by decrypting the encrypted content key using the received device unique key 116 "Key_A", and outputs the generated content key to the control unit 107 (step S323).

The control unit 107 receives the content key from the encryption processing unit 109. Upon receiving the content key, the control unit 107 reads a content ID, title and recording date/time from the selected piece of content information (step S324).

Next, the control unit 107 reads the device identifier 115 "ID_A" from the unique information storage unit 108, and reads, from the information storage unit 110, an encrypted content that corresponds to the selected piece of content information (step S326). The control unit 107 then transmits, to the backup device 500 via the transmission/reception unit 101, a backup request instructing to perform a backup, the read-out device identifier 115 "ID_A", content ID, title, recording date/time, encrypted content, and the received content key (step S327).

If the result of the device authentication with the HD recorder 100 is unsuccessful (NO in step S328), the control unit 507 instructs the power source unit 503 to stop supplying power. The power source unit 503 stops supplying power to each unit, except for the transmission/reception unit 501 and the control unit 507 (step S329).

If the result of the device authentication with the HD recorder 100 is successful (YES in step S328), the control unit 507 receives the backup request, device identifier "ID_A", content ID, title, recording date/time, encrypted content, and content key from the HD recorder 100 via 101. The control unit 507 judges whether or not the received device identifier "ID_A" has been registered with the approved device ID information 551 stored in the secure information storage unit 511 (step S331). If it judges that the device identifier has not been registered (NO in step S331), the control unit 507 transmits an error notification, which indicates that the backup request cannot be received, to the HD recorder 100 via the transmission/reception unit 501 (step S332), and stops supplying power to each circuit constituting the backup device 500, via the power source unit 503 (step S333). Upon receiving the error notification, the HD recorder 100 ends the backup process.

If it judges that the received device identifier "ID_A" has been registered (YES in step S331), the control unit 507 reads the device unique key 516 "Key_C" from the unique information storage unit 504, and outputs the read-out device unique key 516 "Key_C" and the received content key to the encryption processing unit 509, and instructs it to encrypt the content key. In accordance with the instruction from the control unit 507, the encryption processing unit 509 generates an encrypted content key by encrypting the content key using the received device unique key 516 "Key_C", and outputs the generated encrypted content key to the control unit 507 (step S336).

The control unit 507 receives the encrypted content key from the encryption processing unit 509. Upon receiving the encrypted content key, the control unit 507 generates anew content file in the content storage unit 510, and writes the received content ID and encrypted content and the encrypted content key received from the encryption processing unit 509, into the generated content file (step S337).

Next, the control unit 507 calculates a hash value by combining the received encrypted content and encrypted content key and substituting the combination into a hash function (step S339). The control unit 507 generates a piece of backup information containing the received content ID, title, recording date/time, device identifier "ID_A", and calculated hash value, and adds the generated backup information to the backup management table 521 (step S341). It is presumed here that the received device identifier "ID_A" is a backup source device identifier.

Next, the control unit 507 obtains a current time from the secure clock, and calculates an expiration time by adding the viewing time "240 hours" to the obtained current time (step S342). The control unit 507 transmits the calculated expiration time to the HD recorder 100 via the transmission/reception unit 501 (step S343). After the transmission is completed, the control unit 507 stops supplying power to each circuit constituting the backup device 500, via the power source unit 503 (step S344).

The control unit 107 of the HD recorder 100 receives the expiration time from the backup device 500 via the transmission/reception unit 101, and writes the received expiration time into the selected piece of content information (step S346).

Next, the control unit 107 changes the backup flag of the selected piece of content information to "1" (step S347), changes the priority of the selected piece of content information to "2" (step S348), and returns to step S301.

(6) Expiration Time Extension Operation Performed by HD Recorder 100

Figure 21:
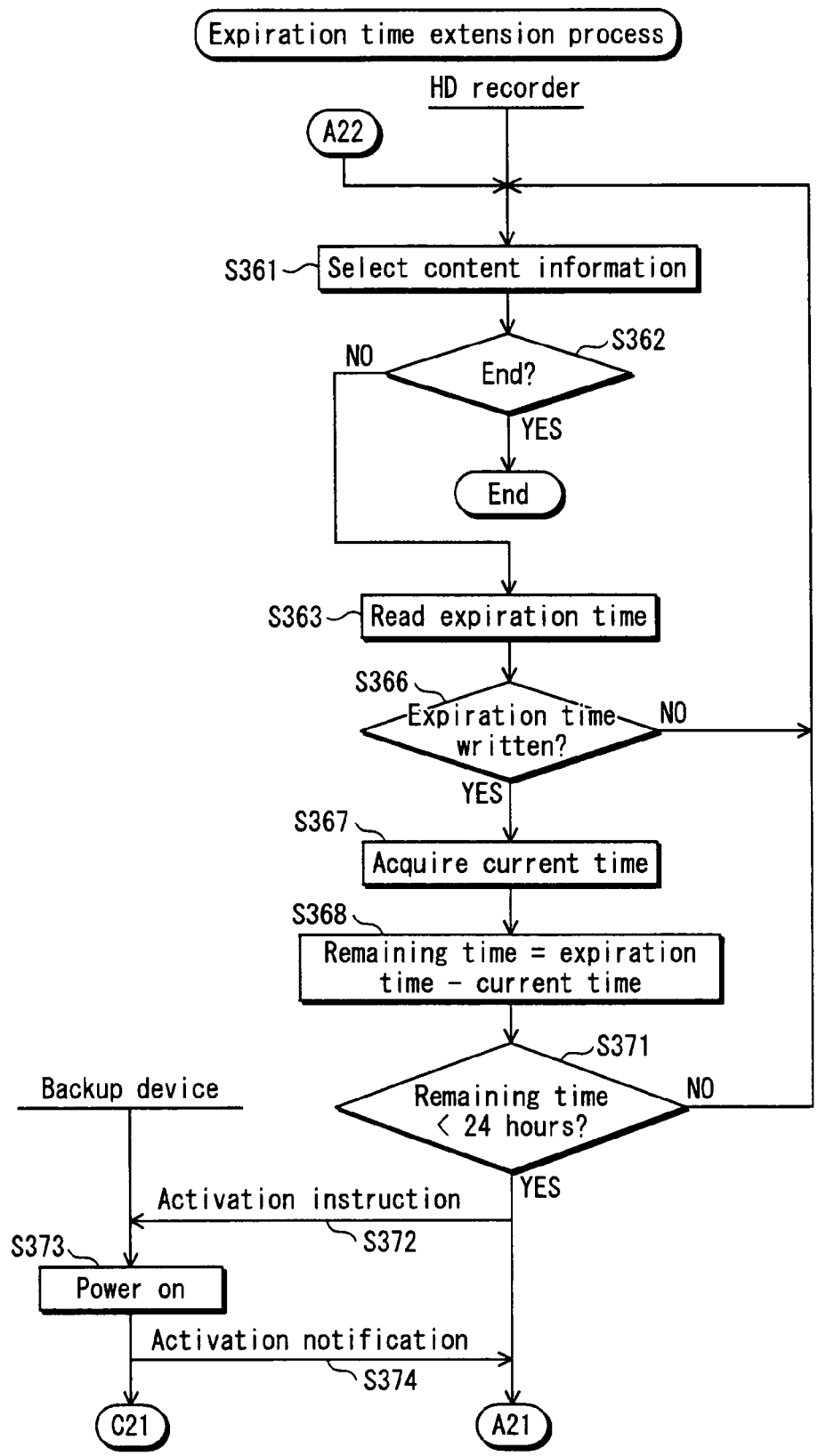
FIG. 21 is a flowchart showing the expiration time extension process performed by the HD recorder 100 and the backup device 500.
Figure 22:
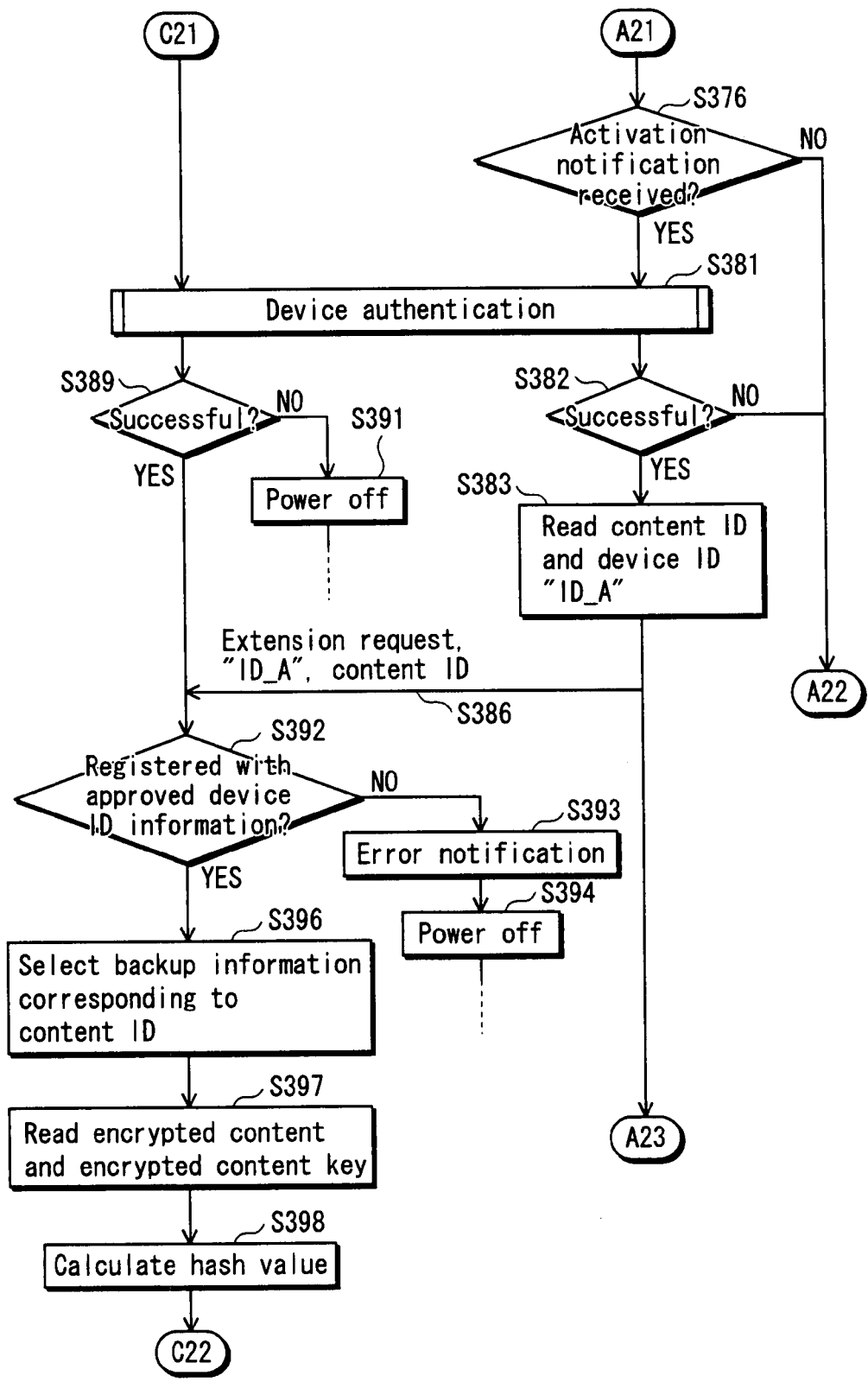
FIG. 22 is a flowchart showing the expiration time extension process performed by the HD recorder 100 and the backup device 500, continued from FIG. 21.
Figure 23:
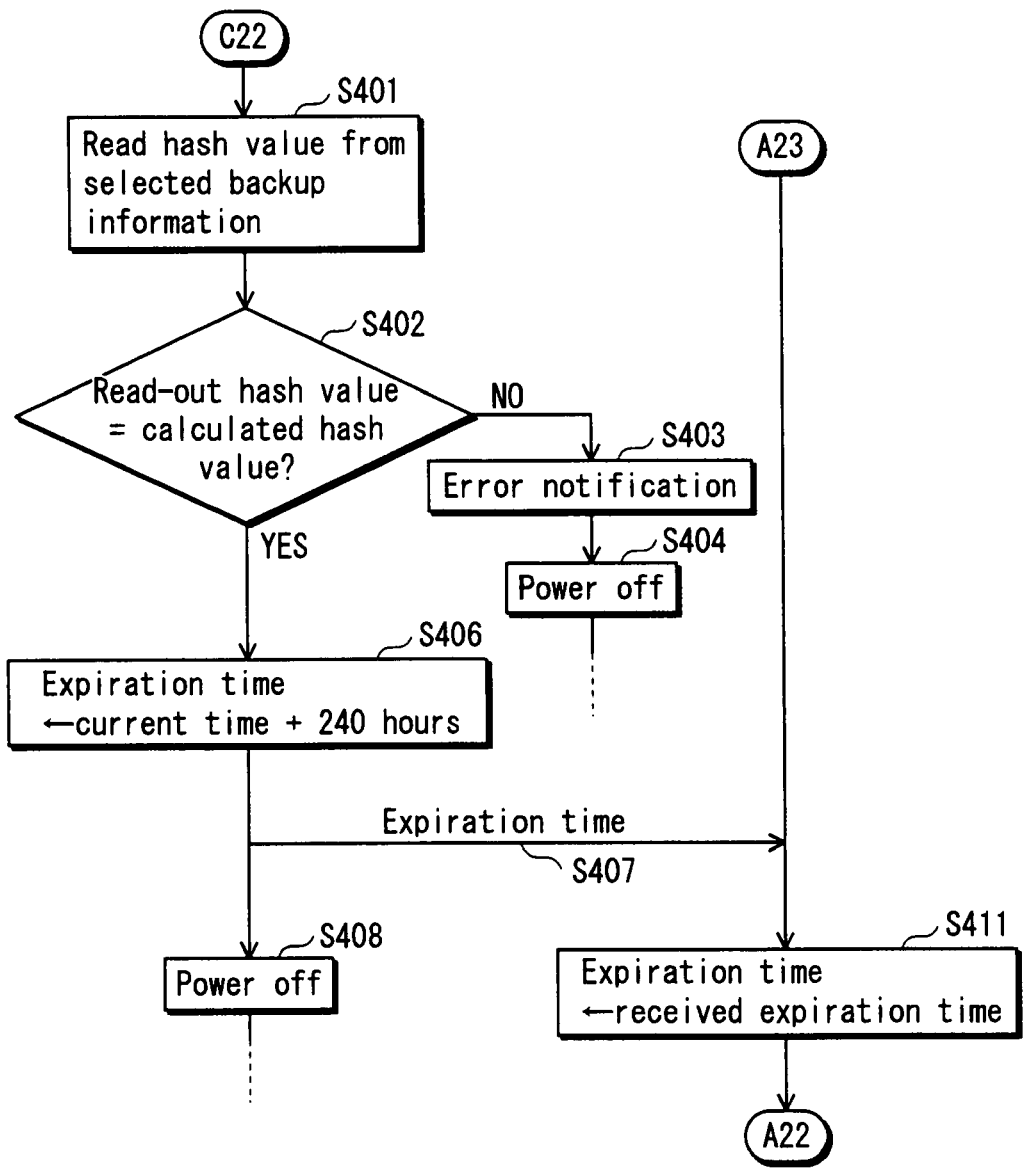
FIG. 23 is a flowchart showing the expiration time extension process performed by the HD recorder 100 and the backup device 500, continued from FIG. 21.

The expiration time extension operation performed by the HD recorder 100 will be described with reference to the flowchart shown in FIG. 21, which is the detail of step S112 shown in FIG. 12.

When the current time indicated by the secure clock 117 reaches the extension time "2:00" that has been preliminarily set, the main control unit 118 constituting the control unit 107 outputs the expiration time extension instruction to the expiration time management unit 119.

Upon receiving the expiration time extension instruction, the expiration time management unit 119 selects, one piece by one piece, the content information constituting the content management table 121 stored in the secure storage unit 113 (step S361). At this point of time, if all pieces of content information have already been selected and there is no piece of content information to select newly (YES in step S362), the expiration time extension process is ended.

If all pieces of content information have not been selected (NO in step S362), the expiration time management unit 119 reads the expiration time from a selected piece of content information (step S363). If the expiration time is not written in the selected piece of content information (NO in step S366), control returns to step S361, and the next piece of content information is selected.

If the expiration time is written in the selected piece of content information (YES in step S366), the expiration time management unit 119 obtains a current time from the secure clock 117 (step S367), and calculates a remaining time by calculating a difference between the read-out expiration time and the obtained current time (step S368). The expiration time management unit 119 compares the calculated remaining time with the extension execution time period "24 hours", if it judges that the calculated remaining time is equal to or more than 24 hours (NO in step S371), the expiration time management unit 119 returns to step S361, and starts processing the next piece of content information.

If the calculated remaining time is less than 24 hours (YES in step S371), the expiration time management unit 119 transmits the activation instruction to the backup device 500 via the transmission/reception unit 101 (step S372).

The control unit 507 of the backup device 500 receives the activation instruction via the transmission/reception unit 501, and instructs the power source unit 503 to start supplying power. The power source unit 503 starts supplying power to each circuit constituting the backup device 500 (step S373).

Next, the control unit 507 transmits an activation notification to the HD recorder 100 via the transmission/reception unit 501 (step S374).

If the activation notification is not received within a predetermined time period from the backup device 500 via the transmission/reception unit 101 (NO in step S376), the expiration time management unit 119 returns to step S361.

If the activation notification is received within the predetermined time period (YES in step S376), the expiration time management unit 119 instructs the authentication unit 102 to perform a device authentication with the backup device 500. The authentication unit 102 performs the device authentication with the backup device 500, in accordance with the instruction from the expiration time management unit 119 (step S381).

If the result of the device authentication is unsuccessful (NO in step S382), the expiration time management unit 119 returns to step S361.

If the result of the device authentication is successful (YES in step S382), the expiration time management unit 119 reads the device identifier 115 "ID_A" from the unique information storage unit 108, and reads a content ID from the selected piece of content information (step S383).

Next, the expiration time management unit 119 transmits, to the backup device 500 via the transmission/reception unit 101, the extension request and the read-out device identifier 115 "ID_A" and content ID (step S386).

If the result of the device authentication with the HD recorder 100 is unsuccessful (NO in step S389), the control unit 507 of the backup device 500 instructs the power source unit 503 to stop supplying power. The power source unit 503 stops supplying power to each unit, except for the transmission/reception unit 501 and the control unit 507 (step S391).

If the result of the device authentication with the HD recorder 100 is successful (YES in step S389), the control unit 507 receives the extension request, device identifier "ID_A", and content ID via the transmission/reception unit 501.

Next, the control unit 507 judges whether or not the received device identifier "ID_A" has been registered with the approved device ID information 551 stored in the secure information storage unit 511 (step S392). If it judges that the device identifier has not been registered (NO in step S392), the control unit 507 transmits an error notification to the HD recorder 100 via the transmission/reception unit 501 (step S393), and instructs the power source unit 503 to stop supplying power. The power source unit 503 stops supplying power to each circuit except for the transmission/reception unit 501 and the control unit 507 (step S394). Upon receiving the error notification, the expiration time management unit 119 of the HD recorder 100 moves control to step S361.

If it judges that the received device identifier "ID_A" has been registered (YES in step S392), the control unit 507 selects a piece of backup information that contains the received content ID, from the backup management table 521 stored in the secure information storage unit 511 (step S396).

Next, the control unit 507 detects a content file corresponding to the selected piece of content information, based on the received content ID, reads an encrypted content and an encrypted content key from the detected content file, and calculates a hash value by combining the read-out encrypted content and encrypted content key, and substituting the combination into a hash function (step S398).

Next, the control unit 507 reads a hash value from the selected piece of backup information (step S401), and compares the read-out hash value with the calculated hash value (step S402). If the two hash values do not match each other (NO in step S402), the control unit 507 transmits an error notification to the HD recorder 100 via the transmission/reception unit 501 (step S403), and instructs the power source unit 503 to stop supplying power. The power source unit 503 stops supplying power to each circuit except for the transmission/reception unit 501 and the control unit 507 (step S404). Upon receiving the error notification, the expiration time management unit 119 of the HD recorder 100 moves control to step S361.

If the read-out hash value matches the calculated hash value (YES in step S402), the control unit 507 obtains a current time from the secure clock, and calculates an expiration time by adding the viewing time "240 hours" to the obtained current time (step S406).

The control unit 507 then transmits the calculated expiration time to the HD recorder 100 via the transmission/reception unit 501 (step S407). After the transmission, the control unit 507 instructs the power source unit 503 to stop supplying power. The power source unit 503 stops supplying power to each unit, except for the transmission/reception unit 501 and the control unit 507 (step S408).

The expiration time management unit 119 receives the expiration time from the backup device 500 via the transmission/reception unit 101. The expiration time management unit 119 then updates the expiration time contained in the selected piece of content information to the received expiration time (step S411), and moves control to step S361.

(7) Device Authentication

Figure 24:
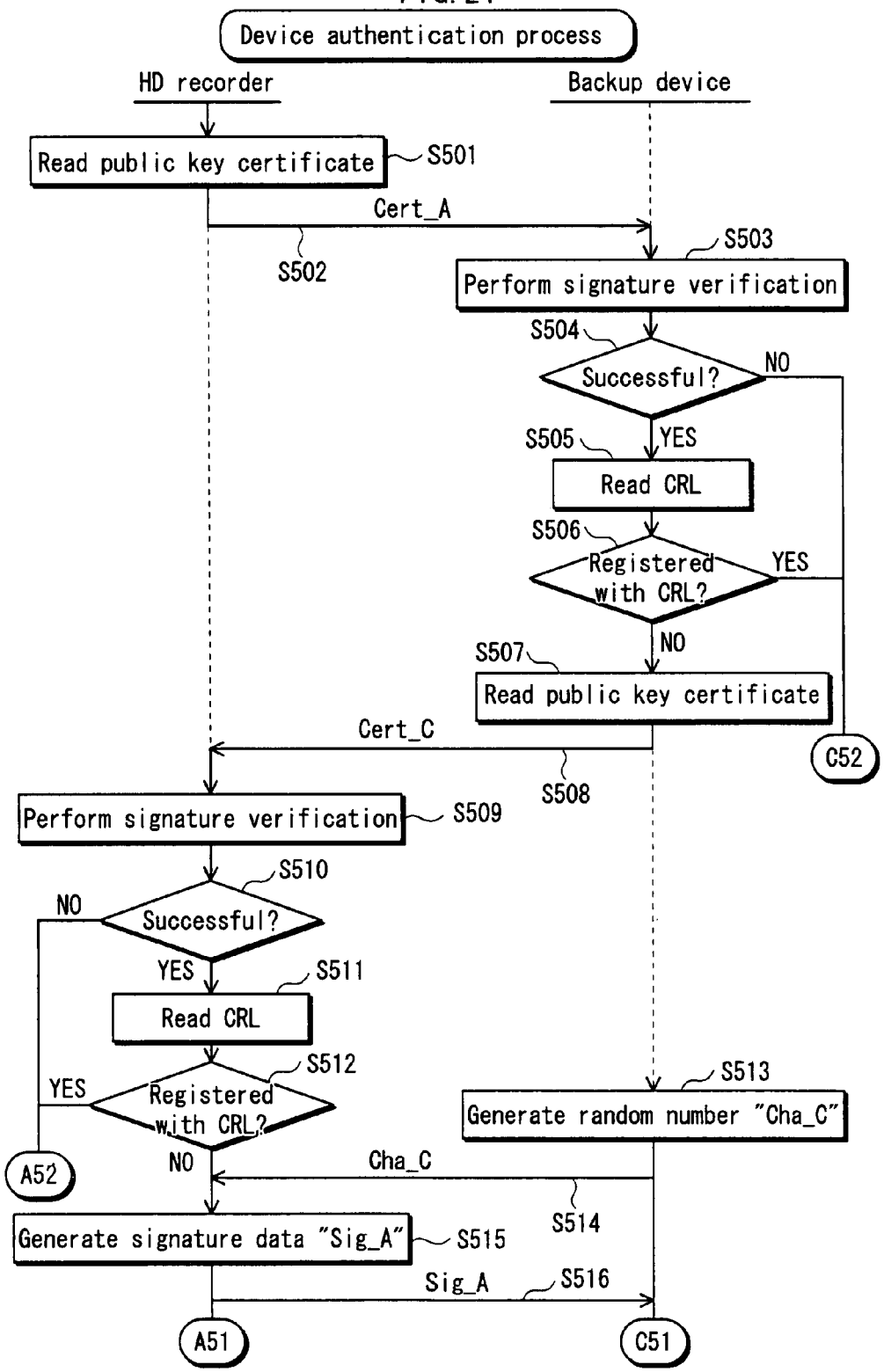
FIG. 24 is a flowchart showing the device authentication process performed by the HD recorder 100 and the backup device 500.
Figure 25:
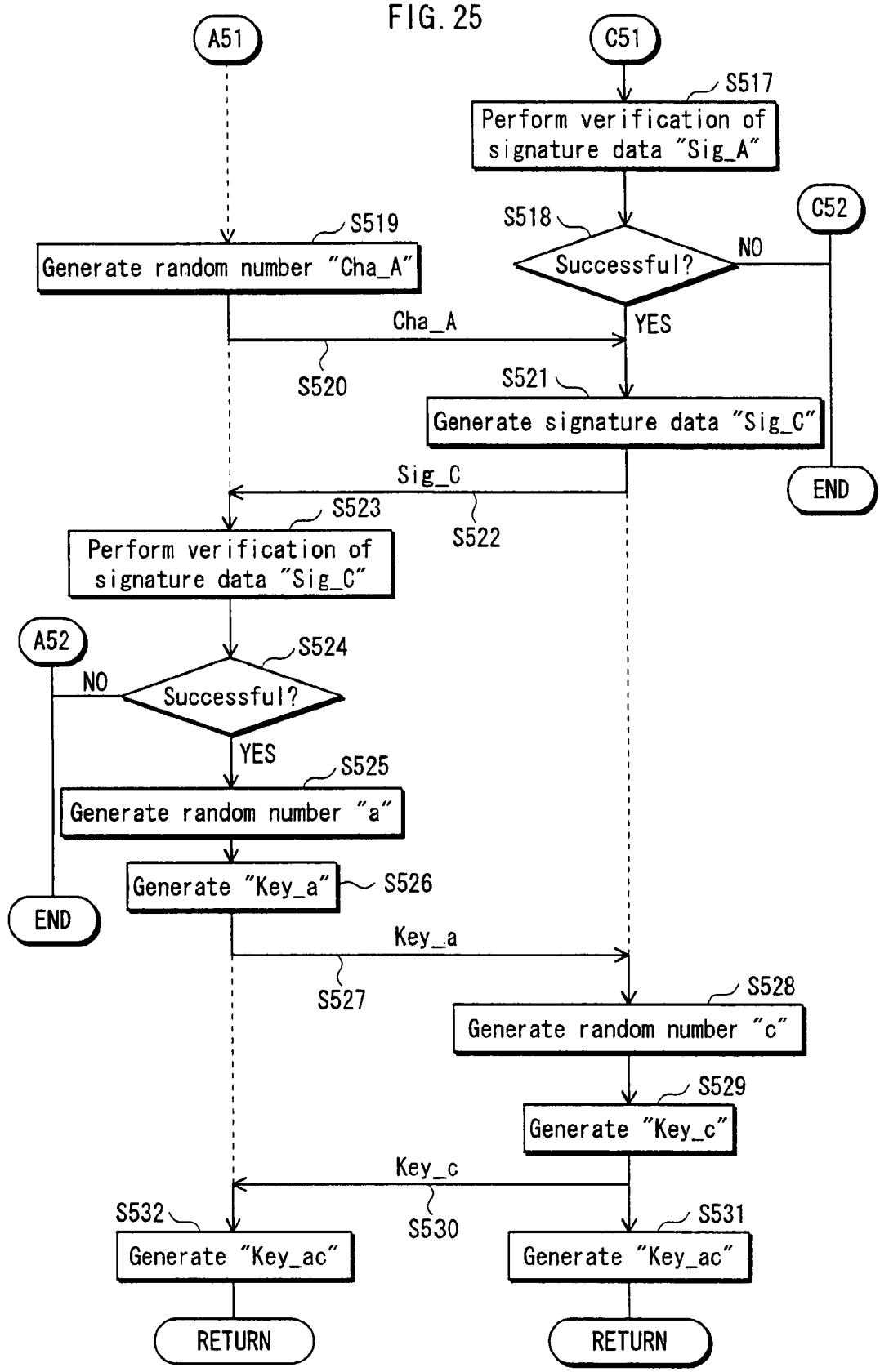
FIG. 25 is a flowchart showing the device authentication process performed by the HD recorder 100 and the backup device 500, continued from FIG. 24.

The device authentication performed by the HD recorder 100 and the backup device 500 will be described with reference to FIGS. 24-25.

It should be noted here that the device authentication described here is one example, and other authentication methods and key sharing methods are also applicable to the present invention. Here, "Gen( )" represents a key generation function, and "Y" represents a parameter unique to the system. It is presumed that the key generation function Gen( ) satisfies the relationship "Gen(x,Gen(z,Y))=Gen(x,Gen(x,Y))". The key generation function can be implemented by a known technology, and description thereof is omitted here.

The authentication unit 102 of the HD recorder 100 reads the public key certificate Cert_A (step S501), and transmits the read-out public key certificate Cert_A to the backup device 500 via the transmission/reception unit 101 (step S502).

Upon receiving the public key certificate Cert_A, the authentication unit 502 of the backup device 500 performs a signature verification by applying a signature verification algorithm V to signature data Sig_CA that is contained in the received public key certificate Cert_A (step S503). Here, the signature verification algorithm V is an algorithm that is used to verify signature data that is generated using signature generation algorithm S. If the result of the signature verification is unsuccessful (NO in step S504), the process is ended.

If the result of the signature verification is successful (YES in step S504), the authentication unit 502 reads the CRL (step S505), and judges whether or not a certificate ID number ID_a, which is contained in the received public key certificate Cert_A, is registered with the read-out CRL (step S506). If it is judged that the certificate ID number ID_a is registered (YES in step S506), the process is ended.

If it is judged that the certificate ID number ID_a is not registered (NO in step S506), the authentication unit 502 reads the public key certificate Cert_C (step S507), and transmits the read-out public key certificate Cert_C to the HD recorder 100 (step S508).

Upon receiving the public key certificate Cert_C, the authentication unit 102 of the HD recorder 100 performs a signature verification by applying the signature verification algorithm V to signature data Sig_CA that is contained in the received public key certificate Cert_C, using the public key PK_CA of the certificate authority (step S509). If the result of the signature verification is unsuccessful (NO in step S510), the process is ended.

If the result of the signature verification is successful (YES in step S510), the authentication unit 102 reads the CRL (step S511), and judges whether or not a certificate ID number ID_b, which is contained in the received public key certificate Cert_C, is registered with the read-out CRL (step S512). If it is judged that the certificate ID number ID_b is registered (YES in step S512), the process is ended. If it is judged that the certificate ID number ID_b is not registered (NO in step S512), the process is continued.

The authentication unit 502 of the backup device 500 generates a random number Cha_C (step S513), and transmits the generated random number Cha_C to the HD recorder 100 (step S514).

Upon receiving the random number Cha_C, the authentication unit 102 of the HD recorder 100 generates signature data Sig_A by applying the signature generation algorithm S to the received random number Cha_C (step S515), and transmits the generated signature data Sig_A to the backup device 500 (step S516).

Upon receiving the signature data Sig_A, the authentication unit 502 of the backup device 500 performs a signature verification by applying the signature verification algorithm V to the received signature data Sig_A, using the public key PK_A of the HD recorder 100 that is contained in the received public key certificate Cert_A (step S517). If the result of the signature verification is unsuccessful (NO in step S518), the process is ended. If the result of the signature verification is successful (YES in step S518), the process is continued.

The authentication unit 102 of the HD recorder 100 generates a random number Cha_A (step S519), and transmits the generated random number Cha_A to the backup device 500 (step S520).

Upon receiving the random number Cha_A, the backup device 500 generates signature data Sig_C by applying the signature generation algorithm S to the received random number Cha_A, using the secret key SK_B of the backup device 500 (step S521), and transmits the generated signature data Sig_C to the HD recorder 100 (step S522).

Upon receiving the signature data Sig_C, the HD recorder 100 performs a signature verification by applying the signature verification algorithm V to the received signature data Sig_C, using the public key PK_B of the backup device 500 that is contained in the received public key certificate Cert_C (step S523). If the result of the signature verification is unsuccessful (NO in step S524), the process is ended. If the result of the signature verification is successful (YES in step S524), the authentication unit 102 generates a random number "a" (step S525), generates Key_a=Gen(a,Y) (step S526), and transmits the generated Key_a to the backup device 500 (step S527).

Upon receiving the Key_a, the backup device 500 generates a random number "c" (step S528), generates Key_c=Gen(c,Y) using the generated random number "c" (step S529), and transmits the generated Key_c to the HD recorder 100 (step S530).

Also, the backup device 500 generates Key_ac=Gen(c, Key_A)=Gen(c,Gen(a,Y)) using the generated random number "c" and the received Key_a, and uses the generated Key_ac as a session key (step S531).

The HD recorder 100 receives the Key_c, generates Key_ac=Gen(a,Key_c)=Gen(a,Gen(c,Y)), and uses the generated Key_ac as a session key (step S532).

1.5 Summary and Effects

As described above, in the backup system 1 of the present invention, the HD recorder 100 requests a backup by transmitting an encrypted content stored in the information storage unit 110, to the backup device 500. The backup device 500 stores the received encrypted content as a backup. Here, an expiration time is set with respect to the encrypted content stored in the HD recorder 100 that is the transmission source of the encrypted content. The HD recorder 100 requests the backup device 500 to extend the expiration time before the expiration time expires.

If the expiration time expires since the extension thereof could not be made for a certain reason such as a communication failure with the backup device 500, the HD recorder 100 deletes the expired encrypted content from the information storage unit 110.

After an encrypted content is deleted from the information storage unit 110, it is possible, by a user operation or the like, to obtain the encrypted content from the backup device 500 that stores the encrypted content as a backup.

The backup device 500 preliminarily stores the approved device ID information, and receives a backup request, an extension request, or a restore request from any device whose device identifier is registered with the approved device ID information.

In this way, even after an encrypted content is stored in the backup device 500 as a backup, the HD recorder 100 stores the encrypted content until the expiration time expires. This makes it possible for the user to view the content by performing a simple operation.

Also, with the structure in which, if an expiration time of an encrypted content expires, the HD recorder 100 deletes the encrypted content therefrom, it is possible to prevent a copy of the encrypted content from existing limitlessly, and to protect the right of the author of the content.

According to the backup system 1 of the present invention, the backup device 500 also stores a content as a backup in accordance with a backup request from the HD recorder 400. The HD recorder 100 can obtain and play back the content that is stored in the backup device 500 according to the backup instruction from the HD recorder 400. This improves the usability for the user.

Further, the backup device 500 supplies power to each circuit constituting the backup device 500 only while the backup device 500 is performing various processes after receiving an activation instruction from the HD recorder 100. With this structure, it is possible to restrict the operation time of the hard disk unit constituting the content storage unit 510 to the minimum, and to suppress the breakdown of the hard disk unit.

2. Modifications

Up to now, an embodiment of the present invention has been described. However, the present invention is not limited to the above-described embodiment, but includes the following modifications.

(1) In Embodiment 1, the expiration time management unit 119 deletes a content file containing an expired encrypted content from the information storage unit 110. However, only an encrypted content key may be deleted.

In this case, the expiration time management unit 119 deletes only the encrypted content key from the information storage unit 110, and deletes a hash value and an expiration time contained in the corresponding piece of content information.

If there is no hash value in a piece of content information that corresponds to a content button selected by a user operation while the playback list screen 211 is displayed on the monitor, the main control unit 118 reads a content ID from the piece of content information, and transmits a content key request and the read-out content ID to the backup device 500 via the transmission/reception unit 101.

The backup device 500 receives the content key request, and transmits a requested content key and the expiration time to the HD recorder 100.

The main control unit 118 of the HD recorder 100 receives the content key and expiration time, instructs the encryption processing unit 109 to encrypt the content key, and writes the encrypted content key, which is generated by the encryption processing unit 109, into the information storage unit 110. The main control unit 118 then reads an encrypted content from the content file that is stored in the information storage unit 110 and corresponds to the piece of content information that corresponds to the selected content button, generates a hash value based on the read-out encrypted content and the generated encrypted content key, and writes the generated hash value and the received expiration time into the piece of content information. After this, the encrypted content is decrypted and played back in the same manner as in the above-described generation process.

(2) In the above-described Modification (1), if an expiration time fails to be updated, only the hash value and the expiration time may be deleted from the corresponding piece of content information.

In this case, the main control unit 118 transmits, to the backup device 500, an expiration time request instead of a content key request. Only when the requested expiration time is received from the backup device 500, the main control unit 118 writes the received expiration time into the content information, and calculates a hash value newly from the encrypted content, which corresponds to the content information, and the encrypted content key.

(3) In Embodiment 1, the backup device 500 calculates the expiration time, and transmits the calculated expiration time to the HD recorder 100. However, the HD recorder 100 may calculate the expiration time.

For example, in the backup process, the backup device 500 transmits to the HD recorder 100 a completion notification indicating that a backup has been completed normally, instead of transmitting the expiration time.

Upon receiving the completion notification, the main control unit 118 of the HD recorder 100 obtains a current time from the secure clock 117, and calculates an expiration time by adding the viewing time "240 hours" to the obtained current time.

Further, in the expiration time extension process, the backup device 500 transmits to the HD recorder 100 an extension permission indicating that an extension of the expiration time is possible, instead of transmitting the expiration time.

Upon receiving the extension permission, the expiration time-management unit 119 of the HD recorder 100 obtains a current time from the secure clock 117, and calculates an expiration time by adding the viewing time "240 hours" to the obtained current time.

Further, the expiration time contained in each piece of content information may be updated to a result of adding the viewing time "240 hours", instead of the current time, to the expiration time.

With this structure, the control unit 507 constituting the backup device 500 does not require the secure clock.

(4) In the above-described embodiment, the HD recorder 100 extends an expiration time or deletes an expired content based on the expiration time contained in each piece of content information. However, each content may be managed based on the period during which the encrypted content is permitted to be played back, or based on a starting date/time of the period.

In this case, each piece of content information constituting the content management table 121 contains a starting date/time of a period during which the content is permitted to be played back.

The main control unit 118 stores "240 hours" as the period during which the content is permitted to be played back.

In the backup process, the backup device 500 transmits to the HD recorder 100 a completion notification indicating that a backup has been completed normally, instead of transmitting the expiration time.

Upon receiving the completion notification from the backup device 500 via the transmission/reception unit 101, the main control unit 118 obtains a current time from the secure clock 117, and writes the obtained current time into the content information as the starting date/time of the period.

In the expiration time extension process, the expiration time management unit 119 obtains a current time from the secure clock 117, and if an elapse time since the starting date/time is 216 hours or more, transmits an extension request to the backup device 500.

In the delete process, the expiration time management unit 119 obtains a current time from the secure clock 117, and if an elapse time since the starting date/time is 240 hours or more, deletes the corresponding content file from the information storage unit 110, and deletes the corresponding piece of content information.

With this structure, the control unit 507 constituting the backup device 500 does not require the secure clock.

(5) In the above-described Embodiment 1 and Modifications, the HD recorder 100 transmits an extension request to the backup device 500 when the expiration time of any encrypted content is to be reached within less than 24 hours. However, the extension request may be transmitted at regular intervals regardless of the time period within which the expiration time is to be reached.

(6) The contents may be managed based on the number of viewing times, instead of the expiration time.

For example, each piece of content information stored in the content management table 121 contains an effective number of viewing times, instead of the expiration time. Each time a content is played back, the control unit 107 subtracts "1" from the effective number of viewing times contained in the piece of content information that corresponds to the played back content.

In the backup process and the expiration time extension process, the backup device 500 transmits the number of viewing times. "3", instead of the expiration time. The control unit 107 of the HD recorder 100 sets the received number of viewing times "3" as the effective number of viewing times.

The HD recorder 100 deletes each piece of content information that contains the effective number of viewing times "0", and also deletes each content that corresponds to the content information.

(7) In Embodiment 1, the backup device 500 preliminarily stores the approved device ID information 551, and receives a restore request from any device that has a device identifier registered with the approved device ID information 551. However, the backup device 500 may judge whether to receive a restore request based on the number of "copy contents".

In the following description of this modification, for the sake of convenience, the encrypted content stored in the backup device 500 is merely referred to as "content", and the encrypted content stored in a playback device such as the HD recorder 100 is referred to as "copy content". Further, the backup system 1 is connected to one or more devices that have functions to store and play back contents, as well as to the HD recorder 100 and the HD recorder 400.

More specifically, the control unit 507 of the backup device 500 stores the number of permitted copies "3" that indicates the number of copy contents that are respectively permitted to be present in correspondence with the contents. Further, each piece of backup information constituting the backup management table 521 stored in the secure information storage unit 511 contains the number of copies that indicates the number of copy contents that are currently present.

The secure information storage unit 511 further stores a plurality of copy management tables. Each copy management table is composed of a plurality of pieces of copy information, each of which is composed of a content ID, device identifier, and expiration time. The content ID is identical with any content ID contained in the backup management table 521.

The device identifier is information for identifying an external device that includes a copy content identified by the content ID. The "expiration time" in the copy information indicates an expiration time of a copy content included in an external device identified by the device identifier.

(7-a) Backup Process

In the backup process described in Embodiment 1, after receiving a backup request from the HD recorder 100, the control unit 507 performs writing a content, adding a piece of backup information, calculating an expiration time, and the like, as explained in Embodiment 1. In such processes, "1" is written into the added piece of backup information as the number of copies.

Next, the control unit 507 generates a piece of copy information that is composed of the received content ID, the received device identifier, and the calculated expiration time, and adds the generated piece of copy information to the copy management table. After adding the copy information, the control unit 507 transmits the calculated expiration time to the HD recorder 100.

(7-b) Deleting Copy

In the control of the recording process performed by the main control unit 118 of the HD recorder 100, when the information storage unit 110 does not have enough free space to newly record a content, the main control unit 118 deletes, from the information storage unit 110, an encrypted content corresponding to the content information having priority "2", as described earlier.

When performing the deletion, the main control unit 118 transmits, to the backup device 500, a copy delete notification indicating a delete of copy content, a content ID identifying the deleted copy content, and the device identifier "ID_A" of the HD recorder 100 itself.

The control unit 507 of the backup device 500 receives, from the HD recorder 100, the copy delete notification, content ID, and device identifier "ID_A". The control unit 507 then deletes a piece of copy information containing the received content ID and device identifier "ID_A", and subtracts "1" from the number of copies contained in a piece of backup information having the received content ID.

(7-c) Restore Process

In the above-described restore process, upon receiving a restore request from an external device, the control unit 507 of the backup device 500 reads the number of copies from a piece of backup information having a content ID that has been received with the restore request. If the read-out number of copies is "3" that is identical with the number of permitted copies, the control unit 507 transmits an error notification indicating that the restore request cannot be received, to the HD recorder 100.

If the read-out number of copies is less than the number of permitted copies "3", the control unit 507 performs the verification of hash value, generation of content key, calculation of expiration time and the like, in accordance with the procedures described in Embodiment 1. After calculating the expiration time, the control unit 507 adds "1" to the number of copies contained in the piece of backup information having the received content ID, in the backup management table 521. The control unit 507 then generates a piece of copy information composed of the received content ID and device identifier and the calculated expiration time, and adds the generated piece of copy information to the copy management table.

After this, the control unit 507 transmits the content, content key, and expiration time to the external device.

(7-d) Expiration Time Verification Performed by Backup Device 500

In the expiration time extension process, the control unit 507 selects a piece of copy information that contains the received content ID and device identifier, and updates the expiration time contained in the selected piece of copy information to the newly calculated expiration time.

The control unit 507 stores a verification time at which the expiration time contained in each piece of copy information is to be verified. When the time reaches the verification time, the control unit 507 selects one from among one or more pieces of copy information that constitute the copy management table, reads the expiration time from the selected piece of copy information, and compares the read-out expiration time with the current time. If the current time is later than the expiration time, the control unit 507 subtracts "1" from the number of copies contained in a piece of backup information having the content ID that is contained in the selected piece of copy information. The control unit 507 then deletes the selected piece of copy information.

If the current time is not later than the expiration time, the control unit 507 neither subtracts from the number of copies nor deletes the piece of copy information.

The control unit 507 verifies the expiration time with respect to all pieces of backup information, according to the same procedures.

(8) In Modification (7), the backup device 500 preliminarily stores the number of permitted copies. However, broadcast contents may contain the number of permitted copies.

For example, predetermined bits among those of each TS packet constituting a content may indicate the number of permitted copies. With this structure, the backup device 500 extracts the number of permitted copies in the backup process by decrypting any one TS packet of a received encrypted content using a received content key, and stores the extracted number of permitted copies, in correspondence with a received content ID.

Further, not limited to the extracted number of permitted copies, a content may also include information that indicates whether or not a backup generation is permitted. The control unit 107 of the HD recorder 100 extracts, from the received content, the information indicating whether or not a backup generation is permitted, and stores the extracted information (hereinafter referred to as backup information) in correspondence with the content ID.

In the backup process, if a piece of backup information, which corresponds to an encrypted content being a target of a backup, indicates that the backup generation is permitted, the encrypted content is transmitted to the backup device 500 according to the procedures described in Embodiment 1. If the piece of backup information corresponding to the backup target encrypted content indicates that the backup generation is prohibited, the encrypted content is not transmitted.

Especially, when the above-described backup process is started by a depression of the backup button by the user, a content title of an encrypted content, which corresponds to a piece of backup information indicating that the backup generation is prohibited, is displayed on the monitor 120, and the user is notified that making a backup of the displayed content is prohibited.

With this structure, it is possible to reflect the willingness of the copyright owner of the content, with regard to generation of a backup and a copy content.

(9) In Embodiment 1, a hash value is calculated by combining an encrypted content and an encrypted content key and substituting the combination into a hash function. However, only an encrypted content key may be substituted.

(10) In the above-described embodiment and modifications, an encrypted content and an encrypted content key are encrypted by the common key encryption system, and a same key is used both in encryption and decryption. However, not limited to this, a public key encryption system such as the RSA or the elliptic curve cryptosystem may be adopted, and different keys may be used in encryption and decryption, respectively.

More specifically, when the public key encryption system is adopted, in the content recording process described with reference to FIG. 13, the key generating unit 106 of the HD recorder 100 generates a pair of content encryption key and a content decryption key, instead of one content key. The control unit 107 outputs a content, which has been received via the broadcast receiving unit 114, and a content encryption key generated by the key generating unit 106 to the encryption processing unit 109, and instructs it to encrypts the content. Upon receiving the instruction to encrypt the content, the encryption processing unit 109 generates an encrypted content by applying an encryption algorithm, which conforms to the public key encryption system, to the content, using the content encryption key. When recording is stopped due to a depression of the stop-button or a free space shortage of the information storage unit 110, the encryption processing unit 109 generates an encrypted content key by encrypting a content decryption key instead of a content key, using the device unique key "Key_A".

In the encryption and decryption processes after this, the encryption processing unit 109 encrypts the content decryption key and decrypts the encrypted content key, both in conformance with the common key encryption system, and decrypts the encrypted content in conformance with the public key encryption system.

(11) In the above-described embodiment and modifications, the backup device 500 and the HD recorder 100 are connected to each other via the LAN 30. However, not limited to this structure, for example, a structure where the backup device is embedded in the HD recorder 100 is also included in the present invention.

(12) In the above description, the content storage unit 510 of the backup device 500 consists of a hard disk unit. However, the content storage unit 510 may be structured to include an optical disc, which is attachable/detachable, and an input/output unit that performs writing and reading information on the optical disc. In this case, the user attaches or detaches the optical disc as necessary.

Alternatively, the content storage unit 510 may be structured to include a plurality of optical discs and a disc changer that automatically changes the optical discs.

(13) The present invention may be methods shown by the above. The present invention may be a computer program that allows a computer to realize the methods, or may be digital signals representing the computer program.

Furthermore, the present invention may be a computer-readable recording medium such as a flexible disk, a hard disk, CD-ROM, MO, DVD, DVD-ROM, DVD PAM, BD (Blu-ray Disc), or a semiconductor memory, that stores the computer program or the digital signal. Furthermore, the present invention may be the computer program or the digital signal recorded on any of the aforementioned recording medium apparatuses.

Furthermore, the present invention may be the computer program or the digital signal transmitted on an electric communication line, a wireless or wired communication line, or a network of which the Internet is representative.

Furthermore, the present invention may be a computer system that includes a microprocessor and a memory, the memory storing the computer program, and the microprocessor operating according to the computer program.

Furthermore, by transferring the program or the digital signal via the recording medium, or by transferring the program or the digital signal via the network or the like, the program or the digital signal may be executed by another independent computer system.

(14) Part or all of constituent elements constituting each of the above-described devices may be achieved in a system LSI (Large Scale Integration). The system LSI is an ultra multi-functional LSI that is manufactured by integrating a plurality of components on one chip. More specifically, the system LSI is a computer system that includes a microprocessor, ROM, and RAM. A computer program is stored in the RAM. The microprocessor operates in accordance with the computer program, thereby enabling the system LSI to achieve its functions.

It should be noted here that although the term LSI is used here, it may be called IC, system LSI, super LSI, ultra LSI or the like, depending on the level of integration.

Also, the system LSI may be replaced with the FPGA (Field Programmable Gate Array) or the CPLD (Complex Programmable Logic Device, also called reconfigurable LSI) that can be re-programmed after it is incorporated into a product. Furthermore, a technology for realizing the functions of the above-described integrated circuits may bee developed in future. In that case, the new technology may be adopted to achieve part or all of the constituent elements constituting each of the above-described devices.

(15) The present invention may be any combination of the above-described embodiments and modifications.

INDUSTRIAL APPLICABILITY

The present invention can be used managerially, repetitively and continuously in the industry for distributing, broadcasting and using digital contents, and in the industry for manufacturing and selling various electric devices for, for example, generating, distributing, playing or editing contents.

The invention claimed is:

1. A backup system comprising a backup device and a recording/playback device for recording and playing back a content,
wherein the recording/playback device includes:
a storage unit storing the content and content information in correspondence with each other;
a receiving unit operable to receive a backup instruction to back up the content;
a content transmitting unit operable to, if the receiving unit receives the backup instruction, read the content from the storage unit and transmit the content to the backup device;
a writing unit operable to, if the receiving unit receives the backup instruction, write period information to the content information stored in the storage unit in correspondence with the content, the period information indicating a period during which the content is permitted to be played back; and
a playback control unit operable to permit the content to be played back during the period indicated by the period information, and prohibit the content from being played back after the period indicated by the period information ends,
wherein, after the period indicated by the period information ends, the playback control unit (i) maintains the content and the content information stored in the storage unit until a suspension period ends, and (ii) deletes the content and the content information from the storage unit after the suspension period ends, wherein the backup device includes:
a content receiving unit operable to receive the content from the recording/playback device;
a backup storage unit operable to store the received content;
an extension request receiving unit operable to receive an extension request to permit an extension of the period during which the content stored in the recording/playback device is permitted to be played back, the extension request being received from the recording/playback device;
a judging unit operable to judge whether or not to permit the extension; and
a permission unit operable to output, to the recording/playback device, extension permission information to permit the extension of the period, if the judging unit judges to permit the extension, wherein the backup storage unit further stores detection information in correspondence with the received content, the detection information being generated by performing a predetermined calculation on the received content, wherein the judging unit reads the received content from the backup storage unit, generates verification information by performing the predetermined calculation on the received content read from the backup storage unit, compares the generated verification information with the detection information, and judges to permit the extension if the generated verification information matches the detection information, wherein the extension request contains device identification information that identifies the recording/playback device, and wherein the judging unit preliminarily stores one or more pieces of approved device identification information that respectively identifies one or more predetermined devices, and judges to permit the extension if the device identification information contained in the received extension request matches any of the one or more pieces of approved device identification information.

2. The backup system of claim 1,
wherein the recording/playback device further includes:
an extension request unit operable to transmit to the backup device the extension request to permit the extension of the period indicated by the period information; and
an extension unit operable to receive, from the backup device, the extension permission information to permit the extension of the period, and extend the period indicated by the period information.

3. The backup system of claim 2, wherein
the extension request unit transmits the extension request during a predetermined time period before a point of time when the period indicated by the period information ends.

4. The backup system of claim 2, wherein
the extension request unit transmits the extension request repeatedly at regular intervals during the period indicated by the period information.

5. The backup system of claim 2, wherein
the extension unit extends the period indicated by the period information by receiving the extension permission information, the extension permission information indicating another period that is later than the period indicated by the period information stored in the storage unit, and
the extension unit rewrites the period indicated by the period information to be the other period indicated by the extension permission information.

6. The backup system of claim 2, wherein
the extension unit preliminarily stores an extension time period, and extends the period indicated by the period information by adding the extension time period to the period indicated by the period information.

7. The backup system of claim 2, wherein
the period information indicates a point of time when the period, during which the content stored in the storage unit is permitted to be played back, ends, and
the playback control unit permits the content to be played back if a current time is before the point of time indicated by the period information, and prohibits the content from being played back if the current time is after the point of time indicated by the period information.

8. The backup system of claim 2, wherein
the period information is composed of (i) a permission time period that indicates a length of time during which the content stored in the storage unit is permitted to be played back, and (ii) a start time that indicates a point of time at which the period, during which the content is permitted to be played back, starts, and
the playback control unit obtains an elapsed time since the start time, permits the content to be played back if the obtained elapsed time is not greater than the permission time period, and prohibits the content from being played back if the obtained elapsed time is greater than the permission time period.

9. The backup system of claim 1, wherein
the playback control unit prohibits the content from being played back by deleting the content from the storage unit.

10. The backup system of claim 9,
wherein the recording/playback device further includes:
a restore instruction obtaining unit operable to obtain a restore instruction to obtain the content stored in the backup device;
a restore request unit operable to, if the restore instruction obtaining unit obtains the restore instruction, transmit to the backup device a transmission request to transmit the content stored in the backup device; and
a restore unit operable to receive the content from the backup device and write the received content into the storage unit,
wherein, after the received content is written into the storage unit, the writing unit writes period information to the storage unit in correspondence with the received content, and
wherein the period information, stored in correspondence with the received content, indicates a period during which the received content, which was written into the storage unit by the restore unit, is permitted to be played back.

11. The backup system of claim 1, wherein
the content stored in the storage unit includes an encrypted work and a decryption key, the encrypted work having been generated by encrypting a digital work using an encryption key, the decryption key being used for decrypting the encrypted work, and the playback control unit prohibits the content from being played back by deleting the decryption key contained in the content.

12. The backup system of claim 11,
wherein the recording/playback device further includes:
   a restore instruction obtaining unit operable to obtain a restore instruction to obtain the decryption key stored in the backup device;
   a restore request unit operable to, if the restore instruction obtaining unit obtains the restore instruction, transmit to the backup device a transmission request to transmit the decryption key stored in the backup device; and
   a restore unit operable to receive the decryption key from the backup device and write the received decryption key into the storage unit,
wherein, when the received decryption key is written into the storage unit, the writing unit writes period information to the storage unit in correspondence with the content including the encrypted work and the received decryption key, and
wherein the period information, written in correspondence with the content key including the encrypted work and the received decryption key, indicates a period during which the content including the encrypted work and the received decryption key stored in the storage unit is permitted to be played back.

13. The backup system of claim 1, wherein
the content stored in the storage unit includes an encrypted work and an encrypted key, the encrypted work having been generated by encrypting a digital work using an encryption key, the encrypted key having been generated by encrypting a decryption key, which is used for decrypting the encrypted work, using a unique key that is unique to the recording/playback device, and
the playback control unit prohibits the content from being played back by deleting the encrypted key from the storage unit.

14. The backup system of claim 1, wherein
the content stored in the storage unit includes backup information that indicates a permission or a prohibition of a backup,
the content transmitting unit judges whether the backup information indicates the permission or the prohibition of the backup, and transmits the content if it is judged that the backup information indicates the permission of the backup, and
the writing unit judges whether the backup information indicates the permission or the prohibition of the backup, and writes the period information if it is judged that the backup information indicates the permission of the backup.

15. The backup system of claim 1, wherein
the content transmitting unit generates an encrypted content by encrypting the content using a communication key, and transmits the encrypted content safely.

16. The backup system of claim 1,
wherein the recording/playback device further includes:
   a detection information storage unit storing detection information that is generated by performing a predetermined calculation on the content; and
   an unauthorized use prohibition unit operable to read the content from the storage unit, generate verification information by performing the predetermined calculation on the content read from the storage unit, compare the generated verification information with the detection information, and prohibit the content from being used if the generated verification information does not match the detection information.

17. The backup system of claim 1,
wherein the backup device stores another content as a result of an execution of a backup instruction by a device other than the recording/playback device,
wherein the recording/playback device further includes:
   a restore instruction obtaining unit operable to obtain a restore instruction to obtain the other content;
   a content request unit operable to, if the restore instruction obtaining unit obtains the restore instruction, transmit to the backup device a transmission request to transmit the other content; and
   a restore unit operable to receive the other content from the backup device and write the received other content into the storage unit,
wherein, when the other content is received, the writing unit writes period information to the storage unit in correspondence with the other content, and
wherein the period information, stored in correspondence with the other content, indicates a period during which the other content is permitted to be played back.

* * * * *